United States Patent
Lim et al.

(10) Patent No.: US 7,773,808 B2
(45) Date of Patent: Aug. 10, 2010

(54) APPARATUS AND METHOD FOR RECOGNIZING A CHARACTER IMAGE FROM AN IMAGE SCREEN

(75) Inventors: Chae-Whan Lim, Daegukwangyok-shi (KR); Jeong-Wook Seo, Daegukwangyok-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1816 days.

(21) Appl. No.: 10/657,206

(22) Filed: Sep. 9, 2003

(65) Prior Publication Data

US 2004/0057619 A1    Mar. 25, 2004

(30) Foreign Application Priority Data

Sep. 11, 2002  (KR) ............... 10-2002-0055148
Jul. 31, 2003   (KR) ............... 10-2003-0053137

(51) Int. Cl.
*G06K 9/00*    (2006.01)
(52) U.S. Cl. ..................................... 382/181
(58) Field of Classification Search ............. 382/201, 382/200, 181
See application file for complete search history.

(56) References Cited

U.S. PATENT DOCUMENTS 3,701,972 A * 10/1972 Berkeley et al. ............ 710/36
4,180,798 A * 12/1979 Komori et al. ............ 382/181
4,799,077 A * 1/1989 Kaplan et al. ............. 396/105
5,022,081 A    6/1991 Hirose et al.
5,389,745 A *  2/1995 Sakamoto .............. 178/18.03

(Continued)

FOREIGN PATENT DOCUMENTS

BE    1011062    4/1999

(Continued)

OTHER PUBLICATIONS

XP010328169, Mar. 15, 1999, Chardon et al.

(Continued)

*Primary Examiner*—Matthew C Bella
*Assistant Examiner*—Alex Liew
(74) *Attorney, Agent, or Firm*—Roylance, Abrams, Berdo & Goodman, L.L.P.

(57) ABSTRACT

A method and apparatus are provided for enabling a mobile terminal equipped with a camera to store document information. An image of a document picked up by the camera is displayed. In response to a document "RECOGNIZE" key input, a character image is recognized from the displayed document image and the character image is converted into character data. The character data is displayed on the first display area, and SAVE items are displayed on the second display area. A SAVE item is selected from the displayed SAVE items and character data associated with the selected SAVE item is selected, such that the selected SAVE item and the character data associated with the selected SAVE item can be displayed on the third display area. When a "CORRECT" key is input, candidate characters associated with an erroneously recognized character are displayed on the third display area. After the erroneously recognized character is corrected or replaced with a selected candidate character, a result of the correction is displayed on the third display area. When a "CONFIRM" key is input, the SAVE item and character data displayed on the third display area are stored.

32 Claims, 45 Drawing Sheets

U.S. PATENT DOCUMENTS

| | | | |
|---|---|---|---|
| 5,465,304 A | 11/1995 | Cullen et al. | |
| 5,568,571 A | 10/1996 | Willis et al. | |
| 5,855,000 A | 12/1998 | Waibel et al. | |
| 6,334,003 B1 * | 12/2001 | Yokota | 382/313 |
| 6,661,919 B2 * | 12/2003 | Nicholson et al. | 382/173 |
| 6,705,872 B2 * | 3/2004 | Pearson et al. | 434/322 |
| 6,956,968 B1 * | 10/2005 | O'Dell et al. | 382/182 |
| 7,257,273 B2 * | 8/2007 | Li et al. | 382/286 |
| 2002/0165803 A1 * | 11/2002 | Iwase et al. | 705/28 |
| 2004/0120598 A1 * | 6/2004 | Feng | 382/263 |
| 2004/0161151 A1 * | 8/2004 | Iwayama et al. | 382/187 |

FOREIGN PATENT DOCUMENTS

| | | |
|---|---|---|
| CN | 1247348 A | 3/2000 |
| DE | 10104270 A1 | 8/2002 |
| EP | 1 117 072 A1 | 7/2001 |
| JP | 2001-291056 | 10/2001 |
| KR | 10 20030063249 A | 7/2003 |

OTHER PUBLICATIONS

XP000475819, Oct. 1994, IBM.

* cited by examiner

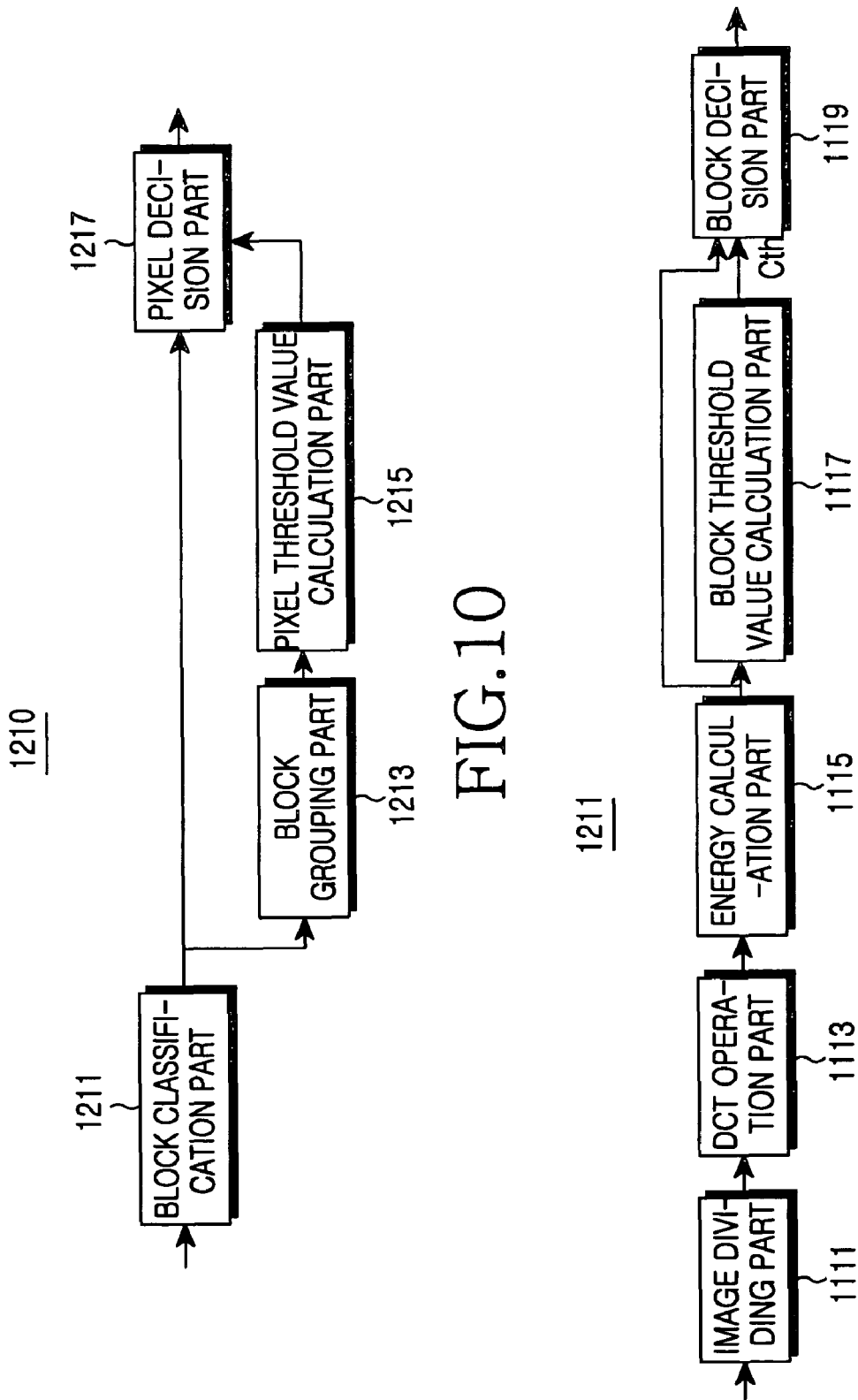

| $y_4$ | $y_3$ | $y_2$ |
|---|---|---|
| $y_5$ | $y_0$ | $y_1$ |
| $y_6$ | $y_7$ | $y_8$ |

APPARATUS AND METHOD FOR RECOGNIZING A CHARACTER IMAGE FROM AN IMAGE SCREEN

PRIORITY

This application claims priority to an application entitled "APPARATUS AND METHOD FOR RECOGNIZING CHARACTER IMAGE FROM IMAGE SCREEN", filed in the Korean Intellectual Property Office on Sep. 11, 2002 and Jul. 31, 2003 and assigned Serial Nos. 2002-55148 and 2003-53137, respectively, the contents of which are incorporated herein by reference.

BACKGROUND OF THE INVENTION

1. Field of the Invention

The present invention relates to a character recognition apparatus and method, and more particularly to an apparatus and method for recognizing a character image from an image or picture screen.

2. Description of the Related Art

Mobile terminals have recently developed the capability of transmitting high-speed data. In particular, mobile communication networks based on an International Mobile Telecommunication-2000 (IMT-2000) standard can implement high-speed data communications using small-sized mobile terminals. The data for performing the data communications can be packet data and image or picture data.

As a keypad with limited capabilities is used when the above-described mobile terminals receive input information, a character input method is complex. When the mobile terminals use an input unit based on a soft keyboard, a character input rate is slow and a character input method is very complex. Thus, a character recognition device and/or speech recognition device can be used to address a drawback of the soft keyboard. However, there is a problem in that character recognition and input rates are slow where a handwritten character recognition device is used. Similarly, when the speech recognition device is used, there is a problem in that only a limited number of words can be recognized. For this reason, a keyboard input unit including a separate hardware device can be used to input characters. However, the above-described method has a problem in that an additional device for inputting characters must be provided in the mobile terminals.

Currently an image processing function is added to the mobile terminal and hence the mobile terminal can have a composite function. In this case, an image processing device of the mobile terminal includes a camera for detecting an image and a display unit for displaying signals of the image picked up by the camera. Here, the camera can use a Charge Coupled Device (CCD) image sensor or a Complementary Metal Oxide Semiconductor (CMOS) image sensor, and the display unit can use an Liquid Crystal Display (LCD). As small-sized camera devices have been developed, image pickup devices are currently miniaturized. In this case, the mobile terminal can perform an image pickup operation, display a moving picture and a still picture on a screen, and transmit detected images. However, the mobile terminal equipped with the camera performs only functions of detecting, storing, managing and transmitting images or pictures.

The mobile terminal can be a mobile phone or Personal Digital Assistant (PDA). In a character input method of the PDA, characters based on a soft keypad are input with a stylus pen or characters are input through handwritten character recognition. However, where a large number of characters are input by the conventional character input methods, users feel inconvenienced because of a slow process rate and the complexity of the process. In particular, when contents of a card bearing a person's name and other information are input into the PDA, a lot of time and effort are required. Thus, a method capable of improving current input methods or facilitating the convenience of the users is seriously required.

SUMMARY OF THE INVENTION

Therefore, the present invention has been made in view of the above problems, and it is an object of the present invention to provide an apparatus and method, which can recognize a character image from an image or picture screen by means of a device having an image processing function.

It is another object of the present invention to provide an apparatus and method, which can recognize a character image from an image or picture screen by means of a device having an image processing function and can save the recognized character image in a set document form.

It is another object of the present invention to provide an apparatus and method, which can recognize a character image from an image or picture screen by means of a device having an image processing function and can correct erroneously recognized characters contained in the recognized character image.

It is another object of the present invention to provide an apparatus and method, which can extract a character image from an image or picture screen by means of a device having an image processing function and can pre-process the extracted character image to convert it into a recognizable form.

It is another object of the present invention to provide an apparatus and method, which can detect a document using a camera with which a terminal device is equipped, recognize characters from an image of the detected document, and correct erroneously recognized characters using a candidate character table in a correction process.

It is another object of the present invention to provide an apparatus and method, which can detect a document using a camera. A speech recognizer with which a terminal is equipped, recognizes characters from an image of the detected document, and corrects erroneously recognized characters.

It is another object of the present invention to provide an apparatus and method, which can detect a document using a camera with which a terminal is equipped, recognize characters from an image of the detected document, and correct erroneously recognized characters in a correction process by recognizing handwritten characters input by a user.

It is another object of the present invention to provide an apparatus and method, which can detect a document using a camera with which a terminal is equipped, recognize an image of the detected document as characters, and correct erroneous characters using a soft keypad in a correction process.

It is yet another object of the present invention to provide an apparatus and method, which can detect a document containing phone book information using a camera with which a mobile communication terminal is equipped, and recognize and save the phone book information contained within an image of the detected document.

BRIEF DESCRIPTION OF THE DRAWINGS

The above and other objects, features and other advantages of the present invention will be more clearly understood from the following detailed description taken in conjunction with the accompanying drawings, in which:

FIG. 10 is a block diagram illustrating an example of the configuration of a binarization part shown in FIG. 9 in accordance with an embodiment of the present invention;

FIG. 11 is a block diagram illustrating an example of the configuration of a block classification part shown in FIG. 10 in accordance with an embodiment of the present invention;

DETAILED DESCRIPTION OF THE PREFERRED EMBODIMENTS

Figure 1:
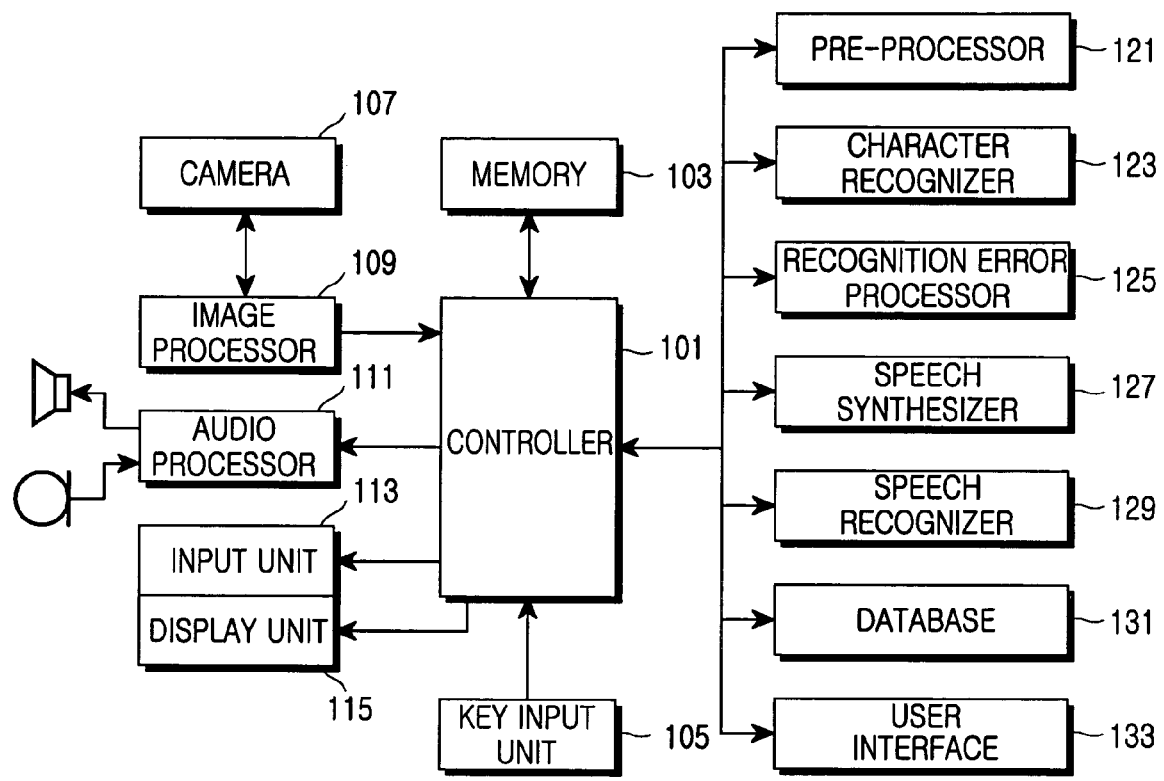
FIG. 1 is a block diagram illustrating an exemplary configuration of an apparatus for recognizing characters in accordance with an embodiment of the present invention.

In accordance with embodiments of the present invention, a terminal device having an image processing function recognizes a character image from an image or picture screen and then saves the recognized character image in the form of a document. In other words, when the character image is recognized and the recognized character image is stored as the document in accordance with the embodiments of the present invention, a user's ability to input characters can be improved, a user manipulation of an input unit can be simplified, characters erroneously recognized in a character recognition process can be easily corrected by speech recognition, and a large amount of text can be input.

To substantially accomplish this, the terminal device of the present invention has a function for pre-processing the character image contained in an image screen before the character image is recognized from the image screen, a function for recognizing the character image from the pre-processed image, and a function for correcting erroneously recognized character information of the recognized character image. Furthermore, in order for the erroneously recognized character information to be corrected, the terminal device of the present invention can be equipped with a user interface for correction having a speech recognition function necessary for correcting erroneously recognized characters by speech, a handwritten character recognition function necessary for correcting erroneously recognized characters on the basis of a handwritten character input, a function of displaying and selecting candidate characters similar to erroneously recognized characters and/or a function of inputting characters corresponding to the erroneously recognized characters with a soft keypad.

The terminal device according to an embodiment of the present invention includes the above-described elements, recognizes a character image from an image or picture screen, edits a document of the recognized character image and saves the edited document. The document can be based on a predetermined format. The terminal device is equipped with the camera and can be a device for detecting the document to be recognized through the camera and recognizing the character image from a detected document image. Further, the terminal device is a device having a communication function, and can recognize a character image from a received image and save the recognized character image as a document. Furthermore, the terminal device includes an external input device, and can save an image input from the external input device, recognize a character image from the stored image, and save the recognized image as a document.

To implement the above-described functions, it is preferable that a camera capable of performing fine focus adjustment is used in the terminal device. The fine focus adjustment is used to enhance the resolution of a document image to be recognized.

As described above, an image pre-processing function for character recognition needs the support of hardware and software specifications. The hardware specification must support a fine focus adjustment function for a detected image, ensure the minimum display rate of 12 fps so that an optimum focus state can be confirmed in a focus adjustment process, and ensure an excellent lens necessary for acquiring the best image quality for character recognition. A software pre-process must be able to remove image distortion from an original camera image obtained via a pinhole lens, remove distortion caused by a focus mismatch of an image picked up in a near view field from the image, determine whether character size and focus adjustments are appropriate for character recognition, remove image distortion caused by non-vertical projection for an object from the image, and binarize character data being an object under various illumination conditions.

As described above, the character recognition function is needed to recognize an image of a document picked up by the camera. For the character recognition, an engine for recognizing optical characters must be developed, an amount of processable data associated with the engine must be less than a predetermined amount of processable data (e.g., 5 Mbytes), various fonts of printed English letters, Korean characters and digits must be able to be recognized, and a minimum recognition percentage per character must be 80%. Further, it is preferable that a speech recognition module be provided in the terminal device so that an erroneous character can be corrected in an error correction process. Furthermore, a user interface for a text input by the character recognition and speech recognition must be implemented.

We assume that the terminal device in accordance with an embodiment of the present invention is a Personal Digital Assistant (PDA), and a detected document is a card bearing a person's name and other information. An image of the card is detected, the detected image is pre-processed, a character image is extracted from the pre-processed image, the extracted character image is recognized, the recognized character image is converted into character data, erroneously recognized character data is corrected, and the corrected character data is stored in a phone book. This example will now be described in detail.

In accordance with the embodiment of the present invention, the following method can easily input, into the PDA, a document having a large amount of information such as the card bearing a person's name and other information using various input units (e.g., a character recognizer, a speech recognizer, a pen and a keyboard).

First, an image of the card or document is detected using a camera embedded in the PDA, a character image contained within the detected image is pre-processed by a pre-processor so that a clear character image can be produced, the pre-processed character image is recognized by the character recognizer, and the recognized character image is converted into character data. Erroneously recognized character data is corrected using various devices such as a stylus pen, a speech recognizer, a handwritten character recognizer, a soft keypad, etc. and the character data is stored in a desired storage area of a database.

FIG. 1 is a block diagram illustrating an exemplary configuration of a mobile terminal for recognizing a character image from an image screen in accordance with an embodiment of the present invention.

Referring to FIG. 1, the mobile terminal includes a controller 101 for controlling an overall operation of the mobile terminal that recognizes a document. A memory 103 performs a function of storing a program for controlling the operation of the mobile terminal or temporarily storing data generated while the program is executed.

A camera 107 performs a function of detecting an image of the document. Here, the document can be a card bearing a person's name and other information. The camera 107 can perform a pre-processing function. In other words, the camera 107 can adjust a focus and focal distance for an object, and enhance the quality of the detected image. An image processor 109 can perform functions of converting the detected image into digital data and compressing the digital data. The image processor 109 can use an image processor disclosed in Korean Patent Application No. 2002-22844 previously filed by the applicant of the present invention.

An audio processor 111 processes a speech signal used for correcting an erroneous character generated while the program is executed, and processes a speech signal used for displaying a result of the execution and guidance while the program is executed. An input unit 113 e.g., a touch screen module can be unified with a display unit 115.

The input unit 113 allows a user to input a desired character and a function key using a stylus pen. The input unit 113 includes a "SHOOT" key, a "RECOGNIZE" key, a "CONFIRM" key, a "CORRECT" key, an "END" key, an "INSERT" key, a "CANCEL" key, etc. The "SHOOT" key is used for detecting an image, displaying the detected image and storing the detected image displayed on a screen. The "RECOGNIZE" key is used for recognizing a character image from a currently displayed image screen. Where recognized documents have different specific formats, different document recognition keys can be provided. For example, where a document is a card bearing a person's name and other information, the document information can configure a phone book of the mobile terminal. In this case, a card "RECOGNIZE" key is provided on the input unit 113. If common information items recorded on cards are selectively stored in a table, the mobile terminal's phone book can be easily created. The "CONFIRM" key is used for registering character data of a selected item. The "CORRECT" key is used for correcting character data of a selected item. The "INSERT" key is used for inserting a character in a selected text position at which a cursor is placed. In other words, where at least one character is omitted from a text of a character recognition result, a new character can be inserted before a cursor position. The "CANCEL" key is used for canceling character data of a selected item. The "END" key is used for completing a current operation.

A key input unit 105 includes function keys for setting various functions of the mobile terminal. Here, the function keys capable of being arranged on the key input unit 105 include a speech "RECOGNIZE" key for driving the speech recognizer 129, a focus and focal distance adjustment key for controlling a preprocessing operation of the camera 107 and a "SHOOT" key for storing a preview image output by the camera 107. Of course, the keys arranged on the key input unit 105 can be provided in the input unit 113. In an embodiment of the present invention, all function keys are arranged on the input unit 113 for convenience of explanation. Here, the camera 107, the input unit 113, the audio processor 111 and the key input unit 105 can operate as an input device, respectively.

The display unit 115 performs a function of displaying a result of a character recognition process performed in accordance with the embodiment of the present invention. In other words, the display unit 115 displays an image detected by the camera 107 as a preview screen and displays the result of the character recognition in a character recognition mode. The display unit 115 includes a display area capable of displaying a result of an error correction process. The display unit 115 includes the first display area 71, the second display area 75 and the third display area 73 (See FIG. 27A). The first display area 71 displays recognized character data, the third display area 73 displays character data associated with a selected SAVE item or candidate character data for the error correction process, and the second display area 75 can include a display area for selectively displaying SAVE item information, handwritten characters input to correct an error and/or a soft keypad for inputting desired characters using soft keys. A specific area for displaying menu information for various command inputs in the character recognition process can be appropriately positioned in the first, second and third display areas 71, 75 and 73 in accordance with the embodiment of the present invention.

When a character "RECOGNIZE" key is input from the input unit 113, a controller 101 drives a pre-processor 121 and a character recognizer 123.

First, the pre-processor 121 receives an input image or picture displayed on the display unit 115 and pre-processes the input picture or image. The pre-processor 121 determines whether the input image or picture has a recognizable resolution or is a blurred image or picture. The pre-processor 121 notifies the controller 101 of a result of the determination. If the input image or picture is decided to be a blurred image or picture, the controller 101 displays information indicating a recognition unable state on the display unit 115. On the other hand, if the input image is decided not to be a blurred image, the pre-processor 121 determines the existence of an object skew, and then corrects the object skew. The pre-processor 121 removes a region in which no image exists, and extends a region in which an image exists or an Region Of Contents (ROC). The pre-processor 121 reduces noise components of the image, and binarizes pixels of the image to output the binarized pixels. Here, the pre-processor 121 performs the above-described image blur determination, skew correction, ROC extension, noise reduction and image binarization functions. The pre-processor 121 can perform only part of the above-described functions.

Second, the character recognizer 123 performs a function of recognizing at least one character image from the input image pre-processed by the pre-processor 121 and converting the recognized character image into character data. Further, recognized character data is displayed on the first display area 71 of the display unit 115 under the control of the controller 101. Here, the character recognizer 123 can be configured by a printed-character recognition module and a handwritten character recognition module. The printed-character recognition module can be used for recognizing a character image from the input image pre-processed by the pre-processor 121, and the handwritten character recognition module can be used for recognizing a handwritten character image input in the error correction process. The character recognizer 123 can include a module capable of converting soft key data input from the soft keypad into characters.

The controller 101 drives a recognition error processor 125 when an error "CORRECT" key is input from the input unit 113. The recognition error processor 125 corrects erroneous characters in the character recognition process by correcting or replacing the erroneous characters selected from the character data displayed on the first display area 71 with correction characters produced by the speech recognizer 129 or the character recognizer 123.

The controller 101 drives the speech recognizer 129 when the speech "RECOGNIZE" key is input in a state where the error "CORRECT" key is input. The speech recognizer 129 recognizes a speech signal received from the audio processor 111. The speech signal is input so that a desired item can be selected for error correction and an erroneous character associated with the selected item can be corrected. The speech recognizer 129 performs a function of converting the speech signal, input for correcting the erroneous character, into character data. Under the control of the controller 101, a speech synthesizer 127 performs a function of synthesizing speech signals of character data as a result of the recognition and outputting the synthesized speech signals in a speech output mode. In other words, under the control of the controller 101, the speech recognizer 129 performs a function of converting a speech signal input for correcting erroneously recognized character data in the recognition process into character data, and carrying out the error correction process. After completing the speech recognition, the speech synthesizer 127 performs a function of synthesizing speech signals of character data stored after completion of the speech recognition and outputting the synthesized speech signals.

Under the control of the controller 101, a database 131 performs a storage function so that a plurality of the recognized character data correspond to respective items. Here, where a document having the recognized character data is a card having a person's name and other information, the database 131 can be a phone book memory or an address book memory. A user interface 133 performs a function of interfacing user data coupled to the terminal device with the mobile terminal.

As described above, the mobile terminal in accordance with the embodiment of the present invention is configured by a camera module, an input module (containing a touch screen), an audio module, a pre-processing module, a character recognition module, a recognition error correction module, a synthesis module, a user interface module, etc. The mobile terminal is operated by six processes on a large scale. The six processes may be but is not limited to an image input process, an image pre-process, a character recognition process, a SAVE item selection process, an error correction process and a storage process. The processes are organically coupled with one another, and can be implemented by various methods. Major modules used for the respective processes will be briefly described. The image input process is performed by the camera module, the image pre-process is performed by the pre-processing module, the character recognition process is performed by the character recognition module and the speech recognition module, the SAVE item selection process is performed by the speech recognition module and the input module (containing a stylus pen), and the error correction process is performed by the speech recognition module, the input module (containing the stylus pen), the handwritten character recognition module and a soft key recognition module, and the storage process is performed by a database module.

The document recognition process can be implemented by various methods. In accordance with the first embodiment of the present invention shown in FIG. 2, a document image is detected, a character image contained in the document image is pre-processed, characters are recognized from the character image, SAVE items associated with the recognized characters are selected, a plurality of erroneously recognized character data corresponding to the selected items are corrected, and a plurality of corrected character data is simultaneously stored. Further, in accordance with a second embodiment of the present invention, a document image is picked up, a character image contained in the document image is pre-processed, character data is recognized from the pre-processed character image, an error correction item is selected, an erroneously recognized character is corrected, the corrected character is stored, and the next error correction item is subsequently selected. Here, in accordance with the first and second embodiments, the document to be recognized is detected as the image as an example. However, the process of detecting the document image can be omitted. In other words, where a character recognition function is selected after the terminal device selects a stored image or an externally input image, the above-described operations can be equally performed so that the document image is recognized.

Hereinafter, it is explained that the error correction item selection and error correction processes are implemented by a document recognizer in accordance with the first embodiment of the present invention, and are implemented by the document recognizer and the speech recognizer in accordance with the second embodiment of the present invention. However, the document recognition and correction can be performed using the document recognizer and the speech recognizer in the first embodiment, and can be performed using only the document recognizer in the second embodiment.

First, a document recognition method will be described in accordance with the first embodiment of the present invention.

Figure 2:
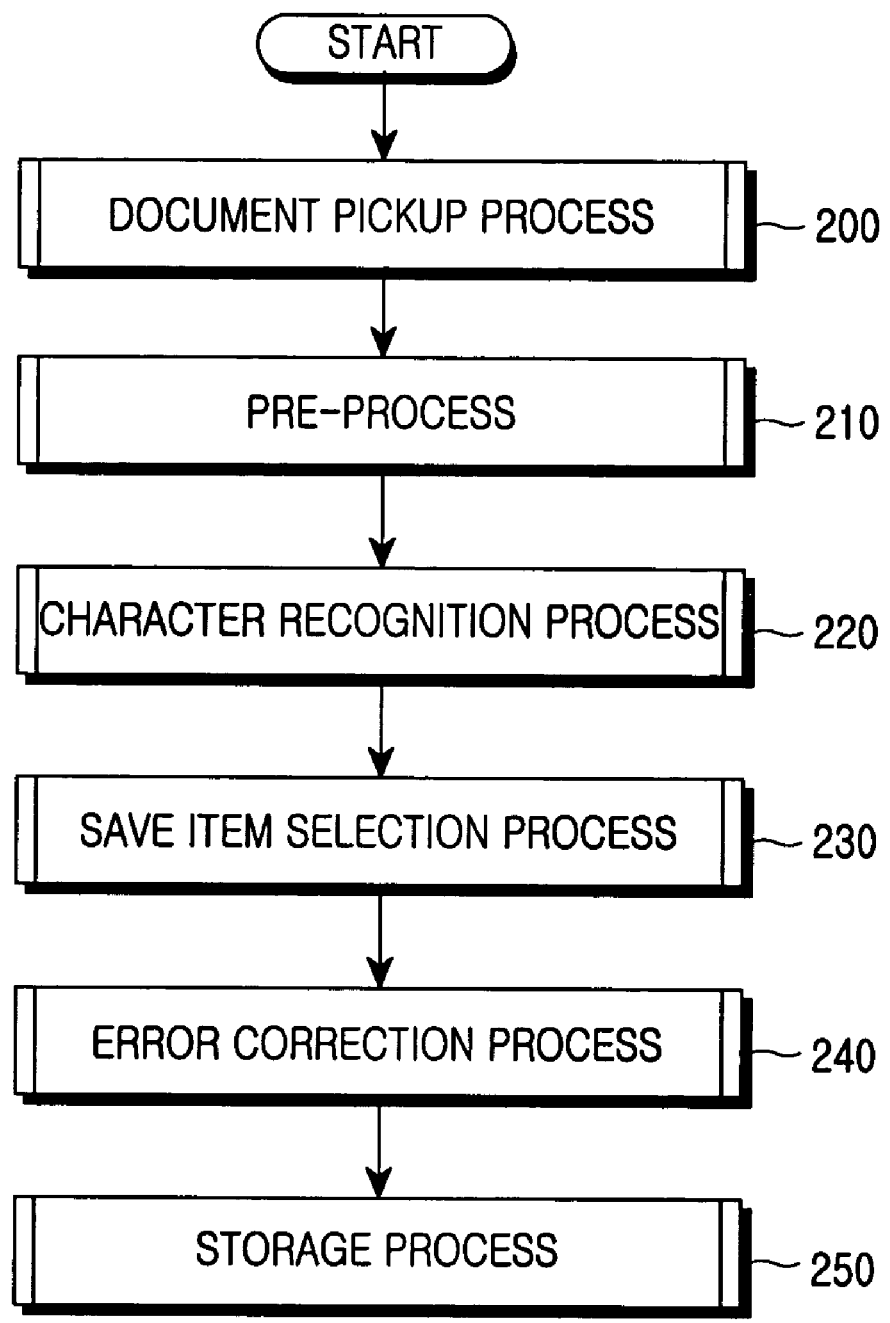
FIG. 2 is a flow chart illustrating an example of a character recognition method in accordance with the first embodiment of the present invention.

FIG. 2 is a flow chart illustrating an example of the character recognition method in accordance with the first embodiment of the present invention.

Referring to FIG. 2, the controller 101 enables a camera 107 to detect a document image so that the document image to be recognized can be produced at step 200. At this time, the document image detected by the camera 107 is converted into digital data by the image processor 109, and the digital data is displayed on the display unit 115. The detected image can be a moving picture or a still picture. Where the moving picture is detected, the controller 101 enables the display unit 115 to display the detected moving picture in the form of a preview image. When a still-picture capture command is issued when the moving picture is displayed on the display unit 115, the controller 101 enables the display unit 115 to display a still picture. An image displayed on the display unit 115 is stored in an image memory area of the memory 103. The image displayed on the display unit 115 can be a general image, and can be another image including a character image corresponding to a card bearing a person's name and other information, etc. It can be assumed that the detected image includes the character image in accordance with the embodiment of the present invention.

The above step 200 can be selectively omitted. In this case, a stored image or input image can be displayed on the display unit 115 by a user. In other words, if the user desires the document to be recognized, the stored image or input image is selectively displayed, and a character recognition process can be performed while the image is displayed.

In the above-described state, when the user of the terminal device inputs a key for recognizing character images contained in the currently displayed image through the input unit 113, the document recognition method is performed in accordance with the embodiment of the present invention. Here, it can be assumed that the recognition key is a document "RECOGNIZE" key. The controller 101 drives the pre-processor 121 in response to an input of a document input key at step 210. The pre-processor 121 is configured by a blurred-image detection part, a skew correction part, a Region Of Contents (ROC) extension part, a noise reduction part and an image binarization part. Detailed operation of the pre-processor 121 will be described in detail with reference to FIG. 4.

After the image is completely pre-processed, the pre-processed image is input into the character recognizer 123 in step 220. The character recognizer 123 recognizes a character image from the pre-processed image and converts the recognized character image into character data. Here, the character recognizer 123 can use a corresponding recognizer based on language. In the embodiment of the present invention, ABBYY's FineReader 5.0™ office trial version for mainly recognizing English language can be used where the character data is English, and HIART's GN2000™ version for recognizing Korean and English languages can be used where the character data is Korean. The controller 101 enables the first display area 71 of the display unit 115 to display the character data recognized by the character recognizer 123, and enables the second display area 75 of the display unit 115 to display item information based on a type of a document input key.

Then, when the user selects the recognized character data displayed on the first display area 71 of the display unit 115 and a SAVE item displayed on the second display area 75, the controller 101 enables the third display area 73 of the display unit 115 to display the selected character data and SAVE item at step 230. Only desired SAVE items associated with the recognized document items can be selected and stored. For example, a card, e.g. business card, includes many items, such as a person's name, a mobile phone number, an e-mail address, a company address, a company phone number, a facsimile number, etc. In this case, the user can select desired items from among the many items and store the selected items in the terminal device.

When the "CORRECT" key is input, the controller 101 performs step 240 so that erroneously recognized characters of the recognized character data can be corrected. At this time, the correction method displays a group of candidate or possible characters associated with the erroneously recognized characters. If one of the candidate characters is selected, the controller 101 corrects or replaces an erroneously recognized character with the selected candidate character. However, where an erroneously recognized character cannot be corrected or replaced with any candidate character, the user inputs a handwritten character for correction through the input unit 113, and the controller 101 drives the character recognizer 123 so that the handwritten character can be recognized and the error correction process can be performed. Further, the soft keypad is provided in addition to the handwritten character recognition module. In this case, a method for analyzing soft key data input from the soft keypad and correcting or replacing erroneously recognized characters with the soft key data is enabled.

Even though the order of the SAVE item selection process at the above step 230 and the error correction process at the above step 240 is changed, the same advantageous effect can be achieved.

After the error correction process is completed, the controller 101 stores the completely corrected character data in the database 131.

Figure 3:
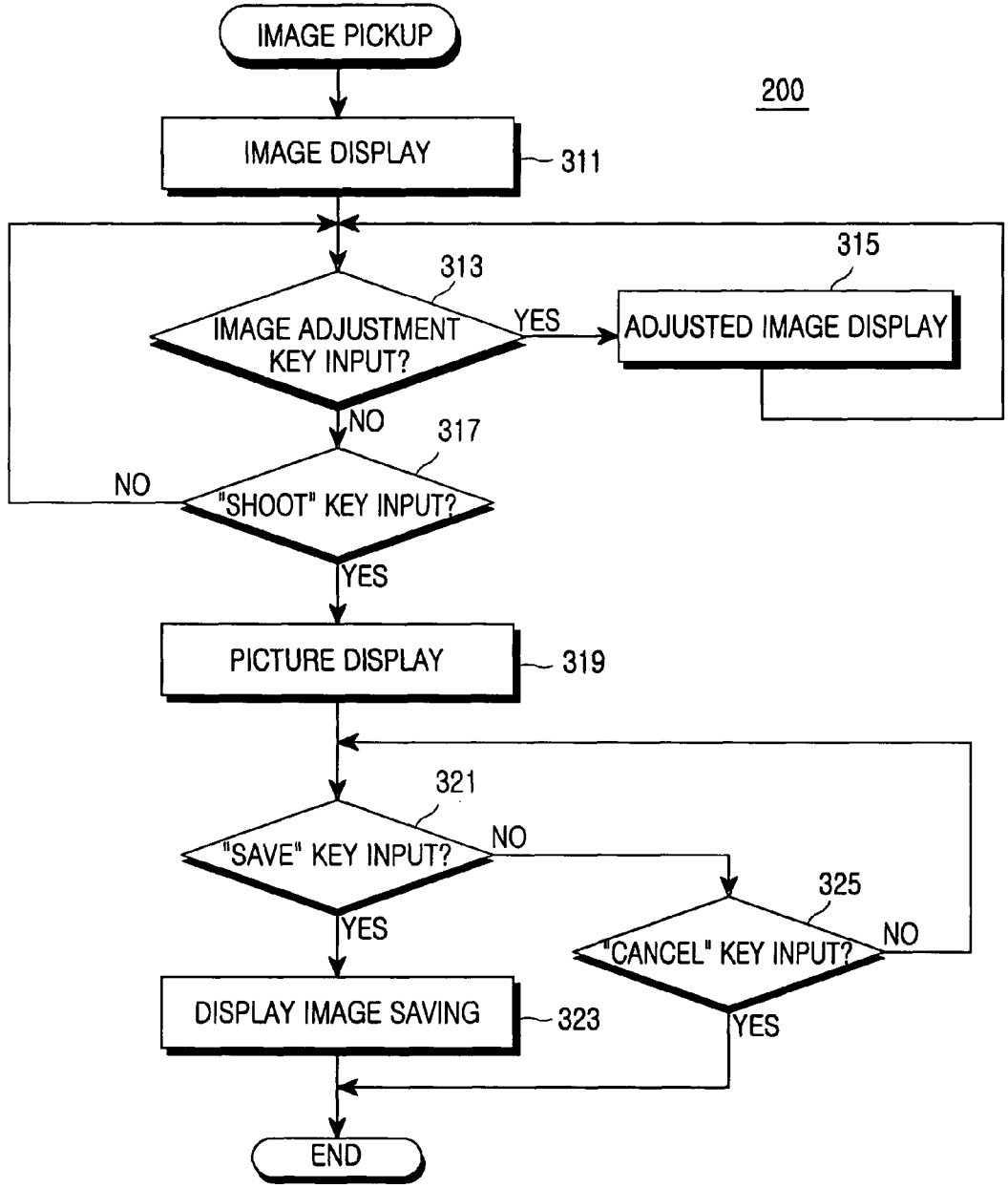
FIG. 3 is a detailed flow chart illustrating an example of a document detection process shown in FIG. 2 in accordance with an embodiment of the present invention.

FIG. 3 is a flow chart illustrating an example of the document detection process performed at the above step 210 shown in FIG. 2 in accordance with an embodiment of the present invention.

Figure 26A:
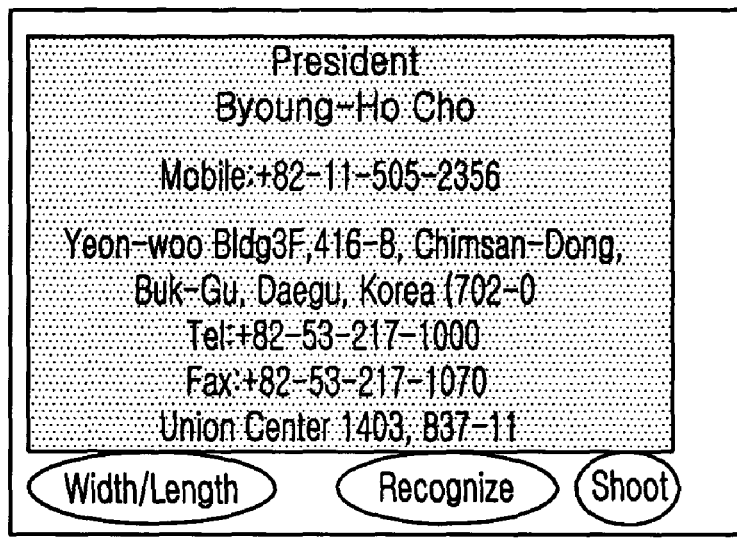
FIGS. 26A to 26E are views illustrating examples of display screen states of a display unit in a document detection process in accordance with an embodiment of the present invention.
Figure 26B:
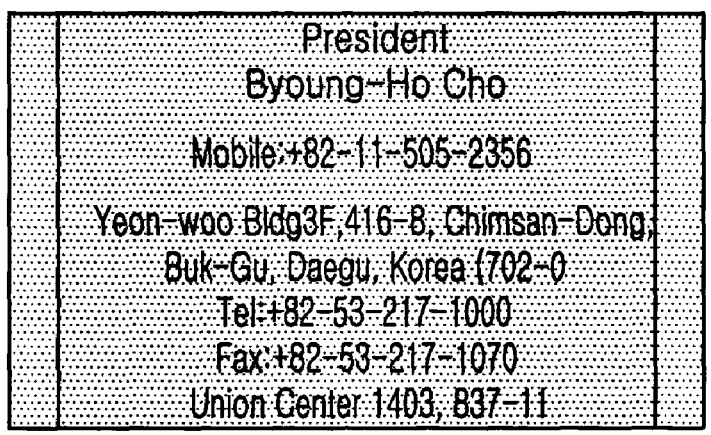

Referring to FIG. 3, the user puts a desired document to be recognized in an appropriate position, and detects the desired document using the camera 107 provided in the terminal device. An image of the desired document detected by the camera 107 is processed by the image processor 109, and the processed image is displayed on the display unit 115. At this time, if the user of the terminal device inputs a camera adjustment key arranged on the key input unit 105 or the input unit 113, the controller 101 detects the camera adjustment key input at step 313 and controls the camera 107 at step 315. The adjustment of the camera 107 can be focal distance and exposure time adjustments. Here, a focal distance adjustment method performs a zoom function and adjusts a focal distance between the object and the terminal device, or can be a method allowing the user to shift the terminal device. Further, an exposure time adjustment method can control the exposure of an image sensor provided in the camera 107. The above-described adjustment operations can be omitted or only one of the adjustment methods can be used. A document pickup method can detect the total document or can detect desired part of the document. As shown in FIGS. 26A and 26B, the detected document is a card bearing a person's name and other information and an example in which part of the card is detected is shown.

Figure 26C:
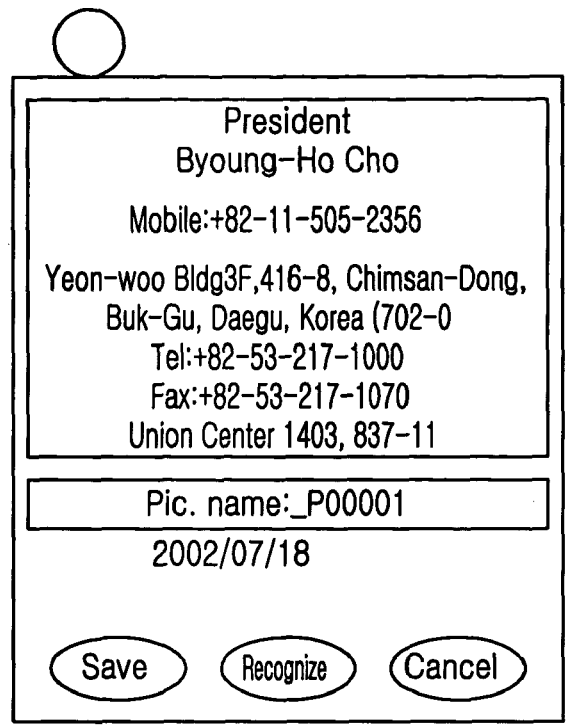
Figure 26D:
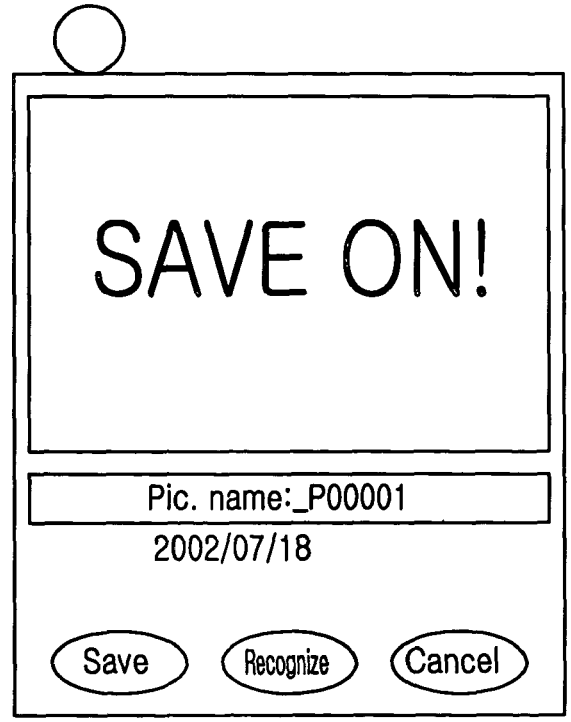
Figure 26E:
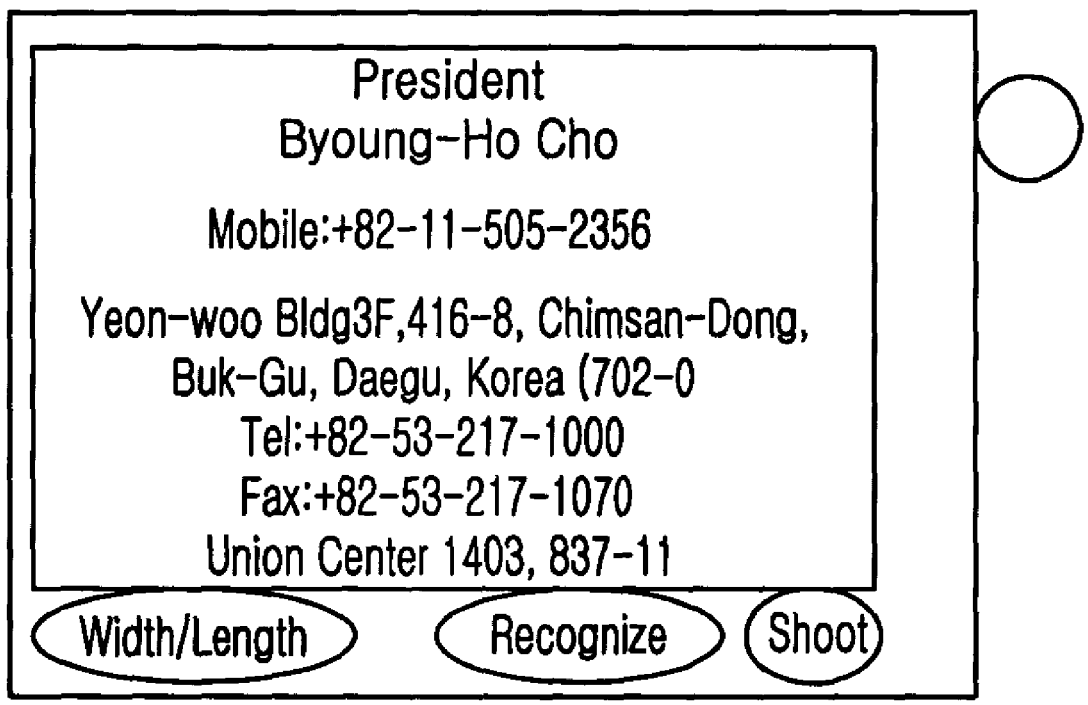

An image of the detected document is displayed on the display unit 115 as shown in FIG. 26A. When the user inputs a "SHOOT" key of the input unit 113 using the stylus pen or inputs a still-picture capture key of the key input unit 105, the controller 101 detects the key input at step 317 and enables the display unit 115 to display a still picture corresponding to the document image when the "SHOOT" key is input as shown in FIG. 26C at step 319. If the document image displayed on the display unit 115 as shown in FIG. 26A is good, the user inputs the "SAVE" key arranged on the input unit 113 using the stylus pen. If the "SAVE" key is input, the controller 101 detects the "SAVE" key input at step 321, and store the document image along with a name of the document image in the image memory area of the memory 103. At this time, while the above steps 321 and 323 are being performed, the display unit 115 performs display operations as shown in FIGS. 26C to 26E. However, when the user inputs a "CANCEL" key, the controller 101 detects the "CANCEL" key input at step 325 and stops or terminates an operation for displaying the document image.

In the document detection process at the above step 200 of FIG. 2, an image desired by the user is input through the camera, and the user stores the image for character recognition after enhancing resolution of the input image through fine adjustment to acquire a clear image. Then, characters are extracted from the detected image by the character recognition process and a determination is made as to whether characters will be stored as character data (text) or a photo.

Here, the process for detecting the document image to be recognized using the camera and acquiring the detected image has been described. However, the document image can be a stored document image or an externally input document image. At this time, if the user of the mobile terminal makes a recognition request, a pre-process is performed at step 210, and subsequently a process of recognizing characters from the pre-processed image is performed at the above step 220 as shown in FIG. 2.

Figure 4:
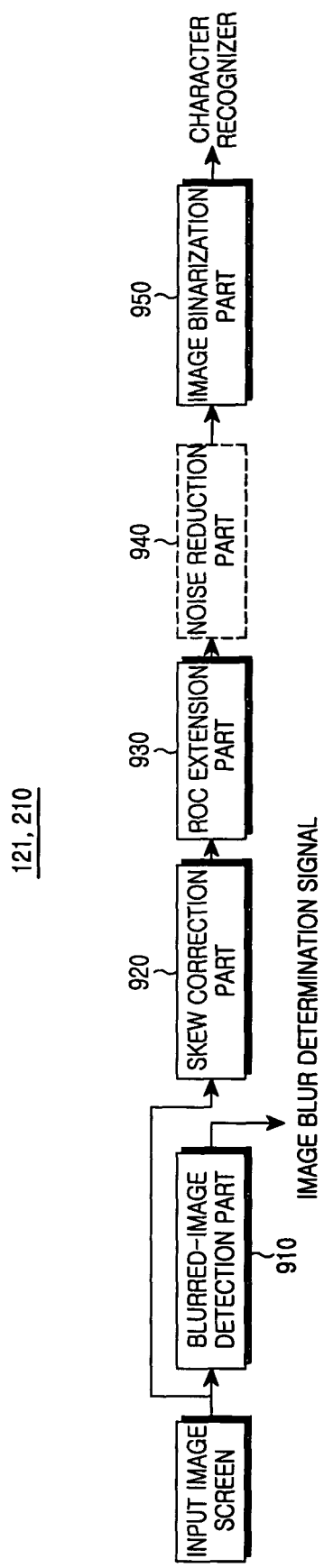
FIG. 4 is a block diagram illustrating an example of the configuration of a pre-processor 121 contained in a document image processing device in accordance with an embodiment of the present invention.

FIG. 4 is a block diagram illustrating an example of a configuration of the pre-processor 121 shown in FIG. 1 in accordance with an embodiment of the present invention.

Referring to FIG. 4, an input signal, that is, an image signal, received by the pre-processor 121 can be generated from a communication interface including a camera, a scanner, a modem, a network, and the like or can be generated from a computer. Further, an input image received by the pre-processor 121 can be image signals stored in the memory 103.

A blurred-image detection part 910 classifies the input image into Character Blocks (CBs) and Background Blocks (BBs). The blurred-image detection part 910 calculates an average energy ratio for CBs, compares the average energy ratio with a preset threshold value, and determines whether the input image is blurred or not according to a result of the comparison. At this time, if the input image is blurred, the blurred-image detection part 910 notifies the controller 101 that the input image is blurred, and makes an image re-input request. On the other hand, if the input image is not blurred, the input image is transferred to a skew correction part 920. According to a result of the determination output from the blurred-image detection part 910, the controller 101 performs a control operation so that the image is re-generated or the image is pre-processed by the pre-processor 121.

The skew correction part 920 divides the input image into predetermined size-based blocks, classifies the blocks into CBs and BBs, and binarizes pixels of the blocks. A dilation operation for a region of the binarized CBs is performed, and candidate stripes in which neighboring characters are connected are generated. Candidate stripes having a predetermined length or above are selected from a total of candidate stripes. Direction angles of the selected candidate stripes are calculated, count values of the calculated direction angles are accumulated angle by angle, a direction angle having the largest count value is selected, and the selected direction angle is decided to be a skew angle of an object within the image. On the basis of the determined skew angle, an image signal is rotated and the skew of the object within the image is corrected. Specified pixels are filled in a region of the image in which no pixel exists, and an image having the same size as the input image is generated.

A ROC extension part 930 divides the image generated by the skew correction part 920 into the blocks, analyzes pixels contained in the blocks, classifies the blocks into CBs and BBs, and binarizes pixels of the CBs. A median filtering operation for the binarized image is performed, and an erroneously classified character region caused by an image rim or noise is removed. The median-filtered image is horizontally and vertically scanned, and a position of a character region is searched for. An image corresponding to the searched character region is extracted. The extracted image is extended on the basis of a size of the input image.

A noise reduction part 940 performs a function of reducing noise components contained in an output image from the ROC extension part 930.

Noise typically occurs when the image is obtained from the camera. Representative noise components among the noise components include Gaussian noise components. To reduce the Gaussian noise components, various types of noise reduction filters can be used. Where the image corresponds to a card bearing a person's name and other information, a large amount of information exists at edges of the character region. Accordingly, if a simple noise reduction filter is used where the image corresponds to the card, character information can be seriously damaged. It is preferable that the noise reduction part 940 uses a filter capable of reducing an image noise while conserving the information at the edges. Here, we assume that the noise reduction part 940 uses a special noise reduction filter such as a directional Lee filter.

The noise reduction part 940 can be located between the blurred-image detection part 910 and the skew correction part 920 or between the skew correction part 920 and the ROC extension part 930. Optionally, the noise reduction part 940 can be omitted.

An image binarization part 950 divides an output image from the ROC extension part 930 or an output image from the noise reduction part 940 into blocks having a predetermined size, analyzes pixels of the blocks, and classifies the blocks into CBs and BBs. Edges of the CBs are enhanced using relations between the character pixels of the CBs and their surrounding pixels, and pixels in which noise components are reduced are generated. Further, a threshold value used for binarizing the pixels is calculated. The image edge enhancement and noise reduction can use a Quadratic Filter (QF) or Improved Quadratic Filter (IQF). The pixels of the CBs and BBs in which the edges are enhanced and the noise components are reduced are compared with the threshold value and binarized, such that pixels of the first and second brightness values can be produced.

Binarized image information output from the image binarization part 950 is applied to the character recognizer 123 and the character recognizer 123 recognizes characters from the binarized image information.

In accordance with the embodiment of the present invention, the blurred-image detection part 910, the skew correction part 920, the ROC extension part 930, the noise reduction part 940 and the image binarization part 950 contained in the pre-processor 121 can be implemented as in the following figures.

Figure 5:
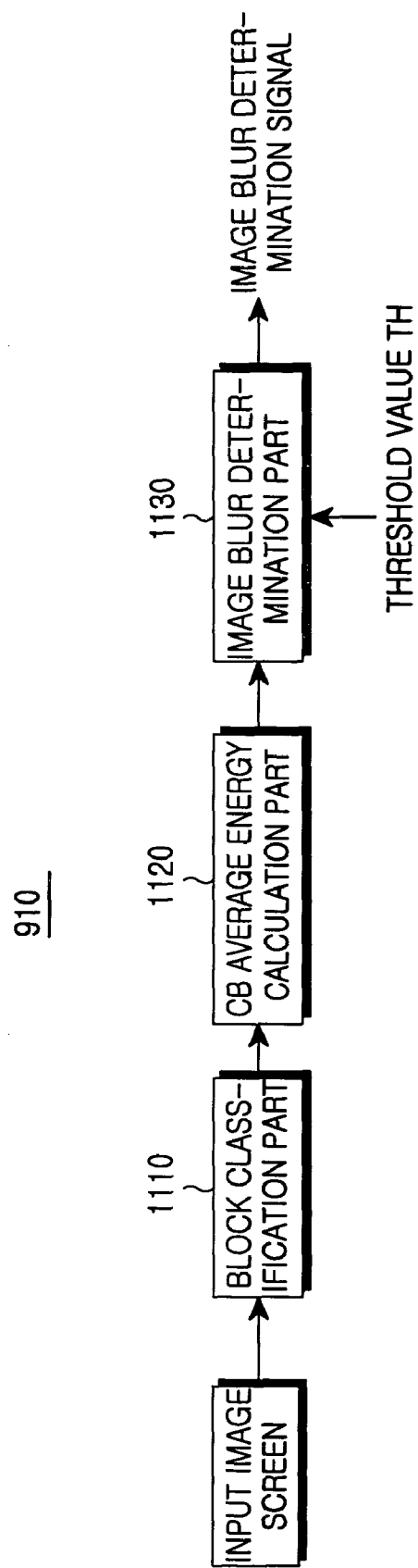
FIG. 5 is a block diagram illustrating an example of the configuration of a blurred-image detection part shown in FIG. 4 for detecting a blurred image in accordance with an embodiment of the present invention.
Figure 9:
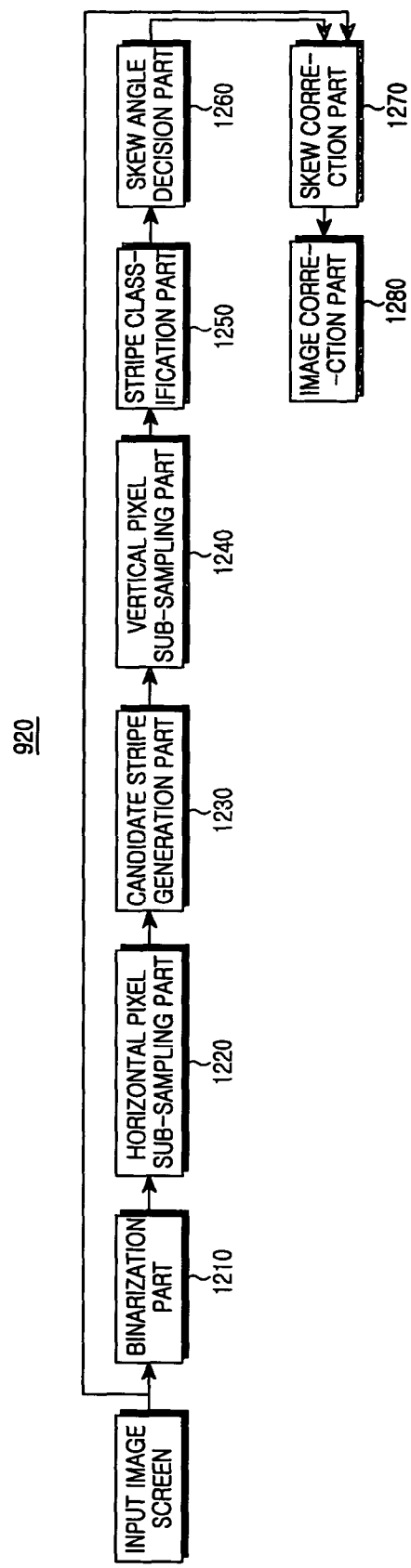
FIG. 9 is a block diagram illustrating an example of the configuration of a skew correction part for correcting a skew of an object within the image shown in FIG. 4 in accordance with an embodiment of the present invention.
Figure 14:
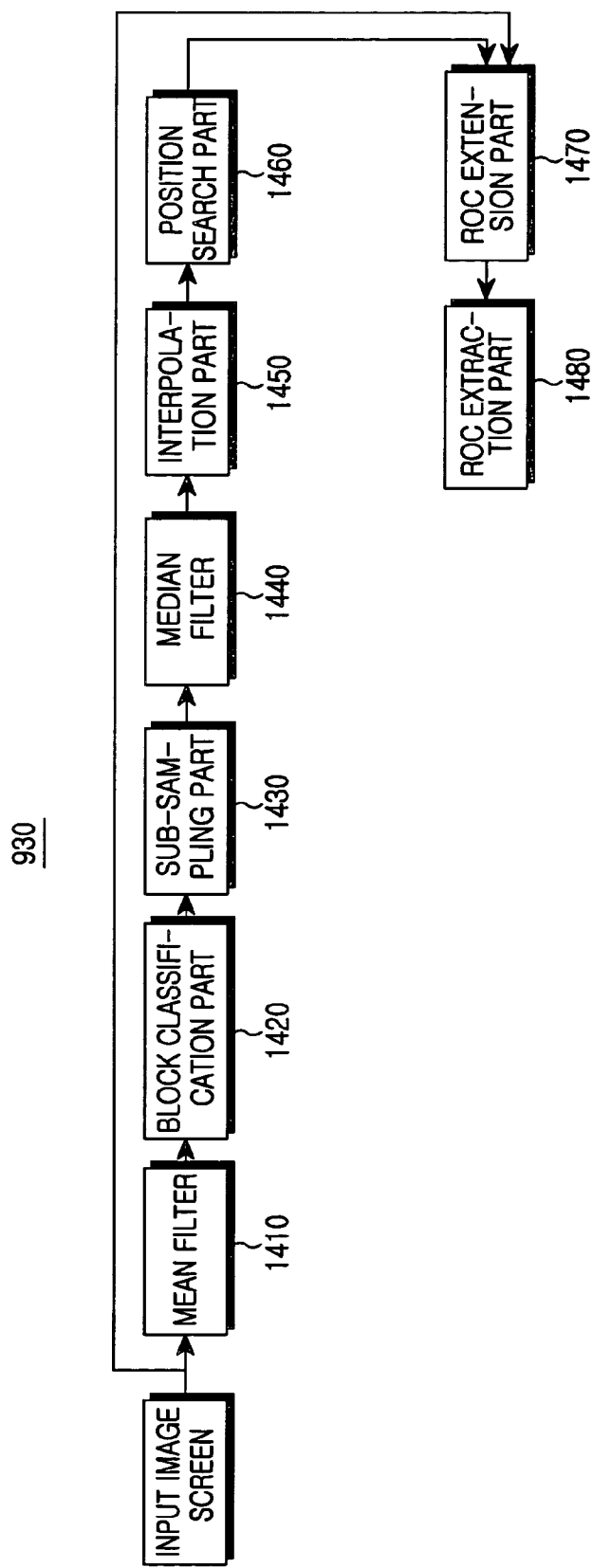
FIG. 14 is a block diagram illustrating an example of the configuration of an ROC (Region Of Contents) extension part for extending a character region contained within the image shown in FIG. 4 in accordance with an embodiment of the present invention.
Figure 19:
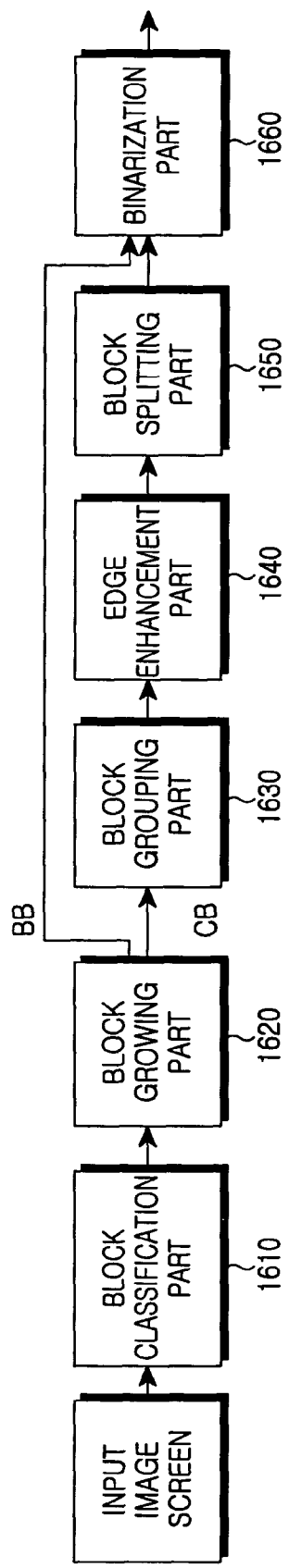
FIG. 19 is a block diagram illustrating an example of the configuration of the image binarization part shown in FIG. 4 in accordance with an embodiment of the present invention.

FIG. 5 shows a configuration of the blurred-image detection part 910; FIG. 9 shows a configuration of the skew correction part 920; FIG. 14 shows a configuration of the ROC extension part 930; FIGS. 17A to 18D are views explaining operation of the noise reduction part 940; and FIG. 19 shows the configuration of the image binarization part 950.

FIG. 5 is a block diagram illustrating the configuration of the blurred-image detection part 910 shown in FIG. 4 in accordance with an embodiment of the present invention.

Referring to FIG. 5, the blurred-image detection part 910 includes a block classification part 1110 for performing a function of dividing an input image into blocks, analyzing pixels of the blocks and classifying the blocks into CBs and BBs. The block classification part 1110 classifies the blocks into the CBs and the BBs in order to determine whether the image is blurred or not using the character region. It can be assumed that each of the blocks has a size of 8×8 pixels.

A CB average energy calculation part 1120 calculates an average energy ratio for the CBs output from the block classification part 1110. The average energy ratio for the CBs is calculated in order to determine whether the image is blurred or not using the character regions by calculating the average energy ratio for the CBs.

A image blur determination part 1130 compares the average energy ratio for the CBs output from the CB average energy calculation part 1120 with a predetermined threshold value and determines whether the image is blurred or not according to a result of the comparison. If the image blur determination part 1130 determines that the image is blurred, the image blur determination part 1130 notifies the controller 101 of the blurred image and requests that the image be re-input.

Figure 6:
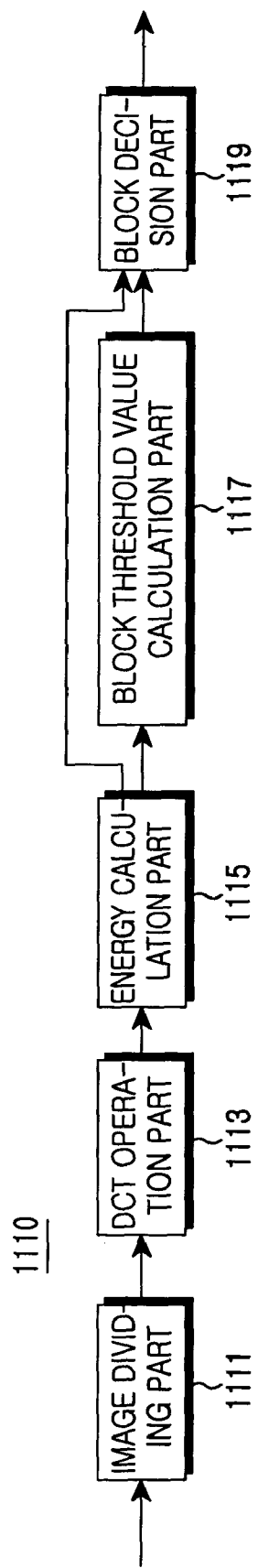
FIG. 6 is a block diagram illustrating an example of the configuration of a block classification part shown in FIG. 5 in accordance with an embodiment of the present invention.

FIG. 6 shows the configuration of the block classification part 1110. The block classification part 1110 performs an operation of dividing the image into blocks having a predetermined size and classifying the blocks into the CBs and BBs. The block classification part 1110 classifies the blocks in order to use only the character region when a determination is made as to whether the image is blurred or not.

Referring to FIG. 6, an image dividing part 1111 divides the image into blocks having a predetermined size. In this case, the image consists of 640×480 pixels. Each of the blocks consists of 8×8 pixels. The image dividing part 1111 divides the image into 4800 blocks.

The blocks output from the image dividing part 1111 are applied to a Discrete Cosine Transform (DCT) operation part 1113, and the DCT operation part 1113 performs a DCT operation for the blocks to produce DCT blocks. An energy calculation part 1115 calculates a sum of absolute values of dominant DCT coefficients within the DCT blocks. In this case, an energy distribution value of the DCT coefficients within the CBs is larger than that of DCT coefficients within the BBs. As described above, it is seen that values of the DCT coefficients of the CBs are larger than those of the DCT coefficients of the BBs, and an average of absolute values of some DCT coefficients of the CBs is relatively larger. Thus, in the embodiment of the present invention, the dominant DCT coefficients used in a block classification process are $D_1$-$D_9$ as a result of an experiment. Accordingly, a sum of the absolute values of the dominant DCT coefficients in a $k^{th}$ block can be calculated by the following Equation 1.

$$S^k = \sum_{i=1}^{9} |D_i^k| \qquad \text{Equation 1}$$

In the above Equation 1, $|D_i^k|$ denotes an $i^{th}$ dominant DCT coefficient of the $k^{th}$ block, and $S^k$ denotes the sum of the absolute values of the dominant DCT coefficients in the $k^{th}$ block. Thus, in the embodiment of the present invention, a sum of the dominant DCT coefficients $D_1$-$D_9$ is calculated.

The energy calculation part 1115 performs a calculation operation shown in the above Equation 1 for all blocks (at k=0, 1, 2, . . . , 4799). Energy values $S^k$ (k=0, 1, 2, . . . , 4799) calculated block by block are applied to a block threshold value calculation part 1117.

The block threshold value calculation part 1117 performs an addition operation for the energy values $S^k$ (k=0, 1, 2, . . . , 4799) calculated block by block, and produces an average value $\langle S^k \rangle$ by dividing the added energy values by the total number of blocks which is referred to as "TBN". The average value $\langle S^k \rangle$ is produced as in the following Equation 2. The average value $\langle S^k \rangle$ becomes a block threshold value Cth used for determining the blocks as CBs or BBs.

$$\langle S^k \rangle = \frac{1}{TBN} \sum_{k=1}^{TBN} S^k \qquad \text{Equation 2}$$
$$= Cth$$

In the above Equation 2, TBN denotes the total number of blocks.

A block decision part 1119 sequentially receives energy values (corresponding to sums of the absolute values of dominant DCT coefficients for the blocks) output from the energy calculation part 1115 on a block-by-block basis. The block decision part 1119 determines the CB or BB by comparing the received block energy values with a block threshold value Cth. At this time, the block decision part 1119 determines that the $k^{th}$ block is a CB if $S^k \geq Cth$ and determines that the $k^{th}$ block is a BB if $S^k < Cth$ as shown in the following Equation 3.

IF $S^k \geq Cth$ then CB else BB  Equation 3

Figure 7:
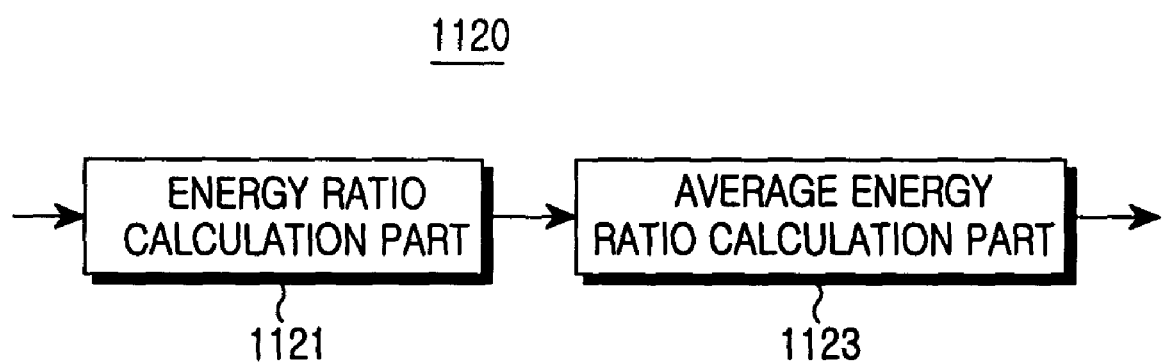
FIG. 7 is a block diagram illustrating an example of the configuration of a Character Block (CB) energy calculation part shown in FIG. 5 in accordance with an embodiment of the present invention.

The pixels of blocks classified by the block classification part 1110 can have gray levels between 0 and 255. An image of a CB output from the block classification part 1110 is input into the average energy calculation part 1120. The average energy calculation part 1120 calculates an energy ratio for each of the CBs, and then calculates an average energy ratio for the CBs within the image using calculated energy ratios. FIG. 7 shows a configuration of the average energy calculation part 1120.

Referring to FIG. 7, the average energy calculation part 1120 includes an energy ratio calculation part 1121 for calculating an energy ratio for each of the CBs classified by the block classification part 1110. In this case, a ratio of DCT coefficients for a CB consisting of M×M pixels can be produced by the following Equation 4.

$$R^k = \frac{\sum_m \sum_n |L_{m,n}^k|}{\sum_m \sum_n |L_{m,n}^k| + \sum_m \sum_n |H_{m,n}^k|} \qquad \text{Equation 4}$$
$$(m,n) \in \Omega_L \qquad (m,n) \in \Omega_L \quad (m,n) \in \Omega_H$$

In the above Equation 4, $$\Omega_L = \left\{ (m,n) \mid m,n = 0, \ldots, M-1, m+n = 1, \ldots, \frac{M}{4} \right\};$$

$$\Omega_H = \left\{ (m,n) \mid m,n = 0, \ldots, M-1, m+n = \frac{M}{4}+1, \ldots, \frac{3M}{4} \right\};$$

$L_{m,n}^k$ denotes a DCT coefficient of a low-frequency component in a (m, n) point of the $k^{th}$ block; and $H_{m,n}^k$ denotes a DCT coefficient of a high-frequency component in a (m, n) point of the $k^{th}$ block.

It is assumed that a block is based on 8×8 pixels (M=8) in this embodiment of the present invention. Here, an experiment for verifying the selection of points of the low and high frequency components is performed to obtain the energy ratio for the CB, and points of DCT coefficients are obtained step by step to calculate a DCT energy ratio for each CB. At this time, a variation of an average energy ratio for the CBs is confirmed as the degree of blur is increased in the above-described experiment. Among the DCT coefficients used for calculating an energy ratio of the DCT coefficients for each block, $L_{m,n}^k$ corresponds to DCT coefficients of low-frequency components at points where m+n=1 and 2, and $H_{m,n}^k$ corresponds to DCT coefficients of high-frequency components at points where m+n=3, 4, 5 and 6 according to a result of the experiment.

The energy ratio calculation part 1121 calculates an energy ratio $R^k$ of DCT coefficients for each CB as in the following Equation 4. An average energy ratio calculation part 1123 calculates an average energy ratio $\langle R^k \rangle$ for the DCT coefficients of a full image. In other words, the average energy ratio calculation part 1123 calculates the average energy ratio $\langle R^k \rangle$ for the DCT coefficients of the full image using the energy ratios $R^k$ calculated by the energy ratio calculation part 1121 as in the following Equation 5.

$$\langle R^k \rangle = \frac{1}{TCN} \sum_{k=1}^{TCN} R^k \qquad \text{Equation 5}$$

In the above Equation 5, TCN denotes the total number of CBs.

If the average energy ratio $\langle R^k \rangle$ for the full image has been calculated as described above, the image blur determination part 1130 compares the average energy ratio $\langle R^k \rangle$ with an experimentally obtained threshold value Bth as shown in the following Equation 6 and then determines whether the input image is blurred or not. In other words, the image blur determination part 1130 determines that the input image is blurred if $\langle R^k \rangle \geq Bth$, and then requests that the image be re-input. On the other hand, the image blur determination part 1130 determines that the input image is not blurred if $\langle R^k \rangle < Bth$, and then applies the input image to the noise reduction part 940 or the image binarization part 950 so that the input image can be recognized.

IF $\langle R^k \rangle \geq Bth$ then blurred image else non-blurred image  Equation 6

In the above Equation 6, the threshold value Bth is selected according to whether character information of the image can be visually recognized or not and performance of a binarization output.

Figure 8:
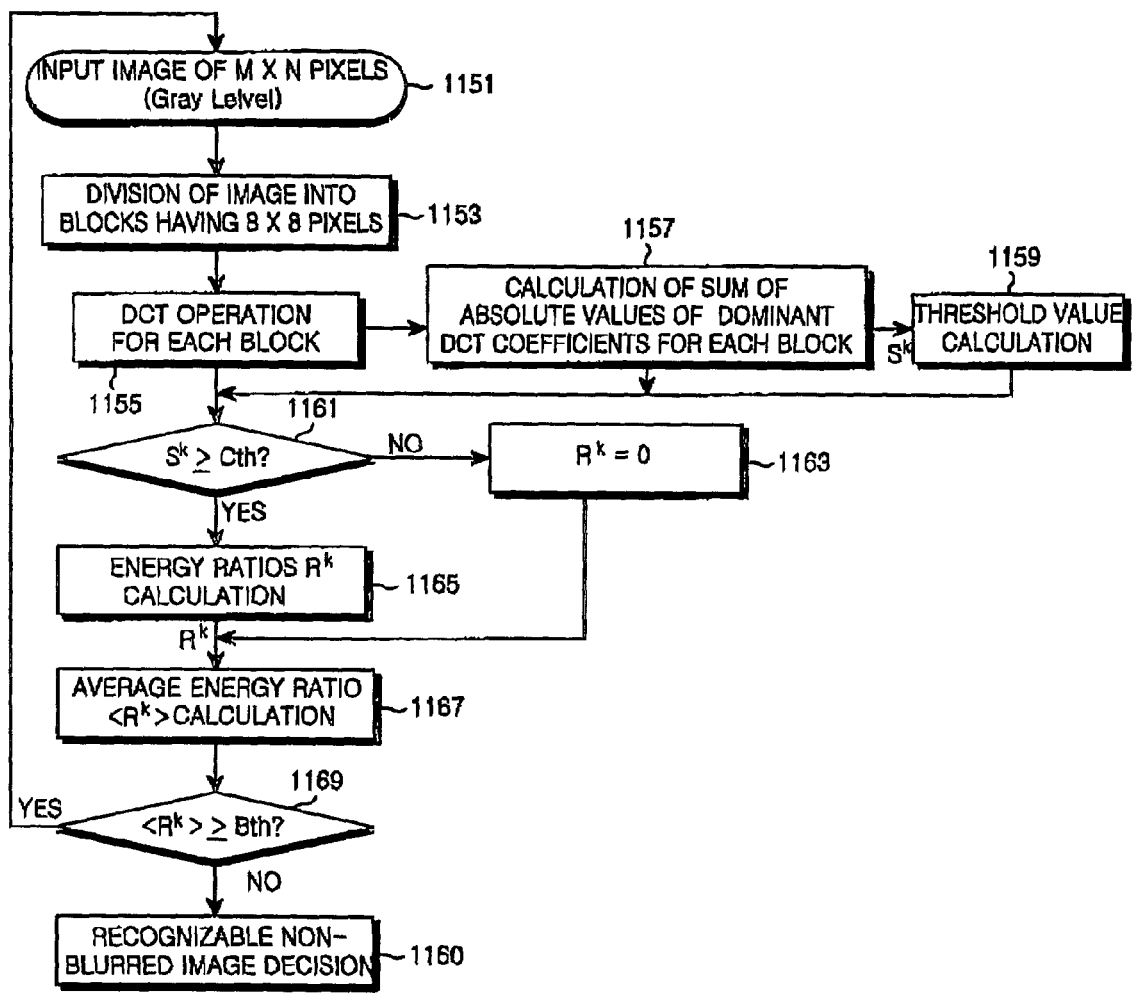
FIG. 8 is a flow chart illustrating an example of a process of detecting a blurred image by means of the blurred-image detection part in accordance with an embodiment of the present invention.

FIG. 8 is a flow chart illustrating an example of a process for determining whether the input image is blurred or not in accordance with an embodiment of the present invention.

Referring to FIG. 8, an image is input at step 1151. Here, we assume that the input image has a size of 640×480 pixels. At step 1153, the image is divided into predetermined size-based blocks. Each of the blocks consists of 8×8 pixels, and hence 4800 blocks are created. Then, a DCT operation for the blocks is performed at step 1155. Then, at step 1157, the sum $S^k$ (where k=BN=0, ..., 4799) of the absolute values of dominant DCT coefficients for each DCT block is calculated as in the above Equation 1 and then the calculated sum is output as an energy value for each block. Then, at step 1159, sums of the absolute values of the dominant DCT coefficients for all blocks are averaged so that the block threshold value Cth $(=\langle S^k \rangle)$ is calculated. Here, the block threshold value Cth is produced by averaging the sums of the absolute values of dominant DCT coefficients for all blocks of the full image, and becomes a criterion for classifying a block into the CB or BB. Then, at step 1161, the sums $S^k$ of the absolute values of dominant DCT coefficients for all blocks are sequentially accessed, and the sums $S^k$ are compared with the block threshold value. The block is determined to be a CB if a sum value corresponding to the block is equal to or larger than the block threshold value as a result of the comparison. On the other hand, the block is determined to be a BB if a sum value corresponding to the block is smaller than the block threshold value as the result of the comparison at step 1163. An energy ratio $R^k$ associated with the DCT coefficients for each of the CBs as shown in the above Equation 4 is calculated at step 1165, and an average energy ratio $\langle R^k \rangle$ of energy ratios $R^k$ for the CBs of the full image is calculated at step 1167. At step 1169, the average energy ratio $\langle R^k \rangle$ of energy ratios $R^k$ for the CBs is compared with the block threshold value Bth as shown in the above Equation 6, and a determination is made as to whether the input image is blurred or not. It is determined that the input image is blurred if $\langle R^k \rangle \geq$ Bth, and the method proceeds to the above step 1151. On the other hand, it is determined that the input image is not blurred if $\langle R^k \rangle <$ Bth, and the character recognizer 123 is notified of the fact that the input image is a non-blurred image the method proceeds to step 1160. Then, the character recognizer 123 performs an operation of recognizing characters contained within the pre-processed image from the pre-processor 121.

FIG. 9 is a block diagram illustrating an example of a configuration of the skew correction part 920 shown in FIG. 4 in accordance with an embodiment of the present invention.

Referring to FIG. 9, a binarization part 1210 divides the input image into blocks, analyzes the pixels contained within the blocks, classifies the blocks into CBs and BBs, and binarizes the pixels of the CBs and BBs. The binarization part 1210 classifies the blocks into the CBs and BBs in order to classify character strings using binarized character regions after the character regions are binarized.

A horizontal pixel sub-sampling part 1220 horizontally sub-samples the binarized image and then reduces horizontal pixels of the image. The horizontal pixel sub-sampling part 1220 reduces the horizontal pixels in order to allow character strings to be appropriately horizontally arranged by stripes when candidate stripes are generated.

A candidate stripe generation part 1230 performs a dilation operation for CBs and then generates candidate stripes in which neighboring characters are connected. The candidate stripe generation part 1230 performs the dilation operation for the binarized CBs and then generates candidate stripes in which neighboring characters are connected. In an embodiment of the present invention, the candidate stripe generation part 1230 performs an erosion operation for the CBs to prevent up and down stripes from being connected with each other.

A vertical pixel sub-sampling part 1240 vertically sub-samples the image converted into the candidate stripes on the basis of a horizontal pixel reduction ratio, and reduces vertical pixels. The vertical pixel sub-sampling part 1240 recovers an original aspect ratio from an aspect ratio changed according to the horizontal pixel reduction by the vertical pixel sub-sampling part 1240. Even though the horizontal pixels are increased, the vertical pixel sub-sampling part 1240 can recover the original aspect ratio.

A stripe classification part 1250 classifies stripes having a predetermined size or above among the stripes in which the vertical pixels are reduced. The stripe classification part 1250 calculates a blob size and/or eccentricity using moments of binarized candidate stripes and then classifies the stripes having the predetermined size or above. The stripes are used for calculating a direction angle of an object, contained within the image, skewed with respect to a horizontal axis of the image. In other words, the stripe classification part 1250 uses stripes in which the binarized characters are connected to each other and then performs a function of classifying the stripes to calculate the direction angle.

A skew angle decision part 1260 calculates direction angles of the classified stripes, accumulates count values of the direction angles angle by angle, a direction angle having the largest count value is selected, and the selected direction angle is decided to be a skew angle of an object within the image. As described above, the skew angle decision part 1260 calculates the direction angles of the classified stripes, accumulates the count values of direction angles angle by angle, and decides a direction angle having the largest count value as a skew angle.

A skew correction part 1270 receives an input image signal, rotates the image signal on the basis of the skew angle decided by the skew angle decision part 1260, and corrects a skew of an object of the detected image.

An image correction part 1280 inserts an image signal into a corner of the image in which the skew of the object is corrected. That is, if the skew correction part 1270 corrects the skew of the object within the image, a region in which no pixel exists occurs due to the rotation of the image. The image correction part 1280 performs a function of filling specified pixels in an empty region of the image without a pixel generated by the skew correction. At this time, even though the filled pixels are output because the filled pixels are irrespective of character data, an output of the skew correction part 1270 does not affect the process of recognizing characters from the detected image.

Operation of the skew correction part 920 shown in FIG. 9 will now be described in detail.

First, the input image consists of N×M pixels. Furthermore, the input image can be a color image or a grayscale image not having color information. In the embodiment of the present invention, it is assumed that the input image is a grayscale image.

The binarization part 1210 receives an input image, divided the input image into blocks, classifies the blocks into CBs and BBs, and binarizes classified block images.

FIG. 10 shows a configuration of the binarization part 1210. The binarization part 1210 divides the input image into predetermined size-based blocks, classifies the blocks into the CBs and BBs, and binarizes pixels of the classified block images into character pixels and background pixels. The binarization part 1210 classifies the blocks into the CBs and BBs and binarizes the block image pixels in order to detect direction angles of character strings and hence detect a skew angle of an object for the image in the process of correcting the skew of the object for the image. Referring to FIG. 10, the binarization part 1210 includes a block classification part 1211 for dividing the input image into blocks having a preset block size and classifying the blocks into CBs and BBs. A block grouping part 1213 groups each of the CBs along with adjacent blocks of 8. A threshold value calculation part 1215 generates a threshold value from the grouped blocks. A pixel decision part 1217 collectively converts pixels of the BBs output from the block classification part 1211 into background pixels having the second brightness value using the threshold value output from the threshold value calculation part 1215. The pixel decision part 1217 binarizes the pixels of the CBs into character pixels having the first brightness value and background pixels having the second brightness value on the basis of the threshold value, and then outputs the binarized pixels.

FIG. 11 shows a detailed configuration of the block classification part 1211 shown in FIG. 10. The configuration of the block classification part 1211 can be the same as that of the block classification part 1110 of the blurred-image detection part 910. The configuration of the block classification part 1211 shown in FIG. 11 is the same as that of the block classification part 1110 shown in FIG. 6. Operation of the block classification part 1211 for classifying the blocks is the same as that of the block classification part 1110.

Referring to FIG. 10, pixels of the CBs classified by the block classification part 1121 can have gray levels between 0 and 255. Images of the CBs output from the block classification part 1211 are input into the block grouping part 1213 and the pixel decision part 1217.

The classified blocks output from the block classification part 1211 are applied to the block grouping part 1213. At this time, the binarization part 1210 classifies character strings of the image, and collectively converts the BBs into background pixels having a predetermined brightness value. Thus, it is assumed that the binarization part 1210 does not perform a block grouping operation and a threshold value calculation operation for the BBs.

The block grouping part 1213 performs a function of grouping each of the CBs output from the block classification part 1211 along with adjacent blocks of 8 having a center of a CB and then generates the grouped blocks. A CB consists of 8×8 pixels. If the threshold value is determined to discriminate background and character pixels using one CB, and a binarization process is performed, discontinuity between blocks of the binarized image can occur as a size of a block is very small and a difference between the threshold value and adjacent character block values is very large. Thus, as a region is extended so that the grouped blocks are generated and binarized, the reliability of the binarization can be enhanced.

The pixel threshold value calculation part 1215 calculates a pixel threshold value Pth for classifying each pixel of the CB as a character or background pixel. The pixel threshold value calculation part 1215 produces the pixel threshold value Pth, and is used for classifying each pixel of the CB as a character or background pixel, and binarizing the character or background pixel. The pixel threshold value Pth can be selected using Otsu's method or Kapur's method that selects a gray value having the maximum between-class variance between two types of pixels. It is assumed that the pixel threshold value Pth is calculated using Otsu's method. The calculation of the pixel threshold value Pth using Otsu's method is based on the following Equation 7. The method made by N. Otsu is disclosed in "A Threshold Selection Method from Gray-Level Histograms", *IEEE Trans. Systems, Man and Cybernetics*, Vol. SMC-9, No. 1, pp. 62-66, January 1979 which is incorporated herein by reference.

$$Th_1 = \arg\max \sigma_B^2(T) \quad \text{Equation 7}$$

$$\sigma_B^2(T) = P_1^T(\mu_1(T) - \mu)^2 + P_2(T)(\mu_2(T) - \mu)^2$$
$$= P_1(T)P_2(T)(\mu_1(T) - \mu_2(T))^2$$

$\sigma_B^2(T)$: between − class variance $T$: gray value $\mu$: mean of the total pixels $\mu_i(T)$: mean of each class defined by $T$ $P_i(T)$: relative frequency of each class The pixel decision part 1217 binarizes the CB pixels output from the block classification part 1211 into character and background pixels using the pixel threshold value, and collectively binarizes the BB pixels into background pixels. In other words, the pixel decision part 1217 compares the pixel threshold value Pth corresponding to the CB image with values of the CB pixels, classifies image pixels into character pixels if the values of the CB pixels are equal to or larger than the pixel threshold value Pth, and classifies image pixels into background pixels if the values of the CB pixels are smaller than the pixel threshold value Pth. The pixel decision part 1217 performs the binarization operation by converting the character pixels into pixels having a brightness value "α" and converting the background pixels into pixels having a brightness value "β" according to a result of classifications. A method for binarizing CB pixels by means of the pixel decision part 1217 is based on the following Equation 8.

$$y_B(m, n) = \begin{cases} \alpha, & \text{if } y(m, n) \geq Pth \\ \beta, & \text{otherwise} \end{cases} \quad \text{Equation 8}$$

In the above Equation 8, y(m, n) denotes pixels of the CB output from the block classification part 1211, Pth is the pixel threshold value, and $y_B$(m, n) denotes pixels of the binarized CBs.

The pixel decision part 1217 receives pixels of the BB from the block classification part 1211, and collectively converts the BB pixels into pixels having the brightness value "β".

Referring to FIG. 9, the image binarized by the binarization part 1210 is input into the candidate stripe generation part 1230 or the horizontal pixel sub-sampling part 1220. Here, it is assumed that the image binarized by the binarization part 1210 is input into the horizontal pixel sub-sampling part 1220.

The horizontal pixel sub-sampling part 1220 horizontally sub-samples the binarized image on the basis of a preset ratio. At this time, assuming that a sub-sampling ratio is 2:1, the horizontal pixel sub-sampling part 1220 horizontally sub-samples the binarized image on the basis of the sub-sampling ratio of 2:1, and reduces the number of horizontal pixels of the binarized image by ½. The horizontal pixels are reduced in order to allow the candidate stripe generation part 1230 to appropriately arrange character strings in the form of stripes.

The candidate stripe generation part 1230 receives the binarized image output from the binarization part 1210 or receives the horizontally reduced binarized image output from the horizontal pixel sub-sampling part 1220. The candidate stripe generation part 1230 forms stripes on the basis of the character strings of the received image. The candidate stripe generation part 1230 is implemented by a morphological filter consisting of a dilation part and an erosion part. The morphological filter performs dilation and erosion operations for a character region so that characters are close to one another. In other words, the dilation part performs the dilation operation for the binarized character region, such that neighboring characters become close to one another and hence character strings in which characters are close to one another are generated. Here, the generated character strings can be referred to as "candidate stripes". Furthermore, the erosion part performs the erosion operation for the generated candidate stripes. Adjacent up and down stripes connected by the dilation operation can be separated by the erosion operation. The above-described morphological filter is disclosed in a book entitled "Digital Image Processing", by R. C. Gonzalez, R. Woods, et al., $2^{nd}$ ed., Prentice Hall, pp. 519-560, 2002 which is incorporated herein by reference.

The vertical pixel sub-sampling part 1240 vertically sub-samples the image output from the candidate stripe generation part 1230 on the basis of a preset ratio. Here, it is assumed that a sub-sampling ratio is 2:1 as in the horizontal pixel sub-sampling part 1220. The vertical pixel sub-sampling part 1240 can be used for converting the ratio of width to length corresponding to the image reduced by the horizontal pixel reduction into an original image aspect ratio. The vertical pixel sub-sampling part 1240 vertically reduces the image by ½ to output the reduced image. Here, a horizontal pixel enlarging part can be used in place of the horizontal pixel sub-sampling part 1240 so that a size restoration to the original image can be achieved.

The stripe classification part 1250 can receive an output image being a binarized image from the binarization part 1210, an output image from the candidate stripe generation part 1230 or an output image from the vertical pixel sub-sampling part 1240. Here, it is assumed that the stripe classification part 1250 receives the output image from the vertical pixel reduction part 1230.

The stripe classification part 1250 labels stripe numbers for the candidate stripes generated from the binarized image. The candidate stripes having the labeled stripe numbers are used for calculating a direction angle. Then, the stripe classification part 1250 analyzes the candidate stripes having the labeled stripe numbers, and discriminates stripes having a predetermined length or above from the candidate stripes. The stripe classification method uses a blob size and eccentricity based on a moment. The following Equation 9 defines a centroid moment to be used when a blob size and eccentricity are calculated, the blob size is calculated at p=0 and q=0 in the following Equation 9. The following Equation 10 shows a method for calculating the eccentricity using the centroid moment. The eccentricity calculation method is disclosed in a book entitled "Digital Image Processing Algorithms", by Pitas, Prentice Hall, pp. 326-331, 1993 which is incorporated herein by reference.

$$\mu_{pq} = \sum_x \sum_y (x - \bar{x})^p (y - \bar{y})^q \qquad \text{Equation 9}$$

$\bar{x}$: horizontal centroid of object $\bar{y}$: vertical centroid of object $$e = \frac{4\mu_{11}^2 + (\mu_{20} - \mu_{02})^2}{(\mu_{20} + \mu_{02})^2} \qquad \text{Equation 10}$$

In the above Equation 10, the eccentricity e denotes a length of a candidate stripe.

The blob size $\mu$ ($=\mu_{00}$) and eccentricity e calculated by the above Equations 9 and 10 are compared with preset thresholds values μth and eth, and selects candidate stripes as valid stripes. Here, the threshold values μth and eth are calculated by a predetermined experiment. Where μ≧μth and/or e≧eth, a corresponding candidate stripe is classified as a valid stripe. In this embodiment of the present invention, it is assumed that a corresponding candidate stripe is classified as a valid stripe where μ≧μth and e≧eth, and a corresponding candidate stripe is not selected as a valid stripe where μ<μth or e<eth. Where μ<μth or e<eth, a corresponding candidate stripe is decided not to be a stripe appropriate for calculating the direction angle, and is not selected as a valid stripe. In the embodiment of the present invention, a candidate stripe capable of satisfying the conditions that μ≧μth and e≧eth is selected. In an embodiment of the invention, a candidate stripe can be determined to be a valid stripe according to only any one of the two conditions.

Figure 12:
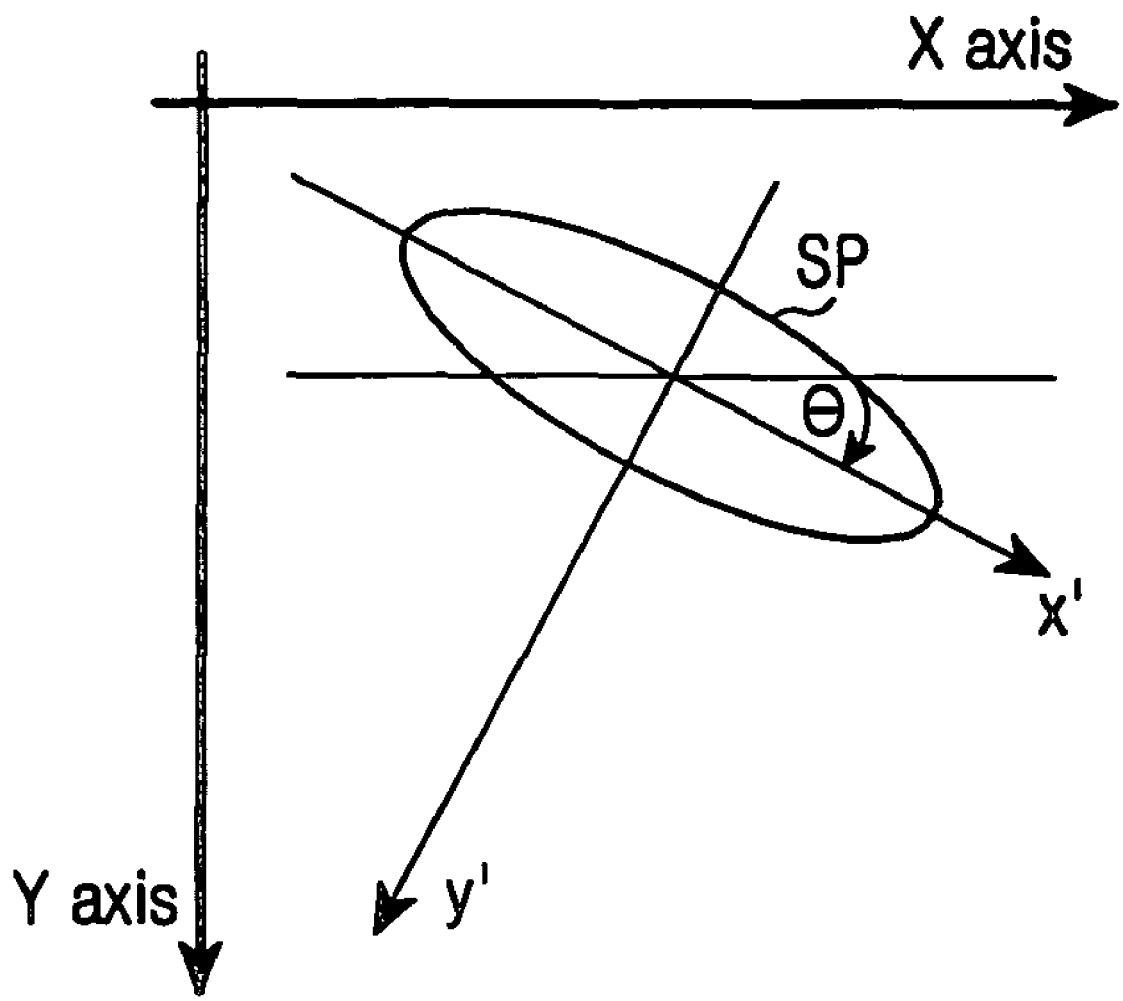
FIG. 12 is a graph illustrating an example of a calculation for a skew angle of a stripe by means of a skew angle decision part shown in FIG. 9 in accordance with an embodiment of the present invention.

The stripes classified by the stripe classification part 1250 are input into the skew angle decision part 1260, and the skew angle decision part 1260 calculates a direction angle θ for each of the classified stripes, and accumulates and stores count values of calculated direction angles. A direction angle having the largest count value is determined to be a skew angle. FIG. 12 is a graph illustrating an example of a calculated skew angle of a stripe by means of the skew angle decision part 1260 in accordance with an embodiment of the present invention. In FIG. 12, SP denotes a stripe classified by the stripe classification part 1250 of FIG. 9, and an x' axis and a y' axis are coordinate axes associated with the stripe SP. Thus, a direction angle θ between the x' axis and a real X axis for each of stripes output from the stripe classification part 1250 is calculated, and count values of directions angles θ are accumulated and stored. The direction angle θ for the stripe SP can be calculated by the following Equation 11.

$$\theta = \frac{1}{2} \arctan\left(\frac{2\mu_{11}}{\mu_{20} - \mu_{02}}\right) \qquad \text{Equation 11}$$

After direction angles θ for all stripes have been completely calculated, the skew angle decision part 1260 analyzes the accumulated count values of direction angles θ, and decides a direction angle θ as a skew angle. In other words, the skew angle decision part 1260 decides a direction angle θ associated with a largest number of stripes as the skew angle.

If the skew angle has been decided, the skew correction part 1270 rotates an input image by the skew angle determined by the skew angle decision part 1260 to correct a skew of image signals. In other words, the skew correction part 1270 rotates the image on the basis of a rotation matrix if the skew angle has been decided. At this time, a method for rotating the image uses an inverse mapping method. The inverse mapping and rotation methods are disclosed in a book entitled "Handbook of Computer Vision and Applications", by B. Jahne, et al., Academic Press, Vol. 2, pp. 94-95, 1999, and a book entitled "Computer Vision", by L. G. Shapiro and G. C. Stockman, Prentice Hall, pp. 415-418, 2001, both of which are incorporated herein by reference.

If the skew correction part 1270 rotates the image, a blank space in which no pixel exists is formed at a corner of the image. The blank space can affect the following recognition process. The image correction part 1280 performs a function of filling specified pixels in the blank space formed at the corner of the image in which the skew is corrected. Upon filling the pixels in the blank space formed at the corner of the image in which the skew is corrected, the image correction part 1280 can fill pixels having the pixel values closest to the blank space in the blank space. A correction process for the blank space can be collectively performed on the basis of a brightness value of background pixels.

When characters are recognized from the input image, stripes of character strings are extracted from the input image, direction angles are calculated according to skews of the stripes, the most frequently calculated direction angle among the calculated direction angles is determined to be a skew angle, the image is rotated on the basis of the determined skew angle. The image in which a skew of an object is corrected can be created. Furthermore, as pixels of a specific pixel brightness value are filled in a blank space formed at the corner of the image when the skew of an object in the image is corrected, an error can be reduced in the recognition process.

Figure 13:
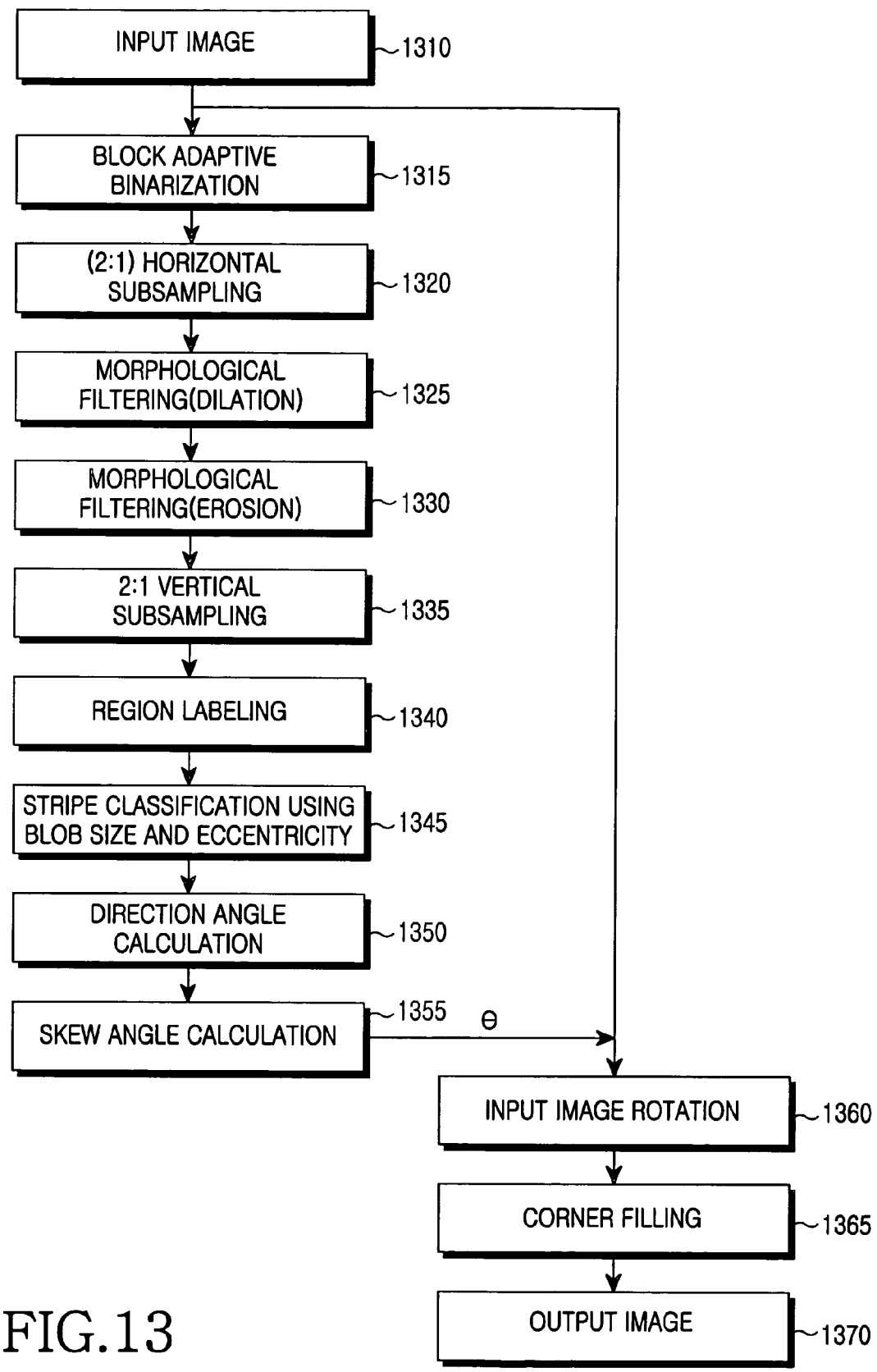
FIG. 13 is a flow chart illustrating an example of a process of correcting a skew of an object within the image by means of the skew correction part in accordance with an embodiment of the present invention.

A method for correcting the object skew of the input image in the embodiment of the present invention will now be described with reference to FIG. 13.

At step 1310, an image is input. At step 1315, the input image is binarized. At this time, the binarization process divides the input image into predetermined size-based blocks, and classifies the blocks into CBs and BBs. A grouping process performs a function of grouping each of the CBs along with adjacent blocks of 8 having a center of a CB, and hence grouped blocks are created. A pixel threshold value is generated to classify block pixels into character pixels and background pixels. Then, pixels of the CBs are compared with the pixel threshold vale, the pixels of the CBs are classified into the character and background pixels, and the BBs are collectively converted into the background pixels. Thus, the pixels of the input image are binarized into the character pixels and the background pixels, and the binarized pixels are output at the above step 1315.

The binarized image is horizontally sub-sampled at step 1320. The sub-sampling process is horizontally performed. The pixels are horizontally sub-sampled in order to allow the following candidate generation process to arrange character strings in the form of stripes. Then, at steps 1325 and 1330, a morphological filtering operation for the horizontally reduced image is performed, and hence candidate stripes are generated. In other words, at the above step 1325, a dilation operation is performed for binarized character regions, such that neighboring characters become close to one another and hence the candidate stripes are generated. Adjacent up and down stripes connected by the dilation operation can be separated by the erosion operation at step 1330. After the morphological filtering operation, vertical pixels of the image are sub-sampled, and an aspect ratio of an original image is recovered at step 1335. The vertical pixels of the binarized image are sub-sampled after the morphological filtering operation in order to calculate a skew angle of a character string for the reduced image.

At step 1340, stripe numbers are given to the candidate stripes of the image. At step 1345, the blob size and eccentricity for each candidate stripe are calculated, and stripes are selected to calculate a direction angle. At step 1350, direction angles for the selected stripes are calculated and count values of the direction angles are accumulated. If the direction angles for the selected stripes have been completely calculated, a direction angle having the largest count value is decided to be a skew angle at step 1355.

If the skew angle has been determined, the input image is rotated by the skew angle and hence a skew of an image object is corrected at step 1360. In the image in which the skew is corrected, a blank space in which no pixel exists is generated at a corner of the image. In this case, pixels of pixel values closest to the blank space are selected and filled in the blank space at step 1365. An image as a result of the skew correction and image pixel correction is output to the ROC extension part 930, the noise reduction part 940 or the image binarization part 950 at step 1370.

FIG. 14 is a block diagram illustrating an example of a configuration of the ROC extension part 930 shown in FIG. 4 in accordance with an embodiment of the present invention.

Referring to FIG. 14, the ROC extension part 930 receives an input image or an image output by the skew correction part 920.

A mean filter 1410 performs a mean filtering operation for the input image and makes a blurred image. The mean filtering operation is performed in order to reduce the influence of a background region outside a character region in the following block classification process by blurring the input image.

A block classification part 1420 divides an output image from the mean filter 1410 into blocks, analyzes pixels of the blocks, classifies the blocks into CBs and BBs, and converts pixels of the CBs into pixels of specified values. The block classification part 1420 classifies the blocks into the CBs and BBs in order to extract a character region by converting the pixels of the CBs into the pixels of specified values. Here, it is assumed that each of the blocks consists of 8×8 pixels.

A sub-sampling part 1430 sub-samples an output image from the block classification part 1420 to reduce the number of image pixels. The sub-sampling part 1430 reduces the number of image pixels in order to increase a filtering rate by decreasing a filter window in the following median filtering process. In the embodiment of the present invention, it is assumed that a pixel reduction ratio is $(2:1)^2$. In this case, the sub-sampling part 1430 performs a sub-sampling operation for horizontal pixels on the basis of a pixel reduction ratio of 2:1, and performs a sub-sampling operation for vertical pixels on the basis of a pixel reduction ratio of 2:1, such that the number of image pixels is reduced by ¼.

A median filter 1440 performs a median filtering operation for an output image from the sub-sampling part 1430, and removes erroneously classified CBs from the image. The median filter 1440 performs a function of removing the CBs erroneously classified due to noise, etc. in the block classification process.

An interpolation part 1450 performs an interpolation operation for pixels of an output image from the median filter 1440 to extend the image. In the embodiment of the present invention, it is assumed that a pixel interpolation ratio $(2:1)^2$. In this case, the interpolation part 1450 performs the interpolation operation for horizontal and vertical pixels of the output image from the median filter 1440 on the basis of a pixel interpolation ratio of 2:1 to extend the image four times. The interpolation operation is performed in order to search for a correct position of the character region and to extend a size of the image reduced by the sub-sampling process to that of an original image.

A position search part 1460 horizontally and vertically scans the median-filtered image and searches for a position of the character region. The position search part 1460 horizontally scans the median-filtered image and searches for a point x1 at the leftmost CB and a point x2 at the rightmost CB. Furthermore, the position search part 1460 vertically scans the median-filtered image, and searches for a point y1 at the topmost CB and a point y2 at the bottommost CB. A position of the character region in the image is determined according to a result of the search. At this time, left top and right bottom points of the character region are (x1, y1) and (x2, y2). The left top and right bottom points (x1, y1) and (x2, y2) of the character region are based on an aspect ratio of the input image, such that the distortion of the image can be prevented when the following ROC extension part 1480 extends the image.

An ROC extraction part 1470 extracts the image of the character region searched by the position search part 1460. In other words, the ROC extraction part 1470 receives information associated with the left top and right bottom points (x1, y1) and (x2, y2) of the character region searched by the position search part 1460, and extracts the image located between the left top and right bottom points (x1, y1) and (x2, y2) of the character region. Accordingly, an output image from the ROC extraction part 1470 becomes an image of the character region in which a background region is removed from the input image.

The ROC extension part 1480 extends the image of the extracted character region to a size of the input image. Here, the image extension can be implemented by the interpolation process. It is assumed that the image extension is implemented by bilinear interpolation in the embodiment of the present invention. At this time, the image extension is achieved by the interpolation operation so that a size of the image of the extracted character region can be equal to that of the input image.

Next, operation of the ROC extension part 930 will be described in detail with reference to FIG. 14.

First, the input image of the ROC extension part 930 has a size of N×M pixels. The input image can be a color image or grayscale image not having color information. It is assumed that the image is a grayscale image in the embodiment of the present invention.

The mean filter 1410 receives the input image, performs a mean filtering operation for the input image, and makes a blurred image so that the background region outside the character region of the image does not affect a character region classification process by the following block classification part 1420. The above-described mean filter is disclosed in a book entitled "Digital Image Processing", by R. C. Gonzalez, R. Woods, et al., 2nd ed., Prentice Hall, pp. 119-123, 2002 which is incorporated herein by reference.

The mean-filtered image is applied to the block classification part 1420. The block classification part 1420 divides an output image from the mean filter 1410 into blocks, analyzes pixels contained in the blocks, classifies the blocks into CBs and BBs, and converts pixels of the classified CBs into pixels having specified values.

Figure 15:
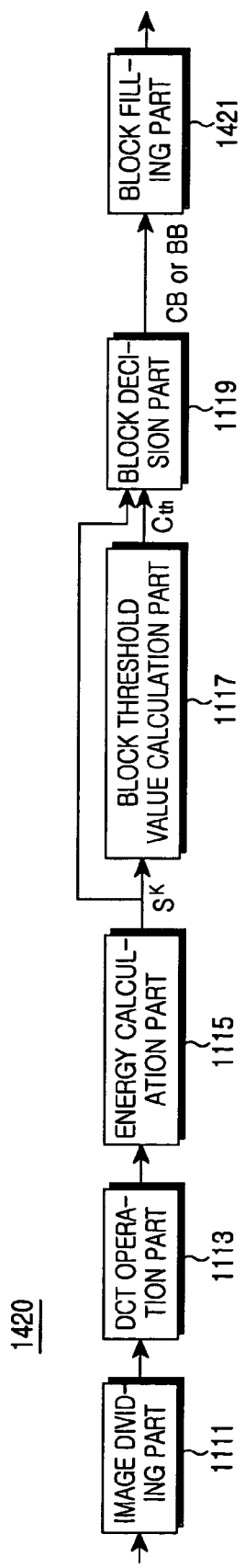
FIG. 15 is a block diagram illustrating an example of a configuration of the block classification part shown in FIG. 14 in accordance with an embodiment of the present invention.

FIG. 15 is a block diagram illustrating an example of a configuration of the block classification part 1420 shown in FIG. 14 in accordance with an embodiment of the present invention. The configuration of the block classification part 1420 can be the same as that of the block classification part 1110 of the blurred-image detection part 910. The configuration of the block classification part 1420 shown in FIG. 15 is the same as that of the block classification part 1110 shown in FIG. 6. Operation of the block classification part 1420 for classifying the blocks is the same as that of the block classification part 1110.

Pixels of the CBs classified by the block decision part 1119 shown in FIG. 15 can have gray levels between 0 and 255. The block filling part 1421 converts pixels of a CB classified by the block decision part 1119 into pixels having the first brightness value, and converts pixels of a BB into pixels having the second brightness value. In the embodiment of the present invention, it is assumed that the block filling part 1421 converts the CB pixels into white pixels, and converts the BB pixels into black pixels. Thus, the block filling part 1421 fills the CBs of the image with the white pixels and fills the BBs of the image with the black pixels. The CBs and BBs are filled with pixels of different brightness values after the block classification part 1420 classifies the blocks into the CBs and BBs in order to appropriately display character regions.

Then, the sub-sampling part 1430 sub-samples an output image from the block classification part 1420 to reduce the number of horizontal and vertical pixels. The sub-sampling part 1430 reduces the number of image pixels in order to increase a filtering rate by decreasing a filter window in the following median filtering process. In the embodiment of the present invention, it is assumed that the pixel reduction ratio is $(2:1)^2$. In this case, the number of pixels of the output image from the block classification part 1420 is reduced by ¼. A size of the reduced image is 320×240 pixels.

The median filter 1440 performs a median filtering operation for an output image from the sub-sampling part 1430, and removes BBs and erroneously classified CBs from the image. The median filter 1440 performs a function of removing the CBs erroneously classified due to noise, etc. in the block classification process. The above-described median filter is disclosed in a book entitled "Fundamental of Digital Image Processing", by A. K. Jain, Prentice Hall, pp. 246-249 which is incorporated herein by reference.

After the median filtering operation for the image, the interpolation part 1450 performs an interpolation operation for horizontal and vertical pixels of an output image from the median filter 1440 to extend the image. In the embodiment of the present invention, it is assumed that a pixel interpolation ratio $(2:1)^2$. The interpolation operation is performed in order to search for a correct position of the character region and to extend a size of the image reduced by the sub-sampling process to that of an original image.

The position search part 1460 horizontally and vertically scans the median-filtered image and searches for a position of the character region. The position search part 1460 horizontally scans the median-filtered image, searches for a point x1 at the leftmost CB and a point x2 at the rightmost CB, and saves a result of the search. Furthermore, the position search part 1460 vertically scans the median-filtered image, searches for a point y1 at the topmost CB and a point y2 at the bottommost CB, and stores a result of the search. The left top and right bottom points (x1, y1) and (x2, y2) of the character region depend upon the results of the searches. The left top and right bottom points (x1, y1) and (x2, y2) of the character region are based on an aspect ratio of the input image, such that the distortion of the image can be prevented when the following ROC extension part 1480 extends the image. In the embodiment of the present invention, since a ratio of width to length associated with the input image is 4:3 (i.e., 640:480 pixels), the left top and right bottom points (x1, y1) and (x2, y2) of the character region are determined so that a ratio of width to length associated with the character region searched by the position search part 1460 is 4:3.

The ROC extraction part 1470 extracts the image of the character region searched by the position search part 1460. In other words, the ROC extraction part 1470 receives information associated with the left top and right bottom points (x1, y1) and (x2, y2) of the character region searched by the position search part 1460, and extracts the image located between the left top and right bottom points (x1, y1) and (x2, y2) of the character region. On the basis of the left top and right bottom points (x1, y1) and (x2, y2) of the character region, the ROC extraction part 1470 extracts, as character region pixels, pixels between the point x1 and the point x2 in the horizontal direction and pixels between the point y1 and the point y2 in the vertical direction. An output image from the ROC extraction part 1470 becomes an image of the character region in which a background region is removed from the input image.

The ROC extension part 1480 extends the image of the extracted character region to a size of the input image. Here, the image extension can be implemented by the interpolation process. It is assumed that the image extension is implemented by bilinear interpolation in the embodiment of the present invention. Here, the bilinear interpolation is based on the following Equation 12.

$$v(x, y) = (1 - \Delta x)(1 - \Delta y)u(m, n) + (1 - \Delta x)\Delta y u(m, n+1) + \Delta x(1 - \Delta y)u(m+1, n) + \Delta x \Delta y u(m+1, n+1)$$

Equation 12 where $\Delta x = x - m$ $\Delta y = y - n$

In this case, the image extension is achieved by the interpolation operation so that a size of the image of the extracted character region can be equal to that of the input image. The above-described bilinear interpolation is disclosed in a book entitled "Numerical Recipies in C", by W. H. Press, S. A. Teukolsky, et al., 2nd ed., Cambridge, pp. 123-125, 1988 which is incorporated herein by reference.

Figure 16:
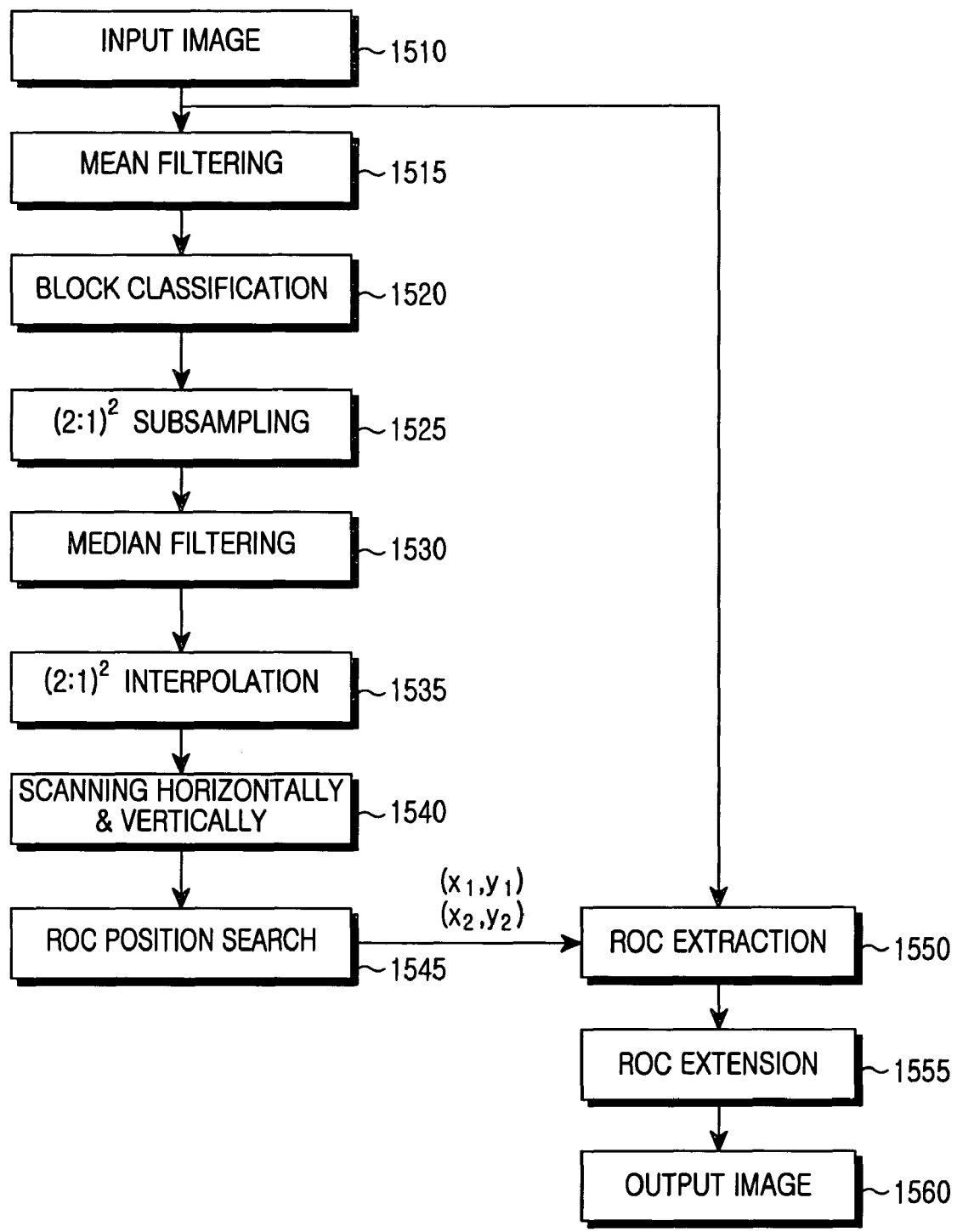
FIG. 16 is a flow chart illustrating an example of a process of extending the character region by means of the ROC extension part in accordance with an embodiment of the present invention.

FIG. 16 is a flow chart illustrating an example of a process of extending the character region by means of the ROC extension part in accordance with an embodiment of the present invention.

Referring to FIG. 16, an image is input at step 1510. At step 1515, a mean filtering operation for the input image is performed and a blurred image is generated. The mean filtering operation is performed in order to reduce the influence of a background region outside a character region in the following classification process.

At step 1520, the mean-filtered image is divided into preset size-based blocks, pixels of the blocks are analyzed, the blocks are classified into CBs and BBs, and pixels of the CBs are converted into pixels of specified values. When the block classification process is performed, the image is classified into the CBs and BBs, CB pixels are converted into white pixels, and BB pixels are converted into black pixels. Accordingly, the image is filled with the white or black pixels according to the classified blocks.

When an image is generated after the above step 1520, the generated image is sub-sampled and an image of horizontally and vertically reduced pixels is generated at step 1525. The number of image pixels is reduced in order to increase a filtering rate by decreasing a filter window in the following median filtering process. After the sub-sampling operation, a median filtering operation for the reduced image is performed at step 1530. When the median filtering operation is performed, an erroneously classified character region caused by an image rim or noise is removed. After the median filtering operation is performed and then the erroneously classified character region is removed, an interpolation operation for horizontal and vertical pixels of the median-filtered image is performed and a size of the image is extended at step 1535.

At step 1540, the median-filtered image corresponding to an original image size is horizontally and vertically scanned and a position of the character region is searched for. In the position search process, the median-filtered image is horizontally scanned and a point x1 at the leftmost CB and a point x2 at the rightmost CB are searched for. Furthermore, the median-filtered image is vertically scanned, and a point y1 at the topmost CB and a point y2 at the bottommost CB are searched for. Then, at step 1545, the left top and right bottom points (x1, y1) and (x2, y2) of the character region in the image is determined according to a result of the search. At this time, the left top and right bottom points (x1, y1) and (x2, y2) of the character region are based on an aspect ratio of the input image, such that the distortion of the image can be prevented when the following ROC extension process extends the image.

After the character region search, the image of the searched character region position is extracted from the input image at step 1550. In other words, the image located between the left top and right bottom points (x1, y1) and (x2, y2) of the character region is extracted from the image. The character region image is located between the point x1 and the point x2 in the horizontal direction and between the point y1 and the point y2 in the vertical direction. As a result, the character region image becomes an image of the character region in which a background region is removed from the input image.

After the character region image is extracted, a size of the extracted character region is extended to a size of the input image at step 1555. Here, the image extension can be implemented by the interpolation process. The image extension can be implemented by bilinear interpolation in the embodiment of the present invention. The extended image is output to a recognizer or stored at step 1560, and the output or stored extended image can be used for another purpose.

Operation of the noise reduction part 940 will now be described with reference to FIG. 4.

Noise typically occurs when an image of an object is obtained from a digital camera, etc. Representative noise components among the noise components include Gaussian noise components. To reduce the Gaussian noise components, various types of noise reduction filters can be used. Where the image corresponding to a card bearing a person's name and other information is picked up, a large amount of information exists at edges of the character region. Accordingly, if a simple noise reduction filter is used where the image corresponds to the card, character information can be seriously damaged. It is preferable that the noise reduction part 940 uses a filter capable of reducing an image noise while conserving the information at the edges. Here, we assume that the noise reduction part 940 uses a special noise reduction filter such as a directional Lee filter. Operation of the directional Lee filter can be expressed as the following Equation 13.

$$\hat{x}(i, j) = m_x(i, j) + \frac{\sigma_x^2(i, j)}{\sigma_x^2(i, j) + \sigma_n^2}[\bar{y}(i, j) - m_x(i, j)]$$

Equation 13

In the above Equation 13, $m_x(i, j)$ denotes a local signal mean for a region surrounding a pixel point $(i, j)$, $\sigma_x^2(i, j)$ denotes a local signal variance for a region surrounding a pixel point $(i, j)$, $\sigma_n^2$ denotes a noise variance estimated from the full image, $\tilde{y}(i, j)$ denotes a mean value for weighted pixels having major edge directivity, and $\hat{x}(i, j)$ denotes an output image in which noise is removed.

In the above Equation 13, parameters of an adaptive filter are adjusted using a signal mean and variance for a local region of an image. As a noise variance is significantly larger than a local signal variance as shown in the following Equation 14 in relation to the above Equation 13 for a background region of the image, an output image in which noise is removed corresponds to a local mean value. As a local signal variance is significantly larger than a noise variance in relation to the above Equation 13 for an edge region of the image, an output image in which noise is removed corresponds to a mean value for weighted pixels having major edge directivity, such that the edge region is appropriately preserved and simultaneously noise of the edge region is removed.

$$\text{IF } \sigma_n^2 \gg \sigma_x^2, \hat{x}(i,j) = m_x(i,j) = m_y(i,j)$$

$$\text{IF } \sigma_n^2 \gg \sigma_x^2, \hat{x}(i,j) = \tilde{y}(i,j) \quad \text{Equation 14}$$

A sum of products of a one-dimensional mean filter's outputs $y_\theta$ associated with directions (0°, 45°, 90°, 135°) orthogonal to major edge directions (90°, 135°, 0°, 45°) and weight values $w_\theta$ associated with the directivity to each edge direction is calculated as shown in the following Equation 15 and FIG. 17B so that the edge region of the image can be preserved and simultaneously its noise can be removed.

$$\tilde{y}(i, j) = \sum_\theta w_\theta y_\theta(i, j) \quad \text{Equation 15}$$

$$y_\theta(i, j) = \frac{y_0}{2} + \frac{1}{4}(y_n + y_{n+4}) \text{ where } n = 1, 2, 3, 4 \quad \text{Equation 16}$$

Figures 17A, 17B:
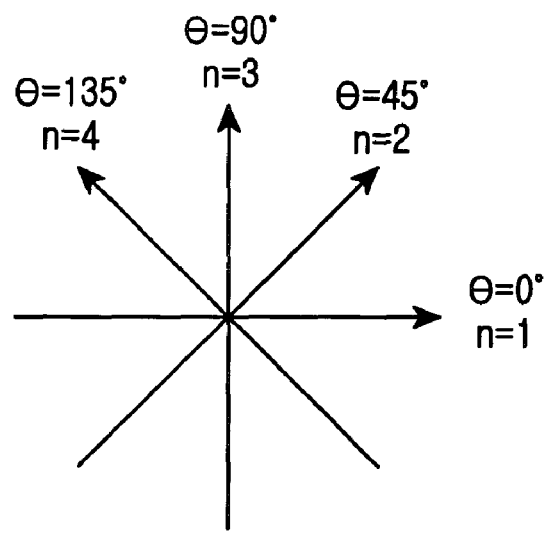
FIG. 17A is a view illustrating an example of adjacent pixels associated with a noise reduction part shown in FIG. 4 in accordance with an embodiment of the present invention.
FIG. 17B is a view illustrating an example of four directions of a central pixel associated with the noise reduction part shown in FIG. 4 in accordance with an embodiment of the present invention.
Figure 18A:
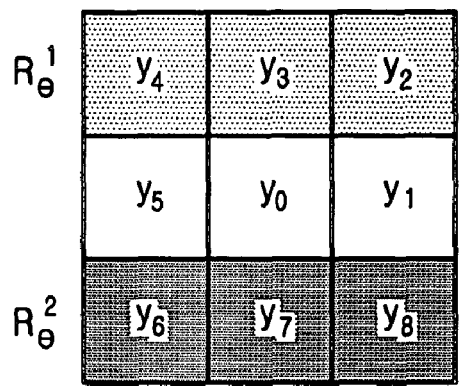
FIGS. 18A to 18D are views illustrating an example of pixels in respective directions associated with the noise reduction part shown in FIG. 4 in accordance with an embodiment of the present invention.
Figure 18B:
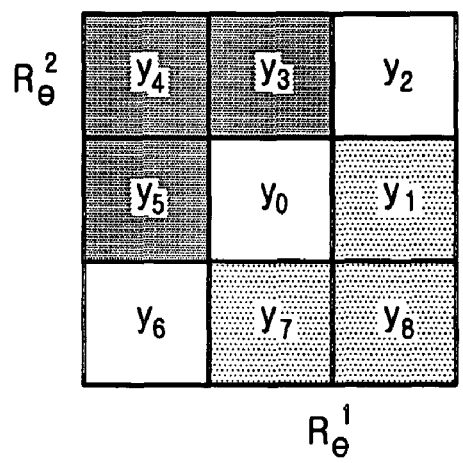
Figure 18C:
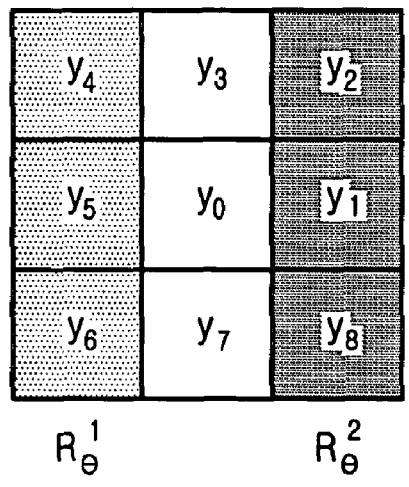
Figure 18D:
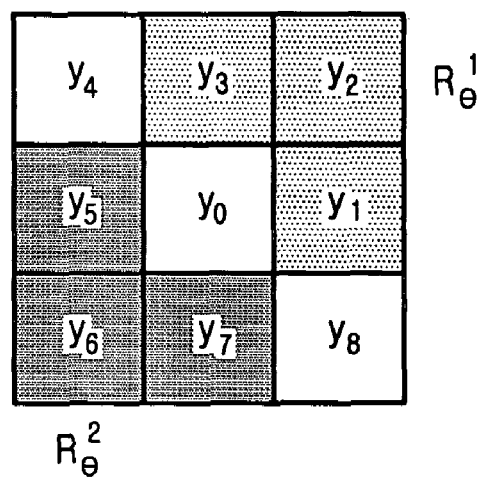

FIGS. 17A and 17B show the operation of the one-dimensional mean filter in the directions (0°, 45°, 90°, 135°) orthogonal to the edge directions in the above Equation 16 varying with n=1~4 within a 3×3 filter window. On the basis of the operation, noise components of each edge are removed.

The following Equation 18 is used to calculate a weight value multiplied by an output of the one-dimensional filter in the directions (0°, 45°, 90°, 135°) orthogonal to the edge directions (90°, 135°, 0°, 45°). The weight value $w_\theta$ defined by the following Equation 18 is calculated to normalize a weight value in each edge direction after calculating edge intensities $D_\theta$ (shown in the following Equation 17) in the edge directions (90°, 135°, 0°, 45°), varying with n=1~4 within a 3×3 filter window shown in FIGS. 18A to 18D. The above description is disclosed in a book entitled "Adaptive Image Restoration Using Local Statistics and Directional Gradient Information", by N. C. Kim, IEEE Electronic Letters 4th, Vol. 23, No. 12, pp. 610-611, June 1987 which is incorporated herein by reference.

$$D_\theta = \frac{1}{3} \left| \sum_{R_\theta^1} y_i - \sum_{R_\theta^2} y_i \right| \quad \text{Equation 17}$$

-continued $$w_\theta = \frac{D_\theta}{\sum_\theta D_\theta} \quad \text{Equation 18}$$

FIG. 19 is a block diagram illustrating an example of a configuration of the image binarization part 950 shown in FIG. 4 in accordance with an embodiment of the present invention.

Referring to FIG. 19, the image binarization part 950 includes a block classification part 1610 which performs a function of dividing an input image into blocks, analyzing pixels contained in the blocks and classifying the blocks into CBs and BBs. The block classification part 1610 classifies the blocks into the CBs and BBs in order to binarize only a character region. Here, it is assumed that each block consists of 8×8 pixels.

A block growing part 1620 extends the CBs classified by the block classification part 1610. In the block classification process, a CB can be classified as a BB due to the influence of a background between character pixels. The block growing part 1620 grows a CB in order to extend pixels classified as a BB to a CB.

A block grouping part 1630 performs a function of grouping each of the CBs output from the block growing part 1620 along with adjacent blocks of 8 with a center of a CB and then generates the grouped blocks. If a threshold value is determined to discriminate background and character pixels using one CB (consisting of 8×8 pixels), and a binarization process is performed, discontinuity between blocks of the binarized image can occur as a size of a block is very small and a difference between the threshold value and adjacent character block values is very large. The block grouping part 1630 performs the grouping function in order to extend a CB region and enhance the reliability of the binarization for the CB region.

An edge enhancement part 1640 enhances edges of the CBs using relations between the character pixels of the CBs grouped by the block grouping part 1630 and their surrounding pixels, and generates pixels in which noise components are reduced. Further, a pixel threshold value to be used for binarizing the pixels is calculated. The edge enhancement part 1640 can use a quadratic filter or improved quadratic filter.

A block splitting part 1650 receives the grouped blocks from the edge enhancement part 1640, and separates the CBs from the grouped blocks. In other words, the block splitting part 1650 performs a function of separating only CBs for binarization from the blocks grouped by the block grouping part 1630.

A binarization part 1660 compares pixels of the CBs split by the block splitting part 1650 with the pixel threshold value, and performs a binarization operation with the first and second brightness values for character pixels. The binarization part 1660 performs the binarization operation so that the pixels of the BBs classified by the block classification part 1610 have the second brightness value. The binarization part 1660 can include a compressor that compresses the binarized image before the binarized image is sent to the character recognizer 123 shown in FIG. 1, such that efficiency of a storage space can be improved.

The image processed by the binarization part 1660 is input into the character recognizer 123 shown in FIG. 1 so that characters can be recognized.

The input image is divided into blocks by the block classification part 1610, and the blocks are classified into CBs and BBs.

Figure 20:
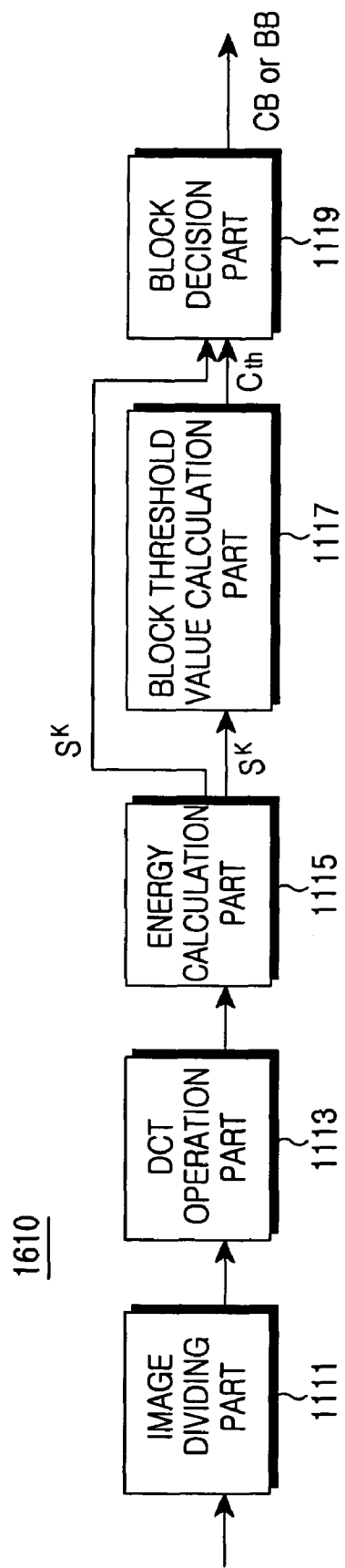
FIG. 20 is a block diagram illustrating an example of the configuration of a block classification part shown in FIG. 19 in accordance with an embodiment of the present invention.

FIG. 20 is a block diagram illustrating an example of a configuration of the block classification part 1610 in accordance with an embodiment of the present invention. The configuration of the block classification part 1610 can be the same as that of the block classification part 1110 of the blurred-image detection part 910. The configuration of the block classification part 1610 shown in FIG. 20 is the same as that of the block classification part 1110 shown in FIG. 6. Operation of the block classification part 1610 for classifying the blocks is the same as that of the block classification part 1110. The pixels of the CBs classified by the block classification part 1610 have gray levels between 0 and 255.

The block growing part 1620 grows the classified CBs. In the block classification process, a CB can be classified as a BB due to the influence of a background between character pixels. The block growing part 1620 grows a CB in order to change a BB containing character pixels to a CB by extending pixels classified as a BB to a CB.

The block growing part 1620 can be implemented using a morphological filter. The morphological filter grows a CB through an erosion operation subsequent to a dilation operation for the CB called a close operation. The close operation serves to fill an internal hole of a region. First, the CB is extended through the dilation operation, BBs isolated between the CBs are converted into the CBs, and an original block size is recovered through the erosion in accordance with the close operation. The above-described morphological filter is disclosed in a book entitled "Digital Image Processing", by R. C. Gonzalez, R. Woods, et al., $2^{nd}$ ed., Prentice Hall, pp. 519-560, 2002 which is incorporated herein by reference. The block growing part 1620 changes a BB containing character pixels to a CB in the block growing process.

The block grouping part 1630 performs a function of grouping each of the CBs output from the block growing part 1620 along with adjacent blocks of 8 with a center of a CB and then generates the grouped blocks that consist of 24×24 pixels, respectively. A CB consists of 8×8 pixels. If a threshold value is determined to discriminate background and character pixels using one CB, and a binarization process is performed, discontinuity between blocks of the binarized image can occur as a size of a block is very small and a difference between the threshold value and adjacent character block values is very large. Thus, as a region is extended so that the grouped blocks are generated and binarized, the reliability of the binarization can be enhanced. The grouped block containing a CB output from the block grouping part 1630 is applied to the edge enhancement part 1640.

Figures 21, 22:
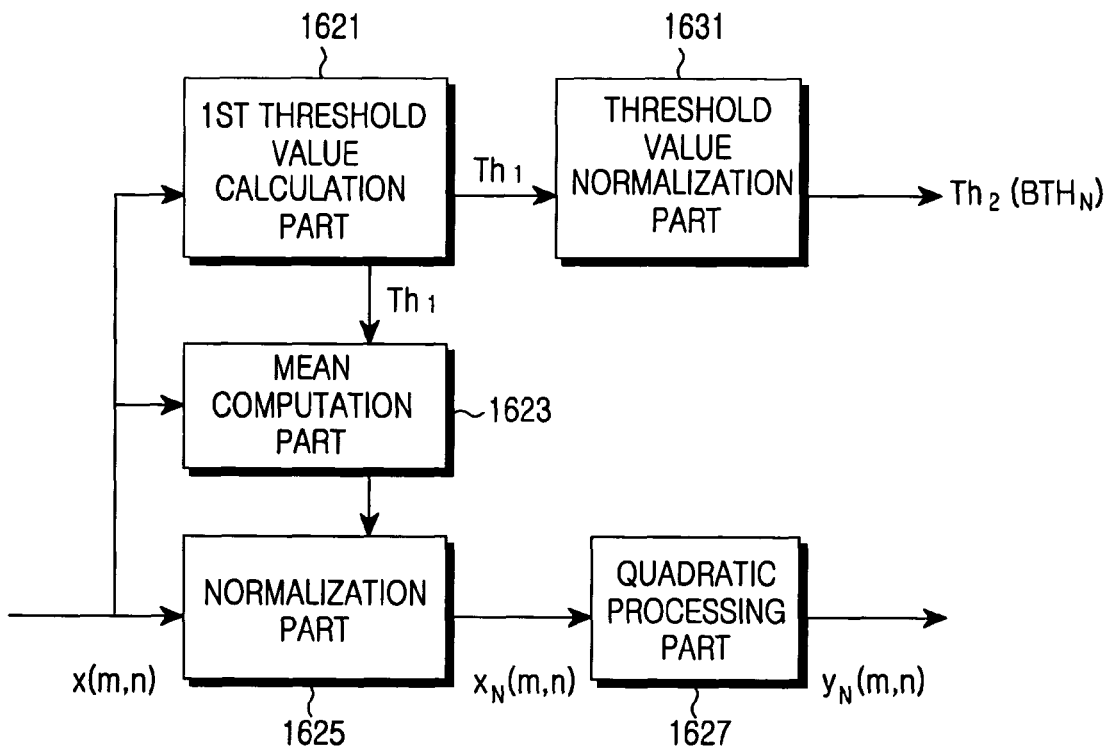
FIG. 21 is a block diagram illustrating an example of the configuration of an edge enhancement part shown in FIG. 19 in accordance with an embodiment of the present invention.
FIG. 22 is a flow chart illustrating an example of a process of enhancing an edge of the character block in the edge enhancement part in accordance with an embodiment of the present invention.

The edge enhancement part 1640 can use a QF or IQF. An operation of enhancing edge components using the IQF will now be described. As shown in FIG. 21, the IQF normalizes a CB, enhances edges of the normalized CB, normalizes a threshold value calculated from the CB, and generates a threshold value $BTH_N$ for binarizing CB pixels.

An operation of enhancing the edges of a CB using the IQF will be described with reference to FIG. 21.

Referring to FIG. 21, a first threshold value calculation part 1621 calculates the first threshold value Th1 for classifying each pixel of the CB into a character or background pixel. The first threshold value calculation part 1621 calculates the first threshold value Th1 that is used for discriminating character and background pixels and normalizing two types of discriminated pixels. At this time, the first threshold value Th1 is selected as a gray value corresponding to the maximum between-class variance between the two types of discriminated pixels. The first and second threshold values Th1 and Th2 are calculated using Otsu's method or Kapur's method. Otsu's method for calculating the first threshold value Th1 is based on the following Equation 19. The method made by N. Otsu is disclosed in "A Threshold Selection Method from Gray-Level Histograms", *IEEE Trans. Systems, Man and Cybernetics*, Vol. SMC-9, No. 1, pp. 62-66, January 1979, which is incorporated herein by reference.

$$Th_1 = \underset{T}{\arg\max}\ \sigma_B^2(T)$$

$$\sigma_B^2(T) = P_1(\mu_1(T) - \mu)^2 + P_2(T)(\mu_2(T) - \mu)^2$$

$$= P_1(T)P_2(T)(\mu_1(T) - \mu_2(T))^2$$

Equation 19

$\sigma_B^2(T)$: between – class variance $T$: gray value $\mu$: mean of the total pixels $\mu_i(T)$: mean of each class defined by $T$ $P_i(T)$: relative frequency of each class A mean computation part 1623 classifies CB pixels into character and background pixels on the basis of the first threshold value Th1, and calculates mean brightness values for the character and background pixels for a CB. In a mean computation process for two classes, pixels of the CB x(m, n) are classified into Character Pixels (CPs) and Background Pixels (BPs) on the basis of the first threshold value Th1 as in the following Equation 20, and then a mean brightness value $\mu_0$ for the character pixels and a mean brightness value $\mu_1$ for the background pixels are calculated as in the following Equation 21.

If $x(m,n) \geq Th1$ then CP else BP

Equation 20

In the above Equation 20, x(m, n) denotes a CB, and Th1 denotes a threshold value for classifying the CB pixels into character and background pixels.

$$\mu_0 = \frac{S_c}{N_c}$$

$$\mu_1 = \frac{S_b}{N_b}$$

Equation 21

In the above Equation 21, $S_c$ denotes a sum of brightness values for the character pixels, $N_c$ denotes the number of character pixels, $S_b$ denotes a sum of brightness values for the background pixels, and $N_b$ denotes the number of background pixels.

A normalization part 1625 normalizes the pixels of the CB x(m, n) using the mean brightness value $\mu_0$ for the character pixels and the mean brightness value $\mu_1$ for the background pixels so that the character pixels can have values close to a logical "1" state and the background pixels can have values close to a logical "0" state. The normalization part 1625 performs a function of reducing a dynamic range of the brightness values for the input CB pixels by normalizing the pixels of the CB x(m, n) on the basis of the following Equation 22.

$$x_N(m, n) = \frac{(x(m, n) - \mu_1)}{(\mu_0 - \mu_1)} \qquad \text{Equation 22}$$

In the above Equation 22, $x_N(m, n)$ denotes a normalized CB, $\mu_0$ denotes a mean brightness value for the character pixels, and $\mu_1$ denotes a mean brightness value for the background pixels.

The normalized CB $x_N(m, n)$ is quadratically processed by a quadratic processing part 1627, so that CB edges are enhanced and their noise components are reduced. The quadratic processing part 1627 performs a function of enhancing edges using relations between the normalized pixels and their surrounding pixels, and reducing the noise components of the edges. FIG. 22 shows a central pixel and surrounding pixels processed by the quadratic processing part 1627. The following Equation 23 has functional characteristics capable of enhancing the edges and reducing the noise components when the quadratic processing part 1627 performs a quadratic processing operation. The quadratic processing part 1627 darkly processes the character pixels and brightly processes the background pixels on the basis of a large gray level difference, such that character edges are processed clearly and simultaneously their noise components are reduced.

$$y_0 = \left( h_0 x_0 + h_1 \sum_{i=1}^{4} x_{2i-1} + h_2 \sum_{i=1}^{4} x_{2i} \right) + \left( h_3 x_0^2 + h_4 \sum_{i=1}^{4} x_{2i-1}^2 + h_5 \sum_{i=1}^{4} x_{2i}^2 \right) + \left( h_6 \sum_{i=1}^{4} x_0 x_{2i-1} + h_7 \sum_{i=1}^{4} x_0 x_{2i} \right) + \left( h_8 \sum_{i=1}^{4} x_{2i-1} x_{2i^*-1} + h_9 \sum_{i=1}^{4} x_{2i-1}(x_{2i} + x_{2i^{**}}) \right) \qquad \text{Equation 23}$$

where $i* = (i + 1) \bmod 4$ and $i** = (i + 3) \bmod 4$

Thus, in order for the binarization part 1660 to generate the threshold value $BTH_N$ for binarizing CB pixels, the threshold value normalization part 1631 normalizes the first threshold value Th1 calculated by the first threshold value calculation part 1621 and generates the second threshold value Th2. At this time, the second threshold value Th2 is used as the pixel threshold value $BTH_N$ for the binarization operation for the CB pixels by the binarization part 1660.

The threshold value normalization part 1631 normalizes the first threshold value Th1 using a method equal to the normalization method of the normalization part 1625. The threshold value normalization part 1631 normalizes the first threshold value as in the following Equation 24, and generates the second threshold value Th2 (or the threshold value $BTH_N$).

$$Th2 = \frac{(Th1 - \mu_1)}{(\mu_0 - \mu_1)} \qquad \text{Equation 24}$$

In the above Equation 24, Th2 denotes a normalized threshold value for allowing the binarization part 1660 to discriminate the character and background pixels, $\mu_0$ denotes a brightness value for the character pixels, and $\mu_1$ denotes a mean brightness value for the background pixels.

The edge enhancement part 1640 shown in FIG. 21 reduces the dynamic range by normalizing the character and background pixels within a CB (or a grouped block containing the CB), and performs a quadratic processing operation for the normalized pixels to enhance the edges of the CB (or the grouped block containing the CB). Since the CB (or the grouped block containing the CB) output from the quadratic processing part 1627 is a normalized block, the first threshold value is normalized, and the threshold value $BTH_N$ for the binarization of the CB pixels is generated.

Referring to FIG. 19, the edge enhancement part 1640 in the image binarization part 950 can be implemented using the IQF as in FIG. 21. The edge enhancement part 1640 using the IQF performs a function of enhancing edges while addressing a drawback that a black block surrounding characters of the binarized image occurs after the CB (or the grouped block containing the CB) is binarized.

The grouped blocks output from the edge enhancement part 1640 are applied to the block splitting part 1650. The block splitting part 1650 having received the grouped blocks separates an image of the CBs from the grouped blocks and outputs the separated image. This is for an image restoration after the surrounding blocks associated with the CB are grouped by the block grouping part 1630.

The CBs output from the block splitting part 1650 are input into the binarization part 1660. The binarization part 1660 receives the threshold value output from the edge enhancement part 1640 to binarize the CB pixels. At this time, the CBs input into the binarization part 1660 are $y(m, n)$ (corresponding to CBs output from the QF in FIG. 21) or $y_N(m, n)$ (corresponding to CBs output from the IQF in FIG. 21). Thus, the pixel threshold value becomes BTH or $BTH_N$.

The binarization part 1660 performs the binarization operation by classifying the received CB pixels into the character and background pixels using the threshold value, and converting the classified character and background pixels into pixels having the two brightness values. In other words, the binarization part 1660 compares the threshold value corresponding to the input CB image with values of the CB pixels, classifies image pixels into character pixels if the values of the CB pixels are equal to or larger than the pixel threshold value as a result of the comparison, and classifies image pixels into background pixels if the values of the CB pixels are smaller than the pixel threshold value as the result of the comparison. The binarization part 1660 performs the binarization operation by converting the character pixels into pixels having a brightness value "α" and converts the background pixels into pixels having a brightness value "β" according to a result of classifications. A method for binarizing CB pixels by means of the binarization part 1660 is based on the following Equation 25.

$$y_B(m, n) = \begin{cases} \alpha, & \text{if } y(m, n) \geq BTH \text{ or if } y_N(m, n) \geq BTH_N \\ \beta, & \text{otherwise} \end{cases} \quad \text{Equation 25}$$

In the above Equation 25, y(m, n) and BTH denote a CB output from the QF and a threshold value, respectively, $y_N$(m, n) and $BTH_N$ denote a CB output from the IQF and a threshold value, respectively, and $y_B$(m, n) denotes pixels of the binarized CB.

The binarization part 1660 receives a BB image from the block classification part 1610 or the block growing part 1620, and collectively converts the BB pixels into pixels having the brightness value "β".

Figure 23:
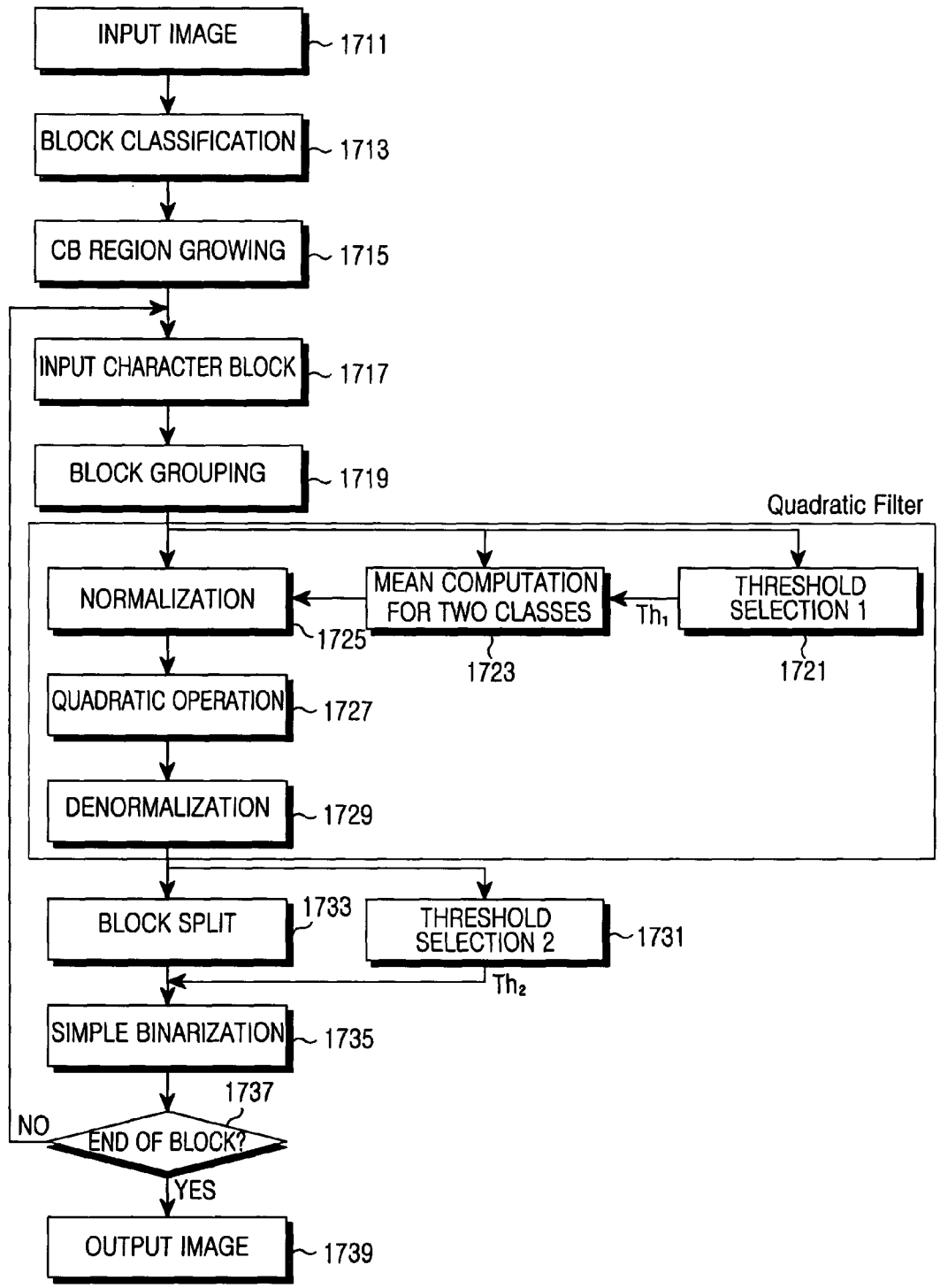
FIG. 23 is a flow chart illustrating an example of a process of binarizing an image by means of the image binarization part using a quadratic filter in accordance with an embodiment of the present invention.

FIG. 23 is a flow chart illustrating an example of a binarization method where the edge enhancement part 1640 is implemented using the IQF in accordance with an embodiment of the present invention.

Referring to FIG. 23, an image is input at step 1711. At step 1713, the block classification part 1610 performs a function of dividing the input image into blocks, analyzing pixels of the blocks and classifying the blocks into CBs and BBs.

At step 1715, the block growing part 1620 extends the CBs classified by the block classification part 1610. In the block classification process, a CB can be classified as a BB due to the influence of a background between character pixels. The block growing part 1620 grows a CB in order to extend pixels classified as a BB to a CB. Then, at step 1717, the block growing part 1620 sequentially outputs grown CBs to the block grouping part 1630. At this time, the image output to the block grouping part 1630 can correspond to the CBs. At step 1719, the block grouping part 1630 receives the CBs output from the block growing part 1620, performs a function of grouping each of the CBs output from the block growing part 1620 along with adjacent blocks of 8 with a center of a CB and then generates the grouped blocks.

The grouped block image is input into the edge enhancement part 1640. Here, the edge enhancement part 1640 becomes the IQF. On the basis of the operation of the IQF, the first threshold value Th1 for classifying each pixel of the CB into a character or background pixel is calculated at step 1721. The first threshold value Th1 can be calculated using the above Equation 19. At step 1723, calculation operations associated with the above Equations 20 and 21 are performed, CB pixels are classified into character and background pixels on the basis of the first threshold value Th1, and mean brightness values for the character and background pixels for a CB are calculated. At step 1725, the pixels of the CB x(m, n) are normalized using the mean brightness value $\mu_0$ for the character pixels and the mean brightness value $\mu_1$ for the background pixels so that the character pixels can have values close to a logical "1" state and the background pixels can have values close to a logical "0" state. In the normalization process, the pixels of the CB x(m, n) are normalized on the basis of the above Equation 22.

At step 1727, the normalized CB $x_N$(m, n) is quadratically processed by a quadratic processing part 1627, CB edges are enhanced, and their noise components are reduced. In the quadratic process, a calculation operation as in the above Equation 23 is performed. At step 1729, the first threshold value Th1 is normalized using a method equal to the above-described normalization method on the basis of the above Equation 24, and the second threshold value Th2 (or the pixel threshold value $BTH_N$) is generated.

At step 1733, the grouped block is received after the improved quadratic processing, the CB is separated from the grouped block, and the separated CB is output. In other words, a block splitting process performs a function of separating only a CB located at centers of the grouped block from the grouped block. At step 1735, separated CB pixels are compared with the pixel threshold value $BTH_N$, and are binarized into character and background pixels having the first and second brightness values. BB pixels generated after the block classification process or block grouping process are binarized into pixels having the second brightness value.

A binarization operation for the CBs and BBs is performed by repeating the above-described steps. If the binarization operation for all blocks of the image is completed, the completion of the binarization operation is sensed at step 1737, and the binarized image is output at step 1739.

Figure 24A:
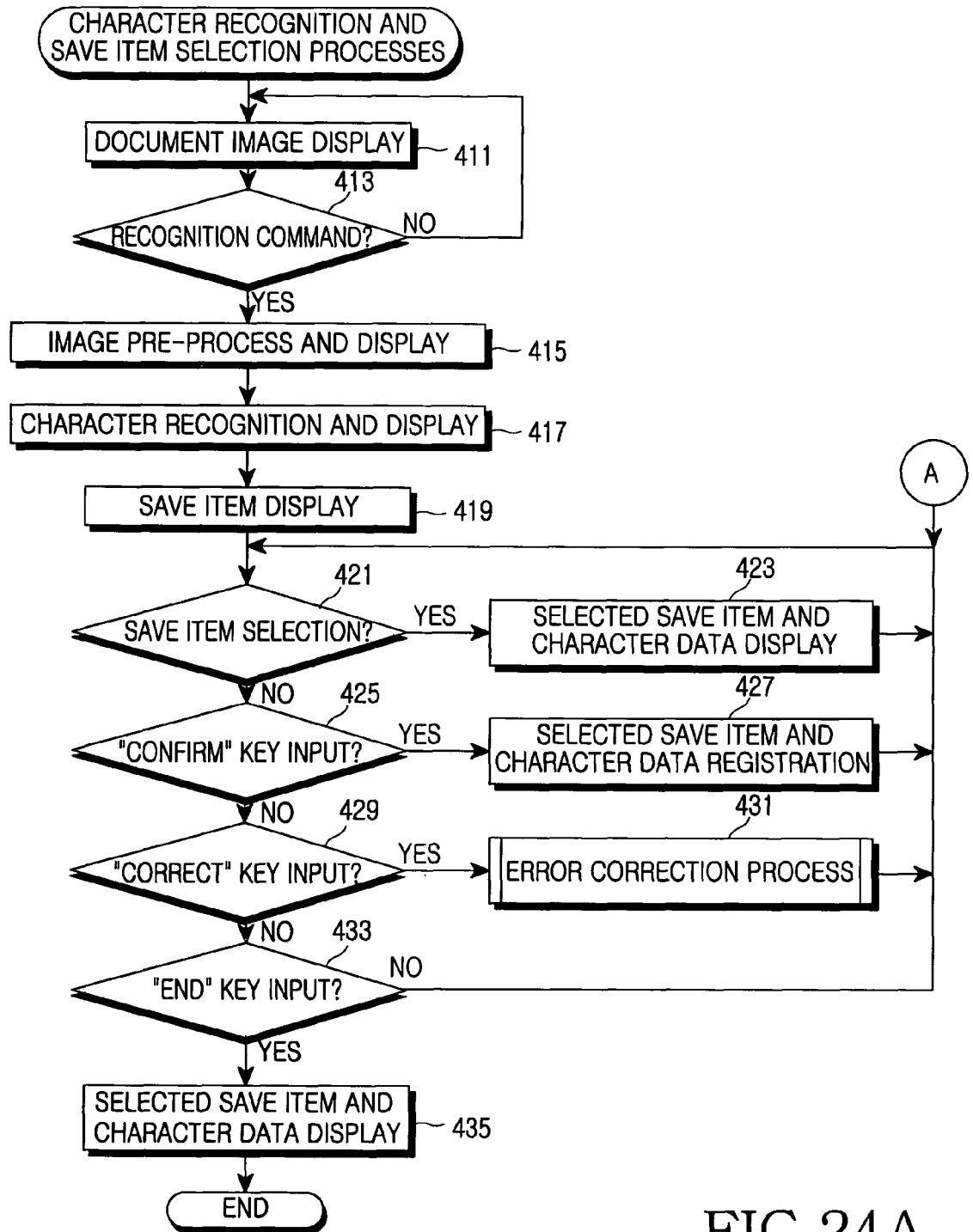
FIGS. 24A and 24B are flow charts illustrating examples of character recognition and SAVE item selection processes in accordance with an embodiment of the present invention.
Figure 24B:
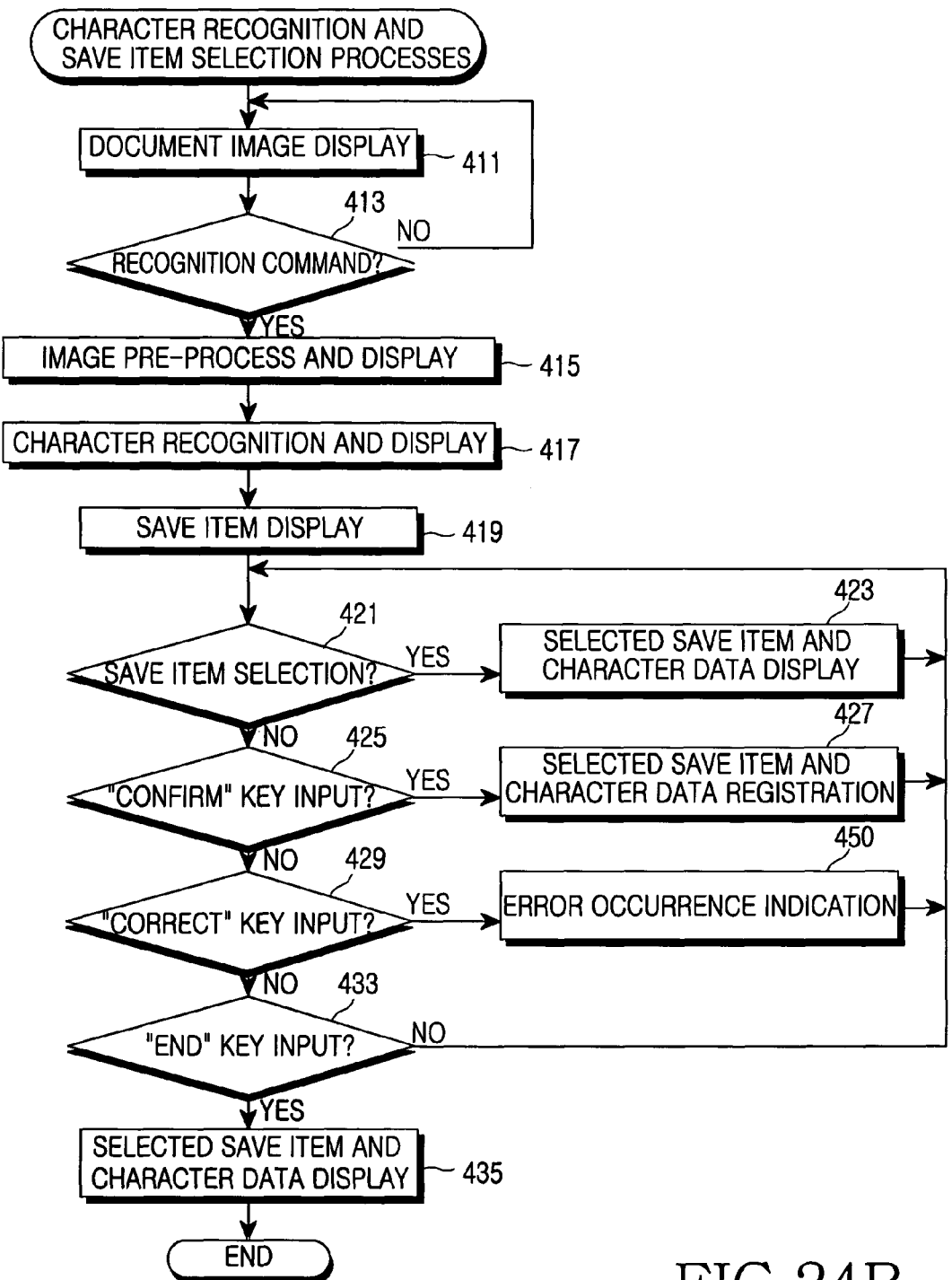
Figure 27A:
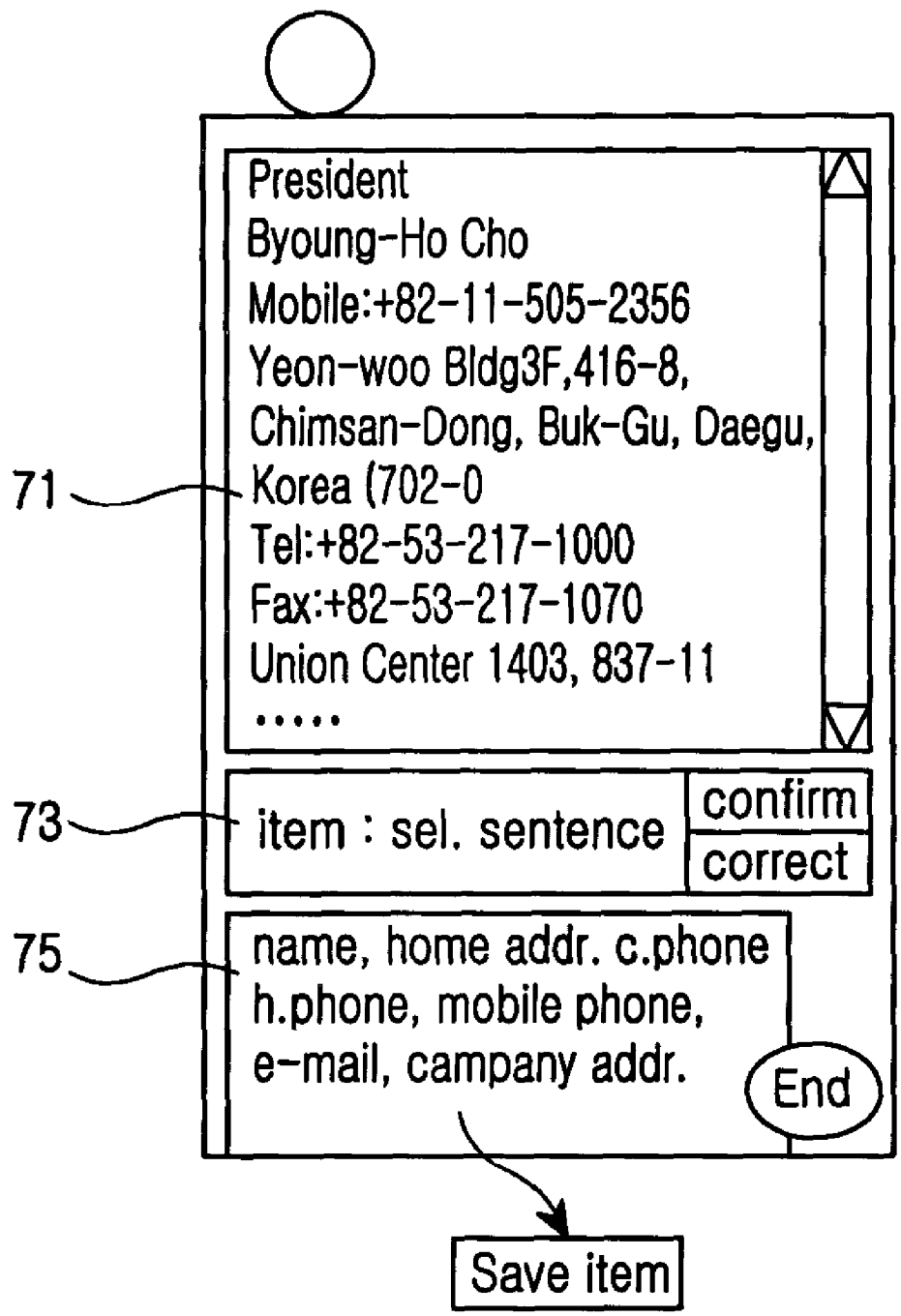
FIGS. 27A and 27B are views illustrating examples of display screen states of the display unit in the character recognition and SAVE item selection processes in accordance with an embodiment of the present invention.
Figure 27B:
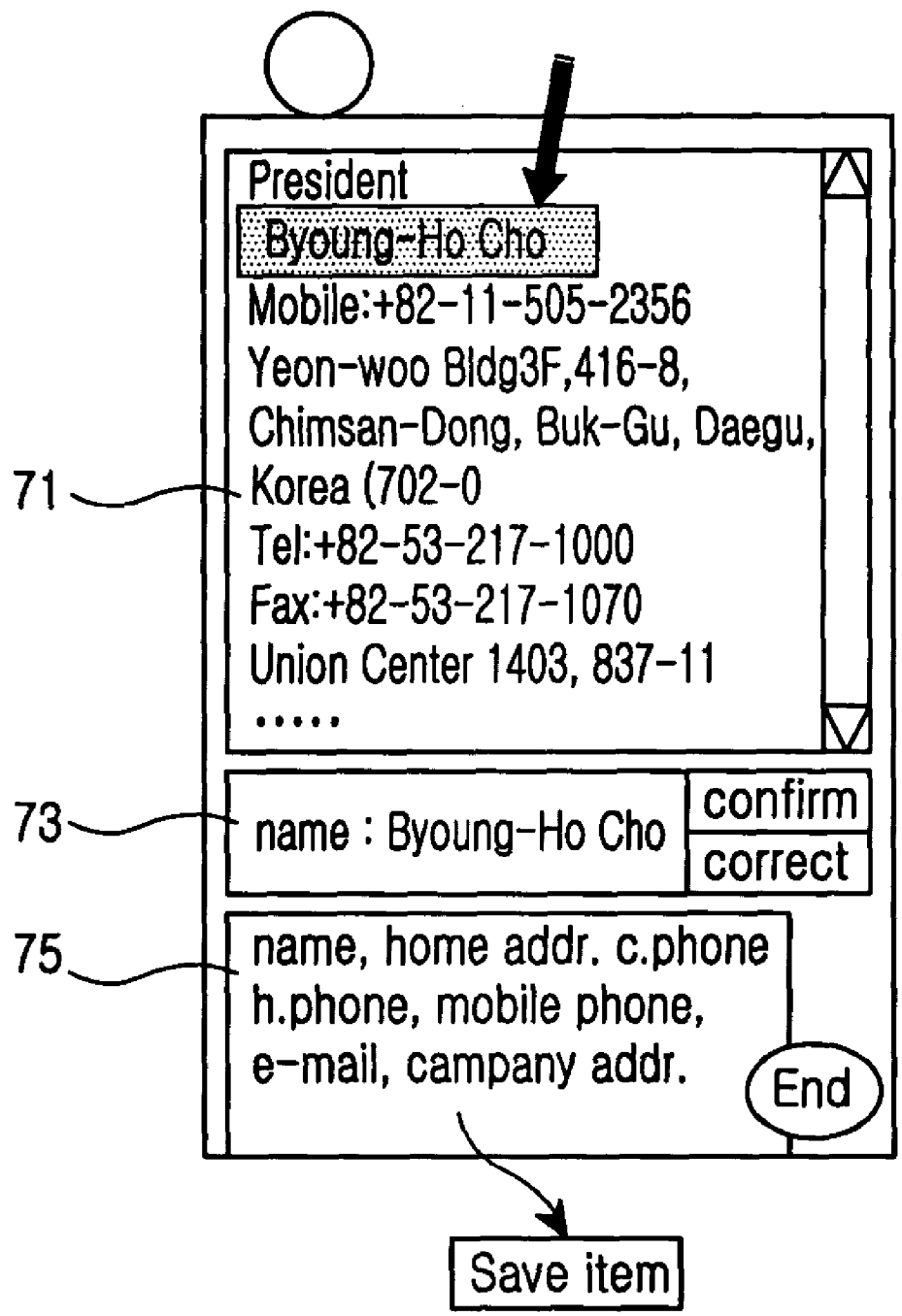

FIGS. 24A and 24B are flow charts illustrating an example of the document image pre-process, the character recognition process and the SAVE item selection process at the above steps 210 to 230 shown in FIG. 2 in accordance with an embodiment of the present invention. FIGS. 27A and 27B show results of the above-described processes. Here, it is assumed that a document is a card bearing a person's name and other information, and SAVE items are stored in a phone book.

It is preferable that a document "RECOGNIZE" key inputting for a document recognition command is configured according to types of frequently used documents in the document recognition process. For example, character information recorded on the card can be stored in the phone book of the mobile terminal. A company name, a company department, a person's name, the person's title, an e-mail address, a mobile phone number, etc. are recorded on the card. Thus, when information for the phone book is registered in the mobile terminal, it is useful to recognize character information of the card and store the recognized character information in the phone book. Where a character image of a document such as a card, etc is recognized, it is convenient that a table having an assigned storage area capable of storing card items or card item information is preset in advance, the fact that a document to be recognized is a card is detected by the controller 101 when a card "RECOGNIZE" key is input, SAVE items of the card are automatically displayed, and information item is selectively registered. Thus, in the embodiment of the present invention, document "RECOGNIZE" keys based on types of documents are provided, table items based on the types of documents are assigned to the table in advance, table items associated with a corresponding document can be displayed when a corresponding document "RECOGNIZE" key is input. Furthermore, where a document not previously preset is recognized, a document RECOGNITION key is selected, and document items can be manually set to be processed. In the following embodiment of the present invention, we assume that the document is a card.

Referring to FIG. 24A, the controller 101 enables the display unit 115 to display an image of a stored card as shown in FIG. 26E at step 411 before a card "RECOGNIZE" key is input at step 413. At this time, if a user inputs the card "RECOGNIZE" key of the input unit 113, the controller 101 detects the card "RECOGNIZE" key input at the above step 413 and drives the pre-processor 121 so that a pre-processing operation for the displayed document image can be performed at step 415. The pre-processing operation can be performed by means of the pre-processor 121 shown in FIG. 4. If the image is determined to be blurred in the pre-processing operation, the controller 101 stops the following step and can request that a new document image be input.

On the other hand, if the image is decided not to be blurred, the controller 101 drives the character recognizer 123 so that a character image can be recognized from the pre-processed document image at step 417. The character recognizer 123 converts the displayed card image shown in FIG. 26E into character data (text), and the controller 101 enables the display unit 115 to display the character data as shown in FIG. 27A. The terminal device must include a plurality of recognizers. That is, documents such as a card, etc. can include Korean characters, English letters, digits, special characters, Chinese characters or other language characters. Thus, a program of a corresponding recognizer according to types of characters to be recognized must be selected. In the embodiment of the present invention, we assume that characters to be recognized are English letters and a recognizer uses ABBYY's FineReader 5.0™ office trial version for mainly recognizing English language.

Figure 25A:
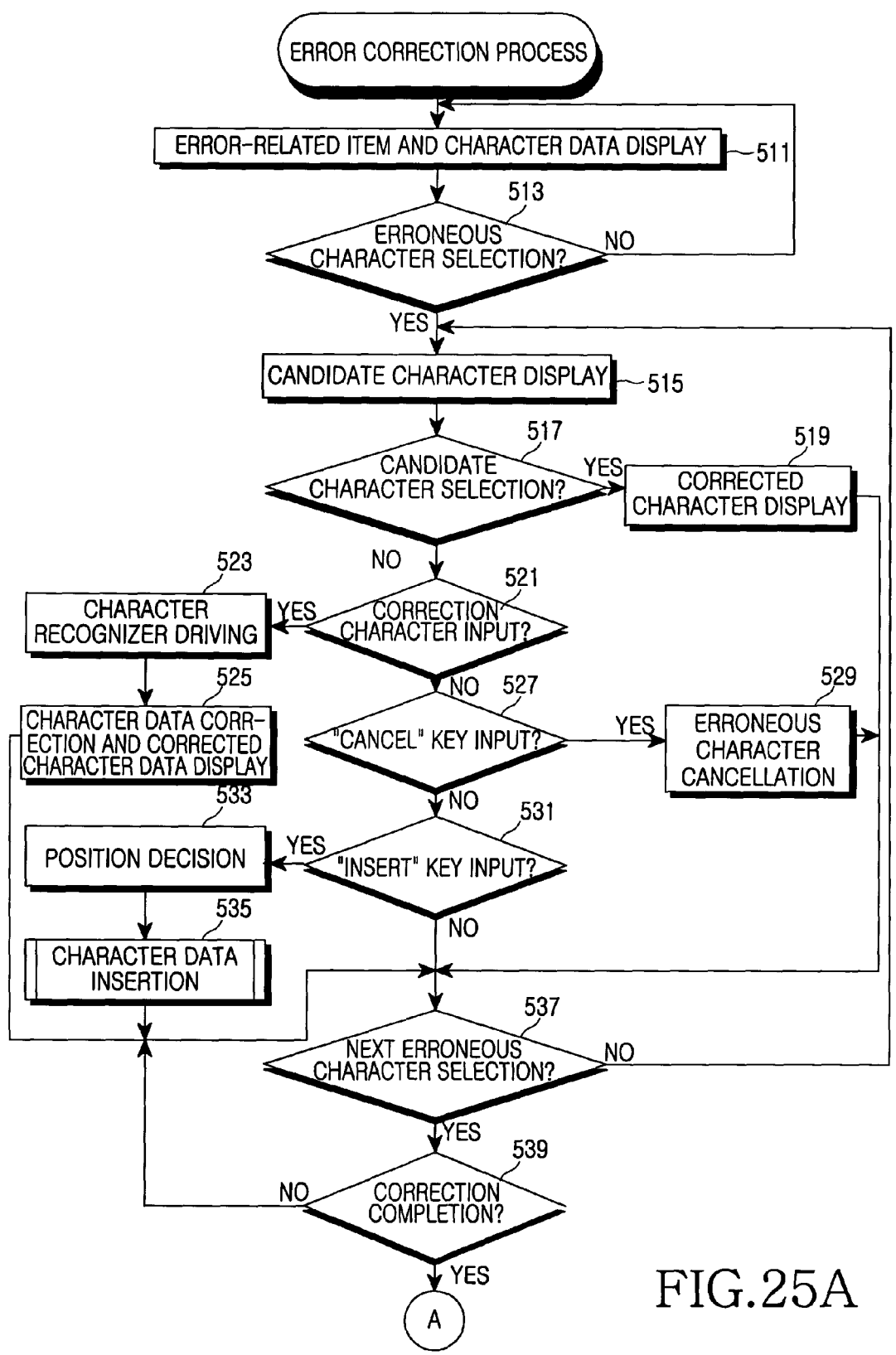
FIGS. 25A and 25B are flow charts illustrating examples of an error correction process in accordance with an embodiment of the present invention.

If the card image has been completely converted into the character data, the controller 101 enables the first display area 71 of the display unit 115 to display the character data of the card image, enables the third display area 73 to display "ITEM SELECTION" and enables the second display area 75 to display SAVE items as shown in FIG. 27A. The SAVE items displayed on the second display area 75 includes a person's name, a company phone number, a mobile phone number, a home phone number, a facsimile number, an e-mail address, a company address, others additional items, etc. When the user selects a character data (or sentence) item of the first display area 71 and selects a SAVE item displayed on the second display area 75 using a stylus pen as shown in FIG. 277B in a display state shown in FIG. 27A, the controller 101 detects the character data and SAVE item selections at step 421, and enables the third display area 73 of the display unit 115 to display the selected SAVE item and character data corresponding to the SAVE item as shown in FIG. 27B at step 423. Then, if a "CONFIRM" key is input from the input unit 113, the controller 101 detects the "CONFIRM" key input at step 425, and registers the selected SAVE item and the character data corresponding to the SAVE item at step 427. If a "CORRECT" key is input from the input unit 113, the controller 101 detects the "CORRECT" key input at step 429, and performs an error correction process as shown in FIG. 25A at step 431. Corrected error data is registered through the above steps 425 and 427. If an "END" key is input from the input unit 113, the controller 101 detects the "END" key input at step 433 and enables the display unit 115 to display all selected SAVE items and character data corresponding to the SAVE items at step 435.

FIG. 25A is a flow chart illustrating an example of a method for correcting erroneous character data on a selected item-by-item basis in accordance with an embodiment of the present invention.

Figure 28A:
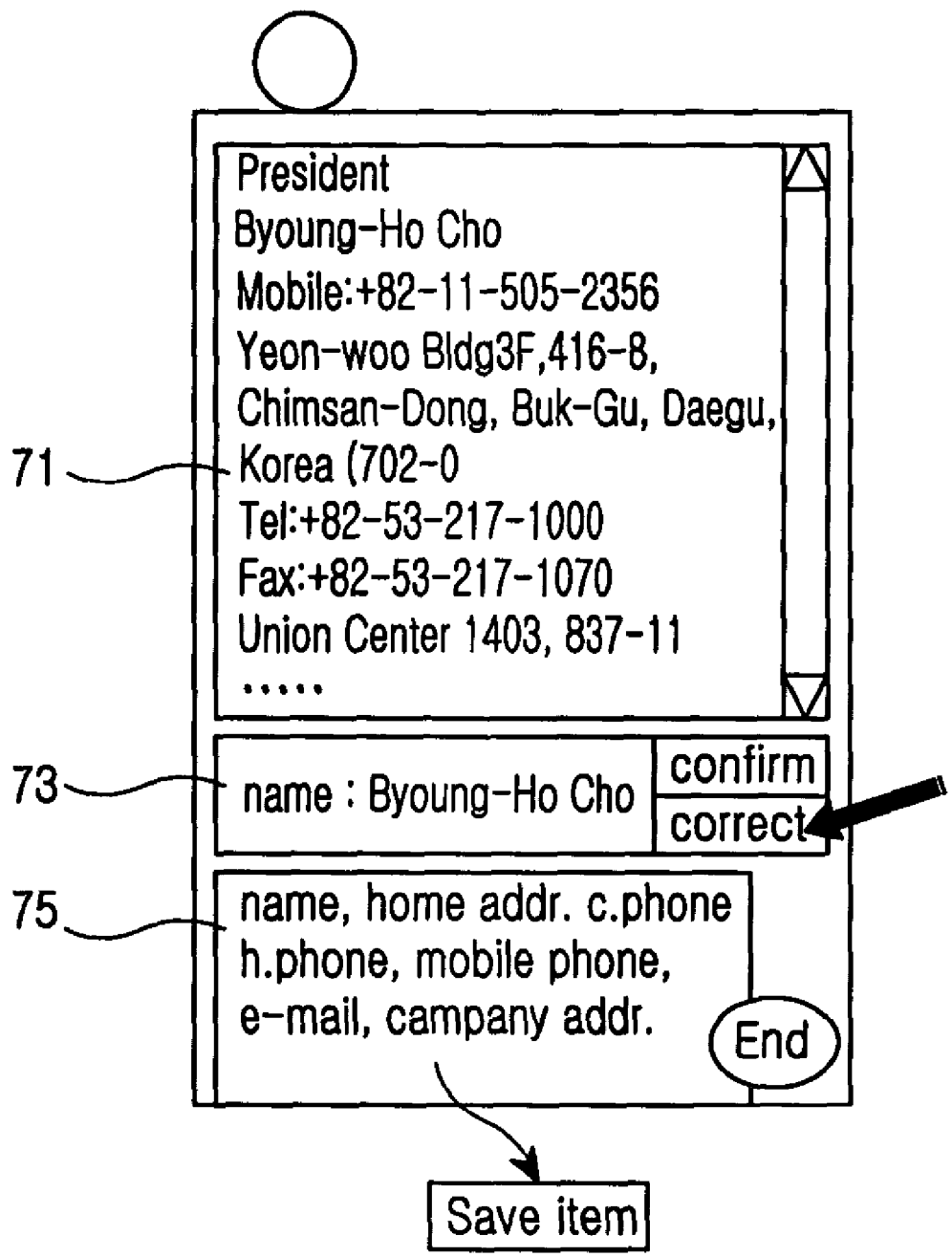
FIGS. 28A to 28D are views illustrating examples of display screen states of the display unit in the error correction process in accordance with an embodiment of the present invention.

The error correction process preformed at the above step 431 shown in FIG. 24A will be described in detail with reference to FIG. 25A. If the "CORRECT" key is input, the controller 101 enables the third display area 73 of the display unit 115 to display an erroneously recognized item and character data corresponding to the erroneously recognized item as shown in FIG. 28A at step 511. If the user clicks erroneously recognized character data displayed on the first display area 71 of the display unit 115 using the stylus pen in a display state as in FIG. 28A, the controller 101 detects the erroneously recognized character data click at step 513, and enables the display unit 115 to indicate the character data to be corrected as shown in FIG. 28B at step 515.

In the first embodiment of the present invention, two methods can be used to correct erroneously recognized character data. In other words, if an erroneously recognized character is designated as shown in FIG. 28B, the controller 101 enables the third display area 73 of the display unit 115 to display candidate characters for correcting the erroneously recognized character, enables the second display area 75 to display a recognition window for inputting a handwritten character for correcting the erroneously recognized character, and enables the fourth display area 77 to display a soft keypad for generating key data for correcting the erroneously recognized character. Thus, the user can select a desired character of the candidate characters displayed on the third display area 73 or input a desired character in the form of a handwritten character on the second display area 75 to correct the erroneously recognized character. Furthermore, the soft keypad as well as the recognition window for inputting the handwritten character is displayed and key data generated from the soft keypad is analyzed so that the erroneously recognized character can be corrected.

Figure 28B:
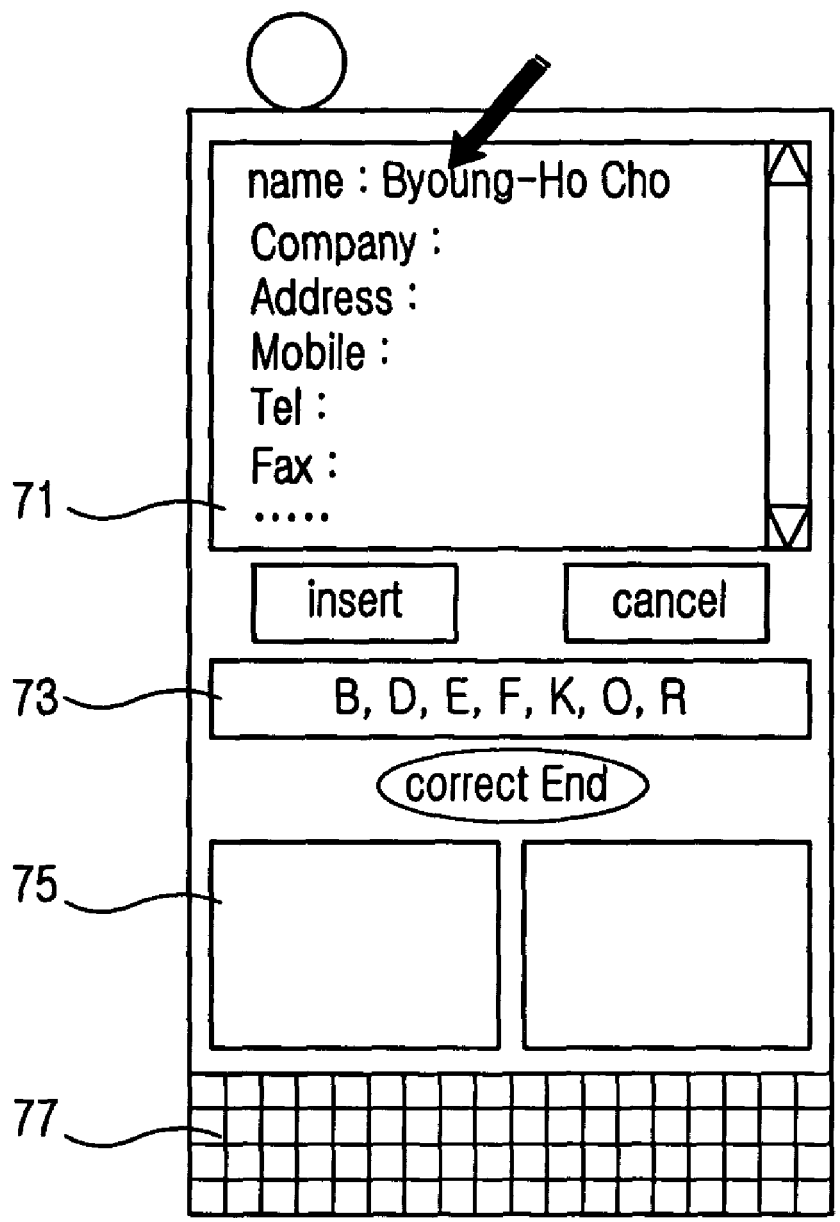
Figure 28C:
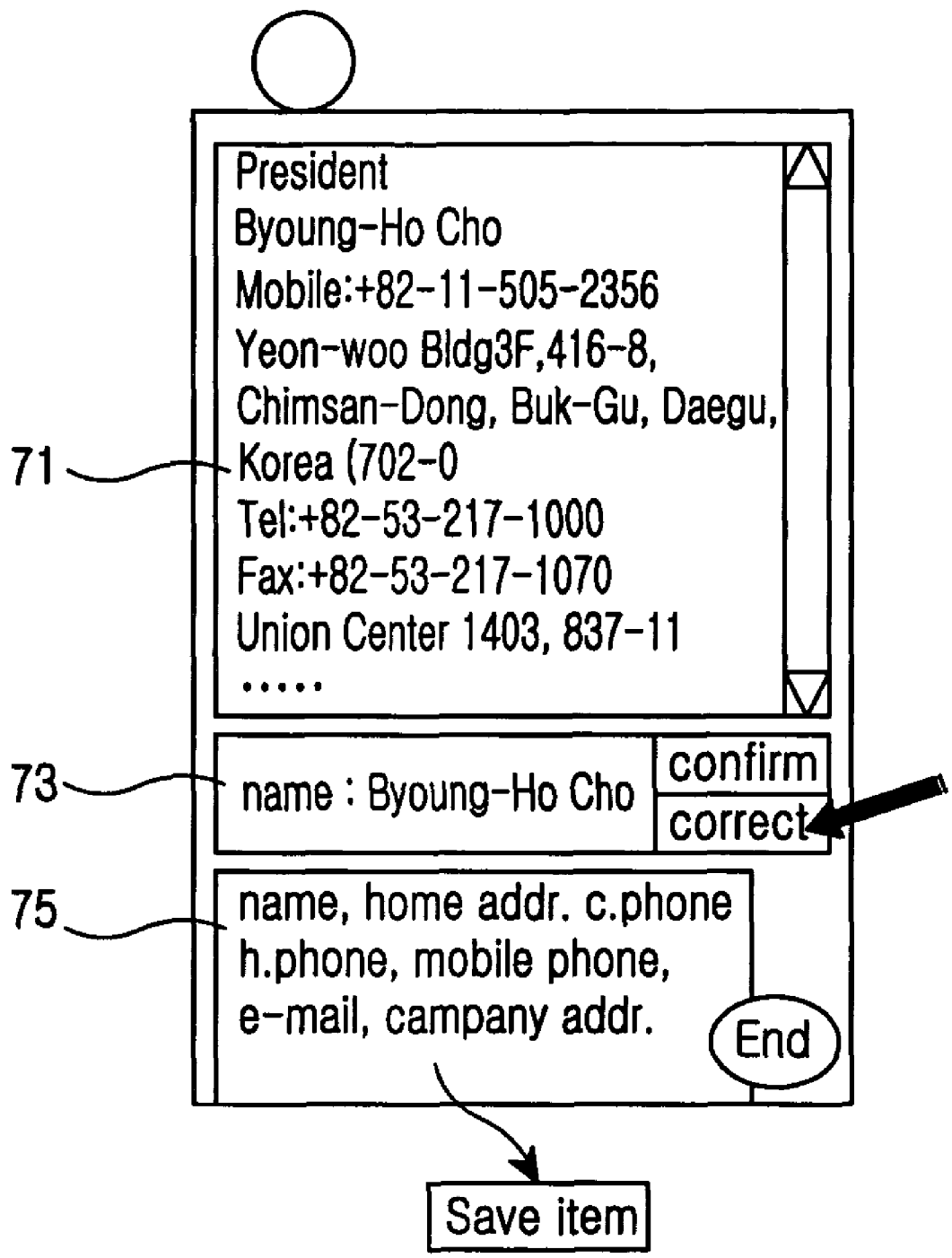

If the user selects an arbitrary candidate character of the candidate characters displayed on the third display area 73 in a sate where the erroneously recognized character is indicated as shown in FIG. 28B, the controller 101 detects the arbitrary character selection at step 517 and corrects or replaces the erroneously recognized character displayed on the first display area 71 with the selected candidate character. Further, if the user inputs a handwritten character into the recognition window of the second display area 75 using the stylus pen in a sate where the erroneously recognized character is indicated as shown in FIG. 28B, the controller 101 detects the handwritten character input at step 521 and drives a handwritten character recognizer of the character recognizer 123 at step 523. At step 525, the controller 101 corrects or replaces the erroneously recognized character data with another character data recognized by the character recognizer 123. Furthermore, if key data is generated from the soft keypad of the fourth display area 77 in a sate where the erroneously recognized character is indicated as shown in FIG. 28B, the controller 101 detects the key data generation at the above step 521, and drives a soft key recognition module of the character recognizer 123 at the above step 523. Then, the controller 101 corrects or replaces the erroneously recognized character data with another character data recognized by the character recognizer 123 at the above step 525.

If a "CANCEL" key is input, the controller 101 detects the "CANCEL" key input at step 527 and cancels, at step 529, the erroneously recognized character selected at the above step 513. If an "INSERT" key is input, the controller 101 detects the "INSERT" key input at step 531 and determines a position for adding (or inserting) the character data at step 533. At this time, the position can be a position before or behind the character selected at the above step 513. Then, the controller 101 performs a process of selecting the candidate character or inputting the handwritten character and adds (or inserts) a character into the determined position.

If the user selects another erroneously recognized character corresponding to a selected SAVE item after the candidate character is selected, the erroneously recognized character is corrected or replaced with the handwritten character, the selected character is cancelled, or another character is added or inserted, the controller 101 detects the erroneously recognized character selection at step 537, returns to the above step 515 and repeats the above-described steps.

If the above-described steps are repeated, the controller 101 corrects characters corresponding to selected SAVE items. Then, if the "CORRECT END" key is input, the controller 101 detects the "CORRECT END" key input at step

539, completes the error correction process associated with the selected SAVE items, and returns to the above step 421 shown in FIG. 24A.

Figure 28D:
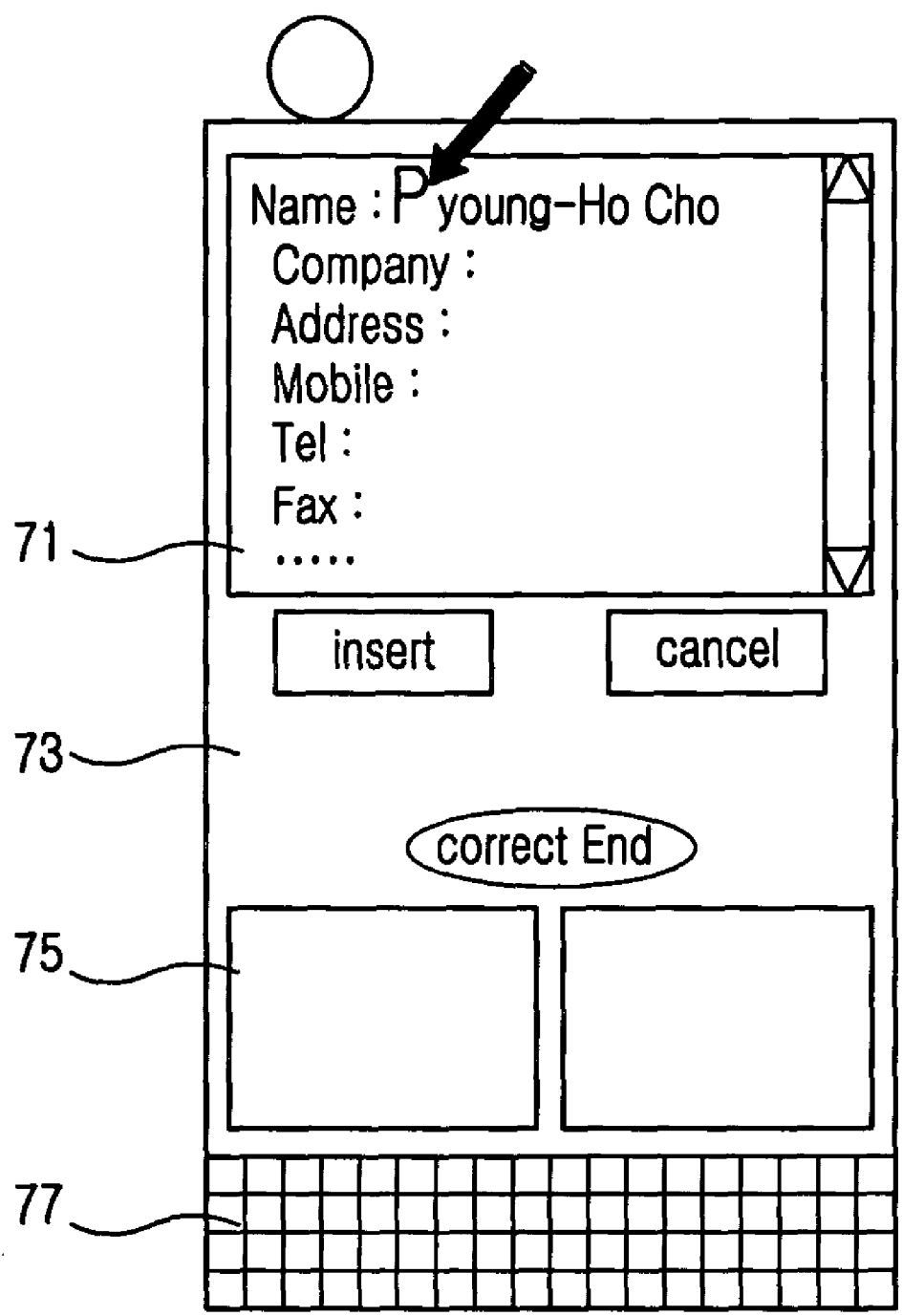

FIGS. 28A and 28B are shown to explain an operation using candidate characters and handwritten character recognition in the character data correction process. However, the erroneously recognized character can be corrected using only a handwritten character without using the candidate characters. FIG. 28D is a flow chart illustrating a method for correcting character data by inputting handwritten characters or soft keys without using the candidate characters.

In the method shown in FIGS. 24A and 25A, a SAVE item is selected, the selected SAVE item and character data corresponding to the selected SAVE item are registered if the character data does not have any errors. The character data is corrected if the character data has errors, and the selected SAVE item and the corrected character data are registered.

Character data displayed on the first display area 71 is selected with the stylus pen as shown in FIG. 27B, and a SAVE item, corresponding to the character data, displayed on the second display area 75 is selected with the stylus pen. Then, the selected SAVE item and the character data corresponding to the selected SAVE item are displayed on the third display area 73. At this time, the "CONFIRM" key is clicked with the stylus pen as shown in FIG. 27B if the SAVE item and the character data displayed on the third display area 73 are appropriate. In this case, the SAVE item and the character data displayed on the third display area 73 are registered. However, if the character data displayed on the third display area 73 has an error, the "CORRECT" key is clicked with the stylus pen as shown in FIG. 28A. Then, if an erroneous character displayed on the first display area 71 as shown in FIG. 28B is clicked with the stylus pen, the clicked character is enlarged and displayed, and candidate characters associated with the erroneously recognized character are displayed on the third display area 73. Then, the recognition window for inputting the handwritten character is displayed on the second display area 75, and the soft keypad is displayed on the fourth display area 77. In this state, a method for correcting the erroneously recognized character selects one of the candidate characters displayed on the third display area 73, inputs a handwritten correction character into the recognition window of the second display area 75, or inputs character key data for the error correction process through the soft keypad of the fourth display area 77. Further, where the character is cancelled or inserted, the "CANCEL" key is input or the "INSERT" key is input. If another erroneously recognized character associated with the selected SAVE item exists, the above-described procedure is repeated. If the correction process has been completed, the user clicks the "CORRECT END" key with the stylus pen. If so, the method returns to the display state shown in FIG. 27A so that the next SAVE item can be selected.

The method for correcting an erroneously recognized character through the handwritten character input, the candidate character selection and the soft keypad has been described, but the method can be implemented through only the handwritten character input or the soft keypad. Furthermore, the method can be implemented using the candidate character selection and the handwritten character recognition or can be implemented using the candidate character selection and the soft keypad.

Figure 25B:
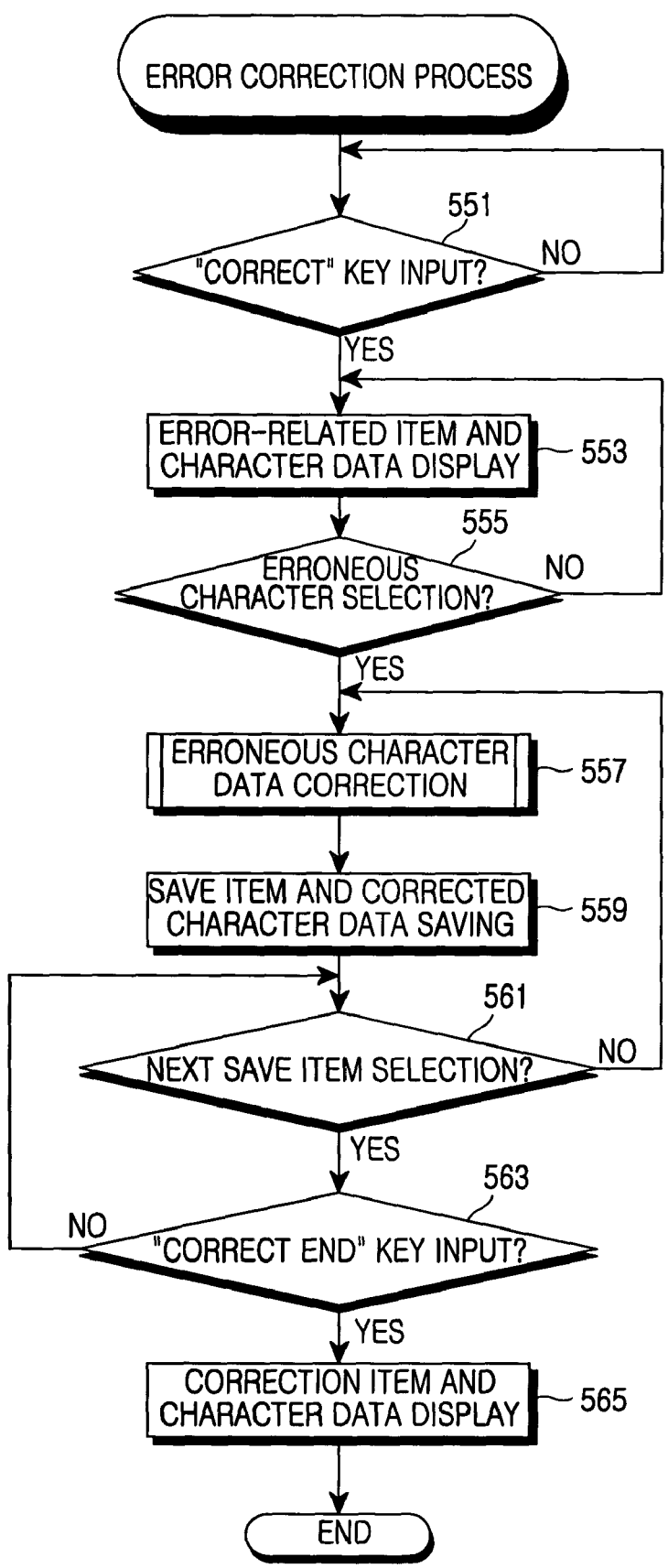

FIGS. 24B and 25B are flow charts illustrating examples of a method for carrying out other SAVE item selection and error correction processes in accordance with the first embodiment of the present invention.

The method for carrying out other SAVE item selection and error correction processes will be described with reference to FIG. 24B. The character recognition and SAVE item selection processes shown in FIG. 24B are almost identical to those shown in FIG. 24A, except that a signal indicating that an error associated with a corresponding SAVE item exists is displayed in FIG. 24B before the error correction process if the "CORRECT" key is input. In other words, if the "CORRECT" key is input in the item selection process, the controller 101 detects the "CORRECT" key input at step 429, and enables the display unit 115 to display the signal indicating that an error of character data associated with a corresponding SAVE item exists at step 450. Then, the method returns to step 421. The method shown in FIG. 24B is almost identical to that shown in FIG. 24A except for the correction process. Thus, if a character recognition error associated with the selected SAVE item in the SAVE item selection process subsequent to the character recognition process exists when the character recognition and SAVE item selection processes are performed using the method shown in FIG. 24B, the signal indicating that an error associated with a corresponding SAVE item exists is displayed and the method returns to another step. Otherwise, if no character recognition error exists, a corresponding SAVE item and characters associated with the SAVE item are registered.

The method can be implemented by the SAVE item selection process subsequent to the character recognition process without performing character confirmation and correction operations on a SAVE item-by-item basis. In other words, after all desired items are selected from the recognized document without the character confirmation and correction operations, a method for confirming character data of selected SAVE items and collectively correcting all errors associated with the character data can be implemented.

FIG. 25B is a flow chart illustrating an example of a method for correcting erroneous character data associated with SAVE items after the character recognition and SAVE item selection processes as in the method shown in FIG. 24B in accordance with an embodiment of the present invention.

The error correction method will be described with reference to FIG. 25B. If the "CORRECT" key is input, the controller 101 detects the "CORRECT" key input at step 551, enables the second display area 75 of the display unit 115 to display erroneously recognized items and enables the first display area 71 of the display unit 115 to display character data corresponding to the erroneously recognized items at step 553. If the user clicks erroneously recognized character data displayed on the first display area 71 of the display unit 115 using the stylus pen in a display state as in FIG. 28A, the controller 101 detects the erroneously recognized character data click at step 513, and enables the display unit 115 to indicate the erroneously recognized character data as shown in FIG. 28B at step 515. Then, if the user clicks a SAVE item for correcting the erroneously recognized character data using the stylus pen, the controller 101 detects the SAVE item click at step 555, proceeds to step 557 and performs the process shown in FIG. 25A.

The process shown in FIG. 25A corrects erroneously recognized character data associated with character data of the selected SAVE item. If the correction process is completed, the controller 101 stores a corresponding SAVE item and corrected character data at step 559. If the user selects the next SAVE item after the correction process for the character data associated with the selected SAVE item is completed, the controller 101 detects the next SAVE item selection at step 561, returns to the above step 557 and repeats the operation of correcting the erroneously recognized character data associated with the selected SAVE item. The SAVE items associated with the erroneously recognized character data are sequentially selected so that the character data correction operation can be performed. Then, if the character data correction process for all SAVE items is completed, the user inputs the "CORRECT END" key of the input unit 113. The controller 101 detects the "CORRECT END" key input at step 563 and enables the display unit 115 to display SAVE items and corrected character data corresponding to the SAVE items and saves them at step 565.

Figure 29A:
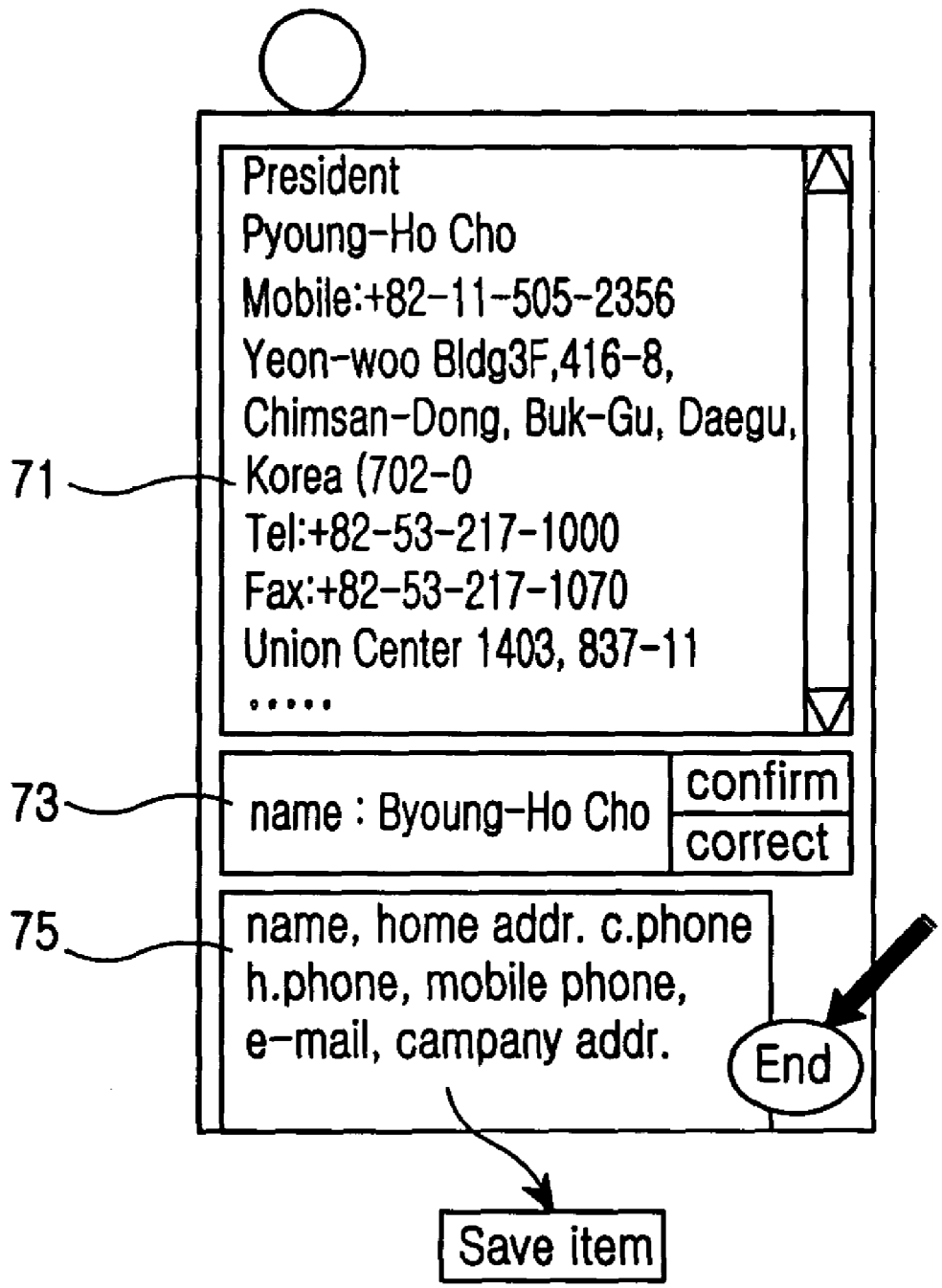
FIGS. 29A and 29B are views illustrating examples of display screen states of the display unit after the error correction process in accordance with an embodiment of the present invention.
Figure 29B:
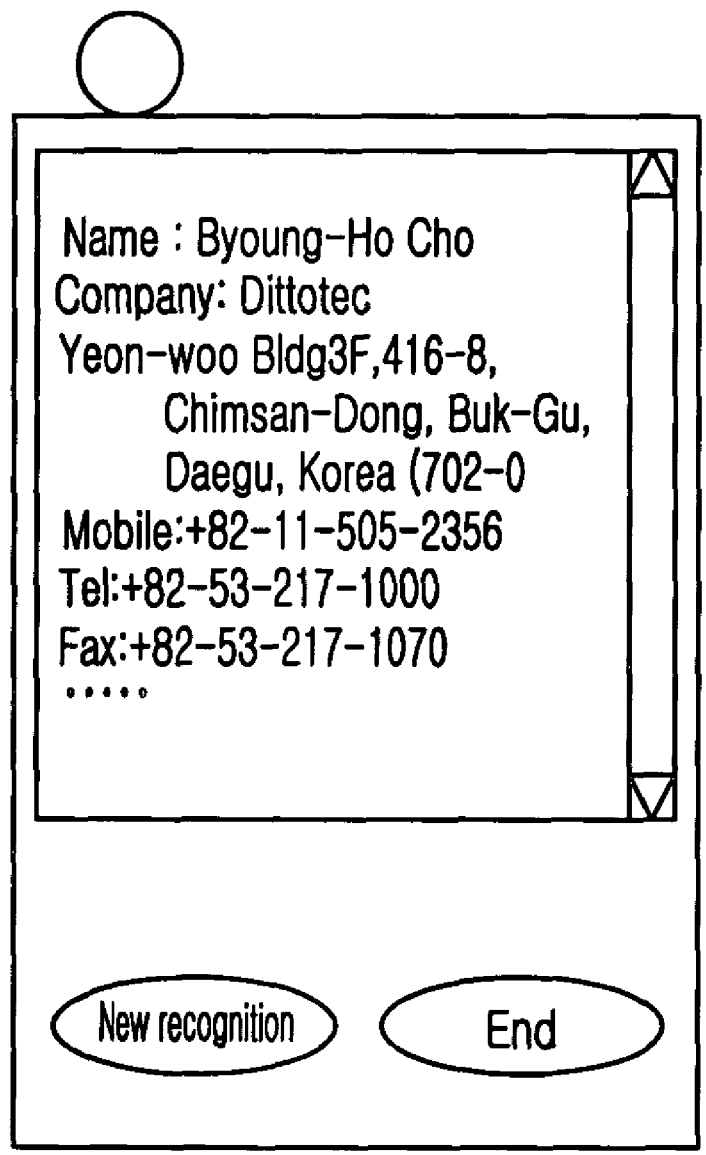

If the character recognition, SAVE item selection and error correction processes are completed, all desired information items recorded on the card can be input. In this case, character data of the selected SAVE items is displayed as shown in FIG. 29A. In this state, if the user clicks the "END" key using the stylus pen, the controller 101 detects the fact that the card recognition is completed and enables the display unit to display all SAVE items and the character data corresponding to the SAVE items on a single screen as shown in FIG. 29B. Then, the character data displayed as shown in FIG. 29B is stored in the database 131. In other words, the database 131 saves SAVE item-based data recognized from the document in a desired storage area thereof if the input, recognition and correction processes are completed. The database 131 can include various storage spaces capable of storing a phone book, memos, other applications, etc. If all desired data items are stored, a program is terminated.

In accordance with the second embodiment of the present invention, an error is corrected on a SAVE item-by-item basis, and a speech recognition method is used in the document recognition and error correction processes.

Figure 30:
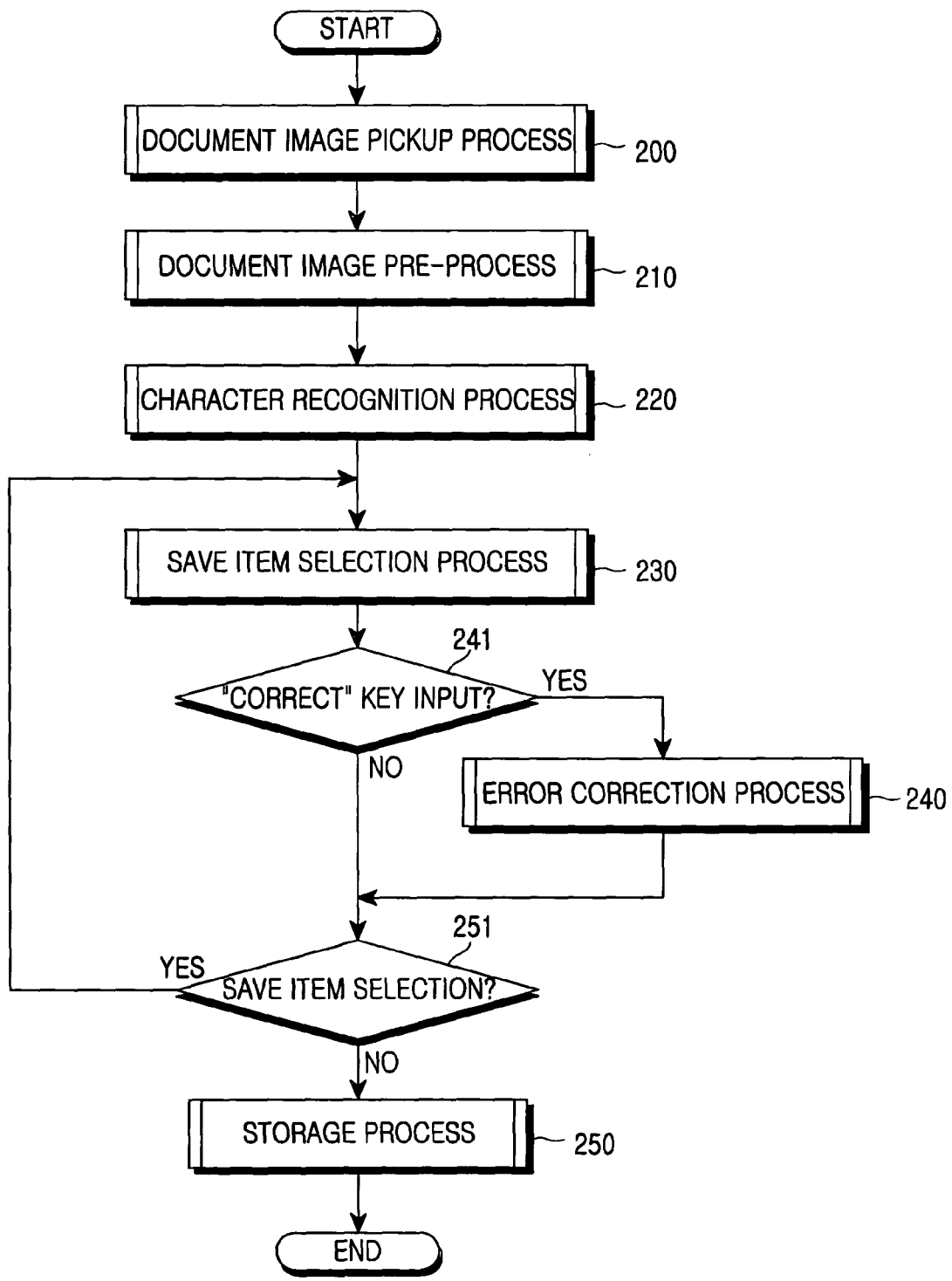
FIG. 30 is a flow chart illustrating an example of a document recognition process in accordance with the second embodiment of the present invention.

FIG. 30 is a flow chart illustrating an example of a document recognition process in accordance with the second embodiment of the present invention.

Referring to FIG. 30, the controller 101 enables the camera 107 to detect a document image at step 200. At this time, the image detected by the camera 107 is processed by the image processor 109, the processed image is converted into digital data, and the digital data is displayed on the display 115. If a still-picture capture command is issued when the detected image is displayed on the display unit 115, the controller 101 enables the display unit 115 to display a still picture, and saves the image displayed on the display unit 115 in an image memory area of the memory 103. At this time, the image displayed on the display unit 115 can be a moving picture, and can be character image data such as a card, etc. At the above step 200, a stored image or input image can be used as described in connection with FIGS. 24A and 24B.

The user of the mobile terminal inputs a document "RECOGNIZE" key corresponding to a currently displayed document through the input unit 113. If so, the controller 101 drives the pre-processor 121 so that a pre-processing operation for the document image can be performed at step 210. At step 220, at least one character image of the pre-processed document image is recognized. This operation is the same as that described in connection with FIGS. 24A and 24B. The document recognizer 123 recognizes the character images from the image displayed on the display unit 115 and converts the recognized character images into character data. The controller 101 enables the first display area 71 of the display unit 115 to display the character data recognized by the character recognizer 123, and enables the second display area 75 of the display unit 115 to display SAVE items based on types of document input keys.

Then, if the user selects the recognized character data displayed on the first display area 71 of the display unit 115 and selects a SAVE item displayed on the second display area 75, the controller 101 enables the third display area 73 of the display unit 115 to display the selected character data and SAVE item at step 230. At this time, the SAVE item selection process uses a method for selecting a displayed SAVE item through the input unit 113 and a method for selecting a SAVE item through the speech recognizer 129.

After the SAVE item is selected, an operation of correcting character data associated with a corresponding SAVE item is performed if the character data of the selected SAVE item has an error. At this time, an error correction request can be made by selecting at least one erroneous character using the input unit 113 or by speech using the speech recognizer 129. If the error correction request is made through the above-described method, the controller 101 detects the error correction request at step 241 and corrects the erroneous character of the recognized character data at step 240.

If the correction process is completed, the controller 101 stores the corrected character data as character data associated with a corresponding SAVE item in the database 131.

Figure 31:
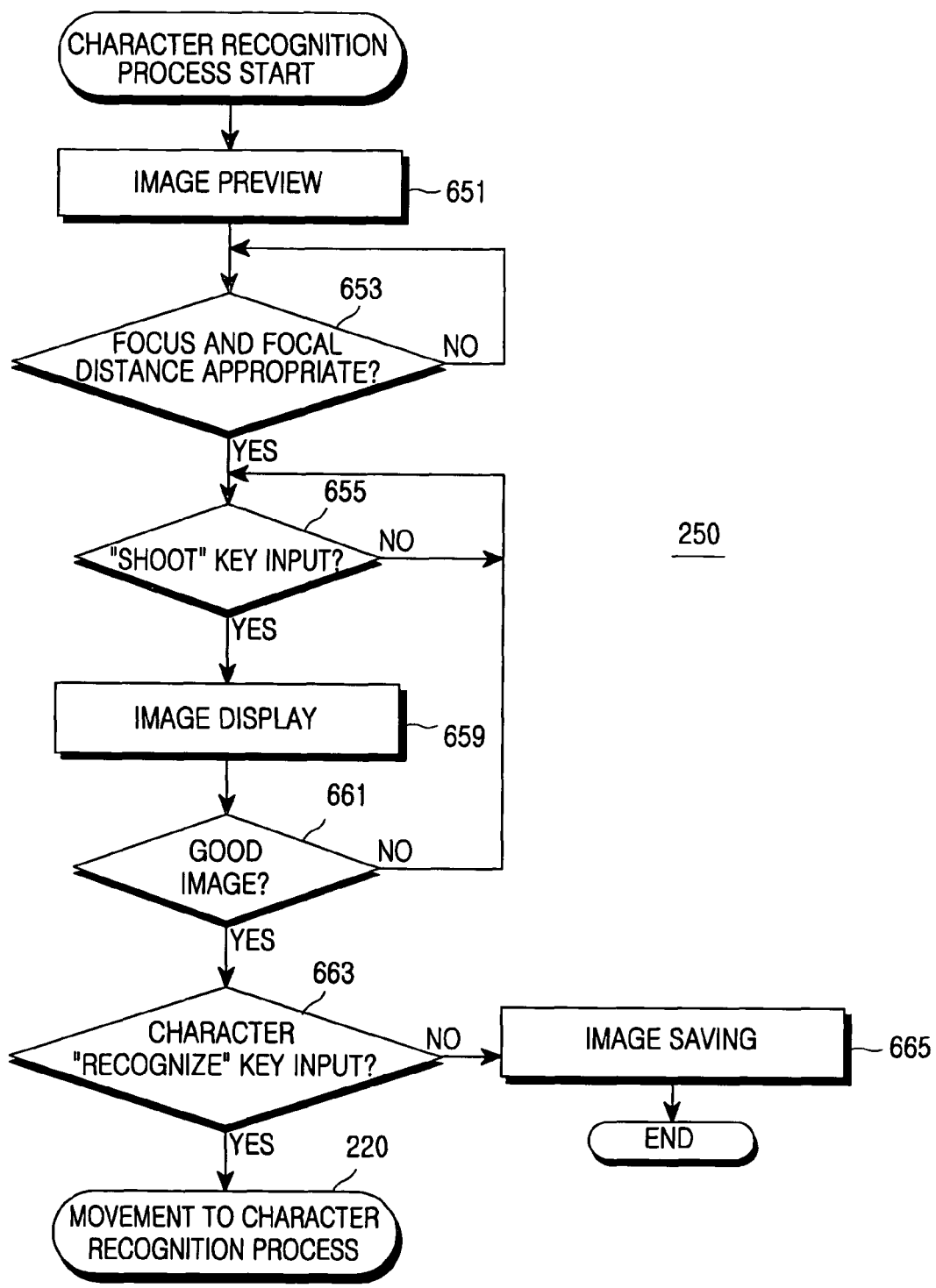
FIG. 31 is a flow chart illustrating an example of a document pickup process shown in FIG. 30 in accordance with an embodiment of the present invention.

FIG. 31 shows the document detection process performed at the above step 200 shown in FIG. 30 in accordance with an embodiment of the present invention; FIGS. 26A to 26E are views of the images picked up by the document pickup process and displayed by the display unit 115. The operation shown in FIG. 31 can be implemented as in that shown in FIG. 3

The document pickup process will now be described. The user places a document to be recognized at an appropriate position and picks up an image of the document using the camera 107 of the mobile terminal. If so, the controller 101 enables the display unit 115 to display a preview image as shown in FIGS. 26A and 26B at step 651. At this time, if the user of the terminal device inputs a camera adjustment key arranged on the key input unit 105 or the input unit 113, the controller 101 detects the camera adjustment key input at step 653 and controls the camera 107. The adjustment of the camera 107 can be focal distance and exposure time adjustments. An image of the document detected on the basis of the exposure time and focal distance adjustment of the camera 107 is displayed on the display unit 115 as shown in FIG. 26A. In this case, when the user inputs a "SHOOT" key of the input unit 113 using the stylus pen, the controller 101 detects the key input at step 655 and enables the display unit 115 to display a still picture corresponding to the document image at a point of "SHOOT" key input time.

The controller 101 enables the display unit 115 to display the picked up document image at step 659. At this time, the document image displayed on the display unit 115 is the same as that shown in FIG. 26C. If the document image displayed on the display unit 115 as shown in FIG. 26C is good, the user inputs the "SAVE" key arranged on the input unit 113 using the stylus pen. If the "SAVE" key is input, the controller 101 detects the "SAVE" key input at step 661, and saves the document image along with a name of the document image in the image memory area of the memory 103. At this time, the document image displayed on the display unit 115 is the same as that shown in FIG. 26E.

Then, if the user clicks a card "RECOGNIZE" key, the controller 101 detects the card "RECOGNIZE" key input at step 663 and performs the document recognition process performed at the above step 220. Otherwise, a currently displayed document image is stored at step 665 and the process is terminated.

In the document pickup process at the above step 210, the user can input a desired image through the camera, and detect a clear document image through a fine adjustment for the camera. If the user is satisfied with the detected image, characters are extracted from the input image through the character recognition and a determination is made as to whether the extracted characters will be stored in a text form or a photo form. At this time, if the user of the mobile terminal makes a character recognition request, the document image pre-process and the document recognition process of the above steps 210 and 220 are performed.

Figure 32:
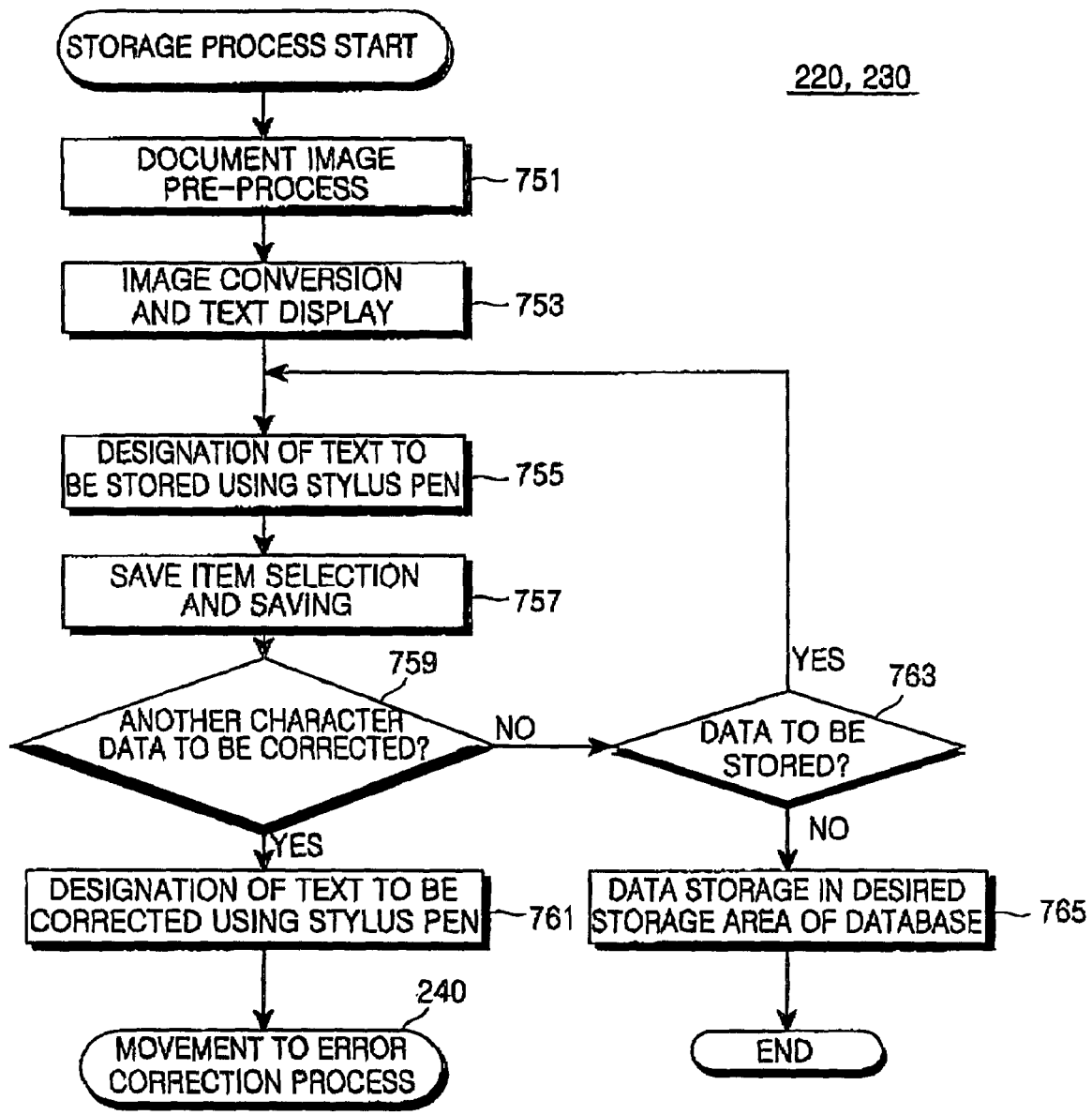
FIG. 32 is a flow chart illustrating an example of character recognition, SAVE item selection and storage processes shown in FIG. 30 in accordance with an embodiment of the present invention.

FIG. 32 is a flow chart illustrating an example of the document image pre-process, the character recognition process and the SAVE item selection process at the above steps 210 to 230 shown in FIG. 30 in accordance with an embodiment of the present invention. FIGS. 27A and 27B show results of the above-described processes.

Referring to FIG. 32, the controller 101 enables the display unit 115 to display an image of a stored card as shown in FIG. 26E before a card "RECOGNIZE" key is input. At this time, if the user inputs the card "RECOGNIZE" key of the input unit 113, the controller 101 detects the card "RECOGNIZE" key input and drives the pre-processor 121 so that a pre-processing operation for the displayed document image can be performed at step 751. At this time, the pre-processing operation can be performed as described above. If so, the character recognizer 123 converts the card image shown in FIG. 26E into character data or text, and the controller 101 enables the display unit 115 to display the character data or text as shown in FIG. 27A. If the card image is converted into character data, the controller 101 enables the first display area 71 of the display unit 115 to display the character data of the card image, enables the third display area 73 to display a selected SAVE item and character data corresponding to the selected SAVE item, and enables the second display area 75 to display SAVE items as shown in FIG. 27A.

When the user selects a character data (or sentence) item of the first display area 71 and selects a SAVE item of the second display area 75 using a stylus pen as shown in FIG. 27B in a state where the recognized character data is displayed as shown in FIG. 27A, the controller 101 detects the character data and SAVE item selections at step 757, and enables the third display area 73 of the display unit 115 to display the selected SAVE item and character data corresponding to the SAVE item as shown in FIG. 27B. At the above step 757, the SAVE item selection process can be executed by speech. In this case, the user of the mobile terminal can select a speech recognition mode through the input unit 113 or the key input unit 105 and input a desired SAVE item by speech.

If the "CORRECT" key is input from the input unit 113 in the state where the character data is displayed, the controller 101 detects the "CORRECT" key input at step 759, and performs the error correction process at step 761. Otherwise, if the "CORRECT" key is not input, the controller 101 determines whether a key for selecting the next SAVE item is input. If the key for selecting the next SAVE item is input, the controller 101 detects the key input at step 763, and selects the next SAVE item at the above step 755. However, if an "END" key input is sensed at the above step 763, the controller 101 saves character data corresponding to the selected SAVE items in the database 131 at step 765, and terminates the document recognition process.

Another document recognition process in accordance with the second embodiment of the present invention performs an operation of driving the character recognizer to convert a character image contained in the input document image into text. After the text is displayed on the display unit 115, the controller 101 allows the user to select desired characters. At this time, a storage area for storing the selected characters (corresponding to a name, an address, a company, etc.) is designated, and copied characters are stored in the assigned storage area. A process for designating the storage area during the SAVE item selection process will be described in detail in a SAVE item selection process shown in FIG. 33. If a character to be corrected is contained in the recognized characters, the error correction process is performed. Otherwise, a determination is made as to whether an additional SAVE item to be stored exists. If an additional SAVE item is to be stored, the SAVE item selection process is repeated, character data is stored in the database in the storage process, and a program is terminated.

Figure 33:
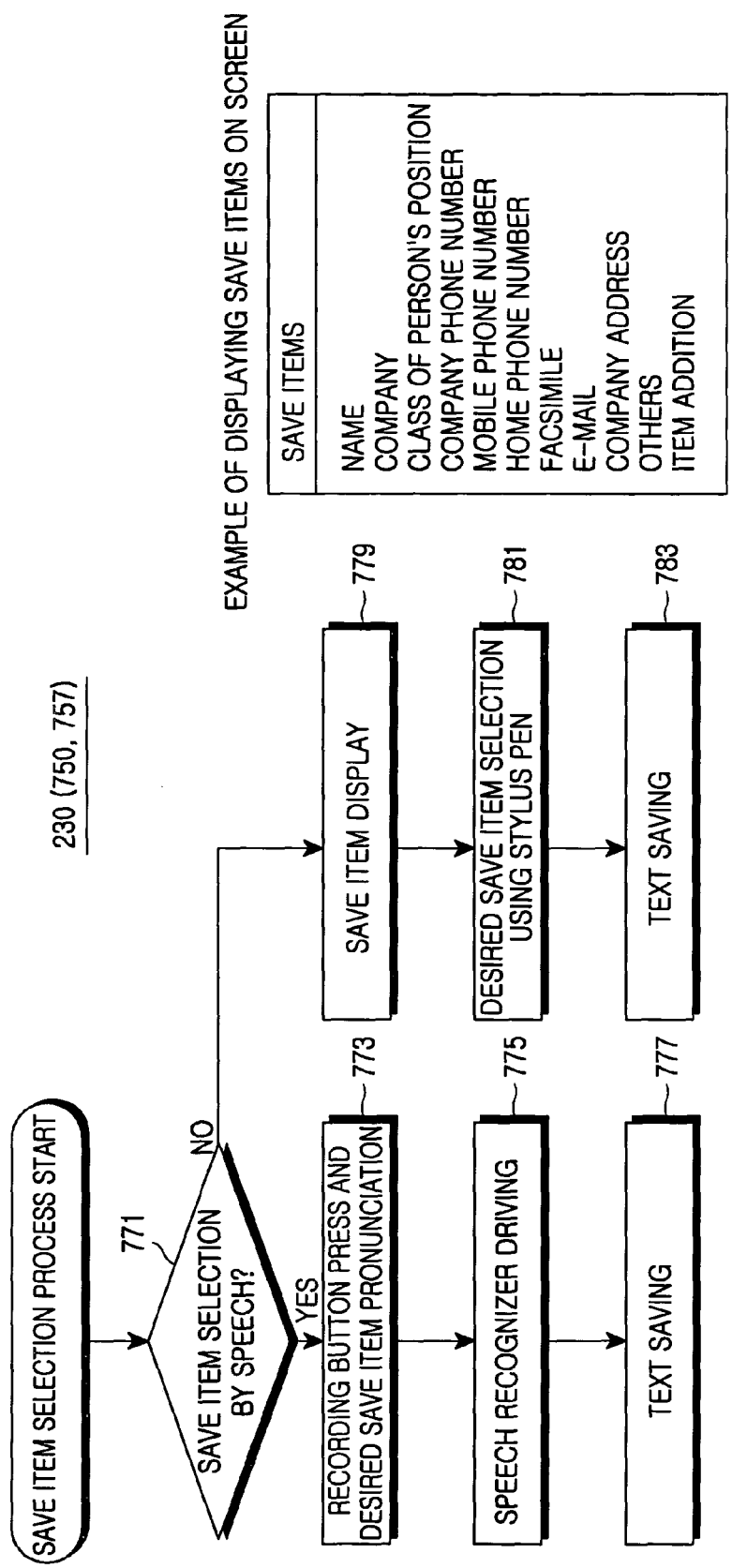
FIG. 33 is a flow chart illustrating an example of the SAVE item selection process shown in FIG. 32 in accordance with an embodiment of the present invention.

FIG. 33 is a detailed flow chart illustrating an example of the SAVE item process performed at the above steps 755 and 757 shown in FIG. 32 in accordance with an embodiment of the present invention.

Referring to FIG. 33, a character recognition process is performed and recognized character data is displayed on the display unit 115 as shown in FIG. 27A. At this time, the user can select SAVE items displayed on the second display area 75 using the stylus pen or select a speech recognition mode through the input unit 113 or key input unit 105. If the speech recognition mode is selected, the controller 101 detects the speech recognition mode selection at step 771 and allows the user to input a desired SAVE item and data by speech through a recording button at step 773. If so, the controller 101 applies a speech signal received through the audio processor 111 to the speech recognizer 129 at the above steps 773 and 775, and drives the speech recognizer 129 so that the received speech signal can be recognized. Then, the controller 101 enables the display unit 115 to display character data associated with a SAVE item corresponding to a speech recognition signal as shown in FIG. 27B and saves the character data at step 777.

Upon detecting the SAVE item selection using the stylus pen at step 771, the controller 101 enables the display unit 115 to display SAVE items as shown in FIG. 27A at step 779. If a desired SAVE item is selected with the stylus pen, a selected SAVE item and character data (text) are displayed as shown in FIG. 277B at step 781, and the character data (text) is stored in a storage area corresponding to the selected SAVE item at step 783.

As described above, the SAVE item selection method is divided into the SAVE item selection method using the speech recognition and the SAVE item selection method using the stylus pen. After the recording button in the SAVE item selection method using the speech recognition is pressed, the user pronounces a desired SAVE item of the SAVE items displayed as shown in FIG. 27A to select the desired SAVE item through the speech recognizer 129. If an "ITEM ADDITION" is selected, a desired additional SAVE item is received from the user and the additional SAVE item is added to a SAVE item table before the next process is performed. Furthermore, in the SAVE item selection method using the stylus pen, a desired SAVE item of the SAVE items displayed on the display unit 115 as shown in FIG. 27A is clicked and selected. The above-described two methods are not sequentially performed, but one of the two methods can be selectively performed according to the user's selection.

FIG. 33 illustrates an example of selecting a desired SAVE item and character data using the speech recognition or stylus pen. The desired SAVE item can be selected by the speech recognition and the character data can be selected with the stylus pen. Furthermore, the desired SAVE item can be selected with the stylus pen and the character data can be selected by the speech recognition.

FIGS. 34A to 34D are flow charts illustrating examples of the process of correcting erroneous character data on a selected SAVE item-by-item basis performed at the above step 240 shown in FIG. 30 in accordance with an embodiment of the present invention.

Figure 34A:
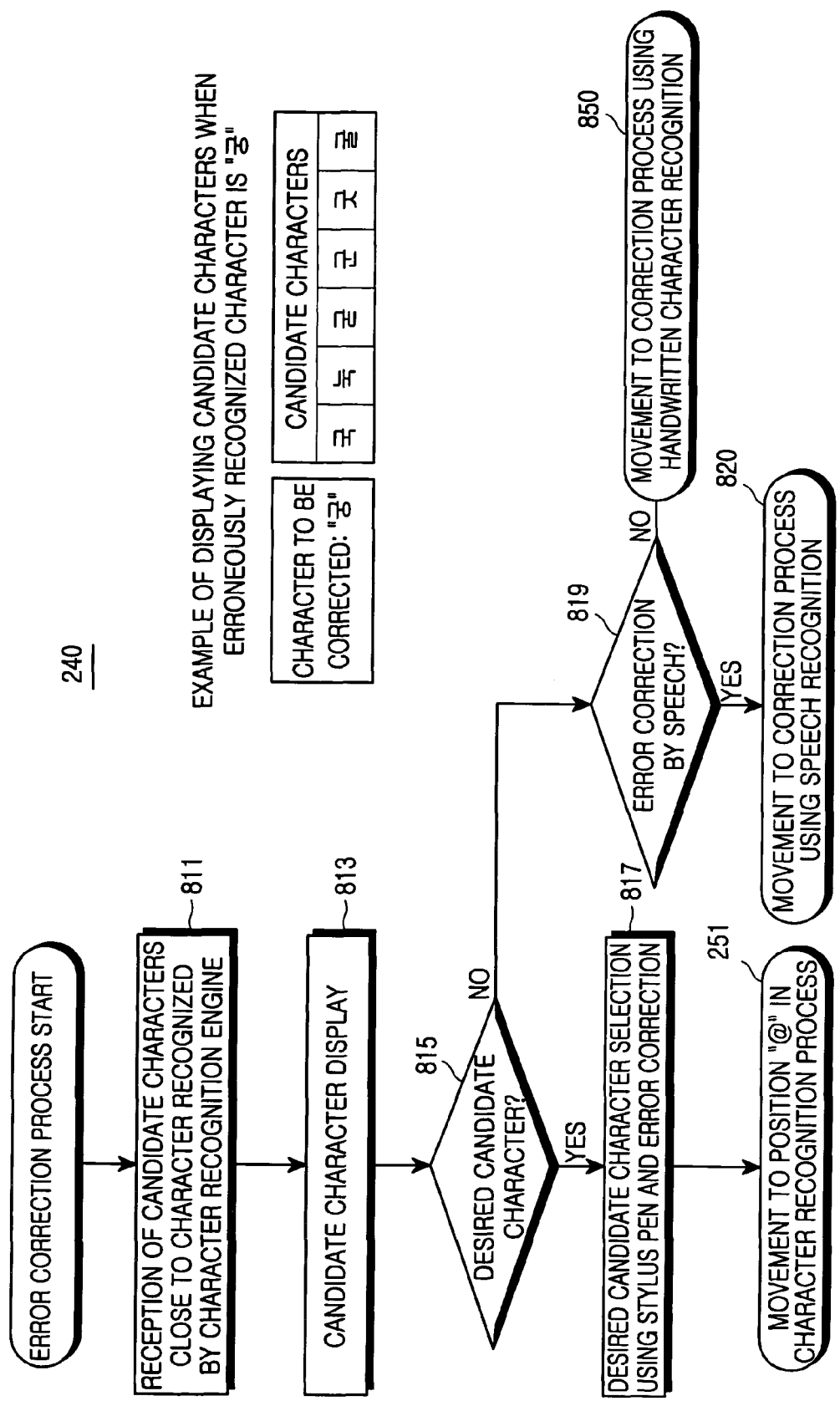
FIGS. 34A to 34D are flow charts illustrating examples of the error correction process shown in FIG. 30 in accordance with an embodiment of the present invention.

Referring to FIG. 34A, the controller 101 enables the third display area 73 of the display unit 115 to display the selected SAVE item and character data corresponding to the selected SAVE item as shown in FIG. 28A when a desired SAVE item is selected. When the character data corresponding to the selected SAVE item is erroneously recognized, the user clicks the "CORRECT" key using the stylus pen or selects the speech recognition mode to make a correction request. The controller 101 detects the correction request, receives candidate characters closest to a character recognized by the character recognizer 123, and enables the third display area 73 of the display unit 115 to display the candidate characters. At this time, the controller 101 enables the third display area 73 of the display unit 115 to display the candidate characters for correcting the erroneously recognized character, enables the second display area 75 of the display unit 115 to display a recognition window for inputting handwritten characters to correct the erroneously recognized character or enables the fourth display area 77 of the display unit 115 to display a soft keypad as shown in FIG. 28B. If a desired character is contained in the candidate characters displayed on the third display area 73 of the display unit 115, the user of the mobile terminal clicks the desired candidate character using the stylus pen. Thus, if an arbitrary candidate character is selected from the candidate characters, the controller 101 detects the candidate character selection at step 815, and corrects or replaces the erroneously recognized character displayed on the first display area 71 with the selected candidate character at step 817.

If the desired character is not contained in the candidate characters displayed on the third display area 73, the user of the mobile terminal can select the speech recognition mode, use the handwritten character recognition window displayed on the second display area 75, or use the soft keypad displayed on the fourth display area 77. At this time, if the user selects the speech recognition mode through the input unit 113 or the key input unit 105, the controller 101 performs the operation associated with FIG. 34B at step 820. If the user inputs a handwritten character into the handwritten character recognition window displayed on the second display area 75, the controller 101 performs the operation associated with FIG. 34C at step 850.

The correction process refers to a value of data extracted by the character recognizer 123. When one character is recognized by the character recognition process as in FIG. 33, the character recognizer 123 decides a candidate character closest to the input character as character data associated with a corresponding SAVE item, and keeps other candidate characters close to the input character. In the error correction process shown in FIG. 34A, the user requests that the character recognizer 123 provide candidate characters associated with a character to be corrected, and hence the third display area 73 of the display unit 115 displays the candidate characters provided by the character recognizer 123. At this time, if a desired candidate character is contained in the candidate characters, the user of the mobile terminal selects the desired character using the stylus pen and corrects or replaces the erroneously recognized character with the selected candidate character. Otherwise, if no desired character is in the candidate characters, the user of the mobile terminal executes the speech recognition process shown in FIG. 34B, the handwritten character recognition process shown in FIG. 34C or the soft key recognition process shown in FIG. 34D. These processes are executed on one screen. While the handwritten character recognition window and the soft keypad are displayed on a lower part of the display unit 115 provided in the mobile terminal, the display unit 115 waits for the user to select the handwritten character recognition window or the soft keypad. Where the user presses the recording button, the speech recognizer 129 is driven. Accordingly, the character recognizer 123 is designed so that printed characters, handwritten characters and soft keys can be recognized.

Figure 34B:
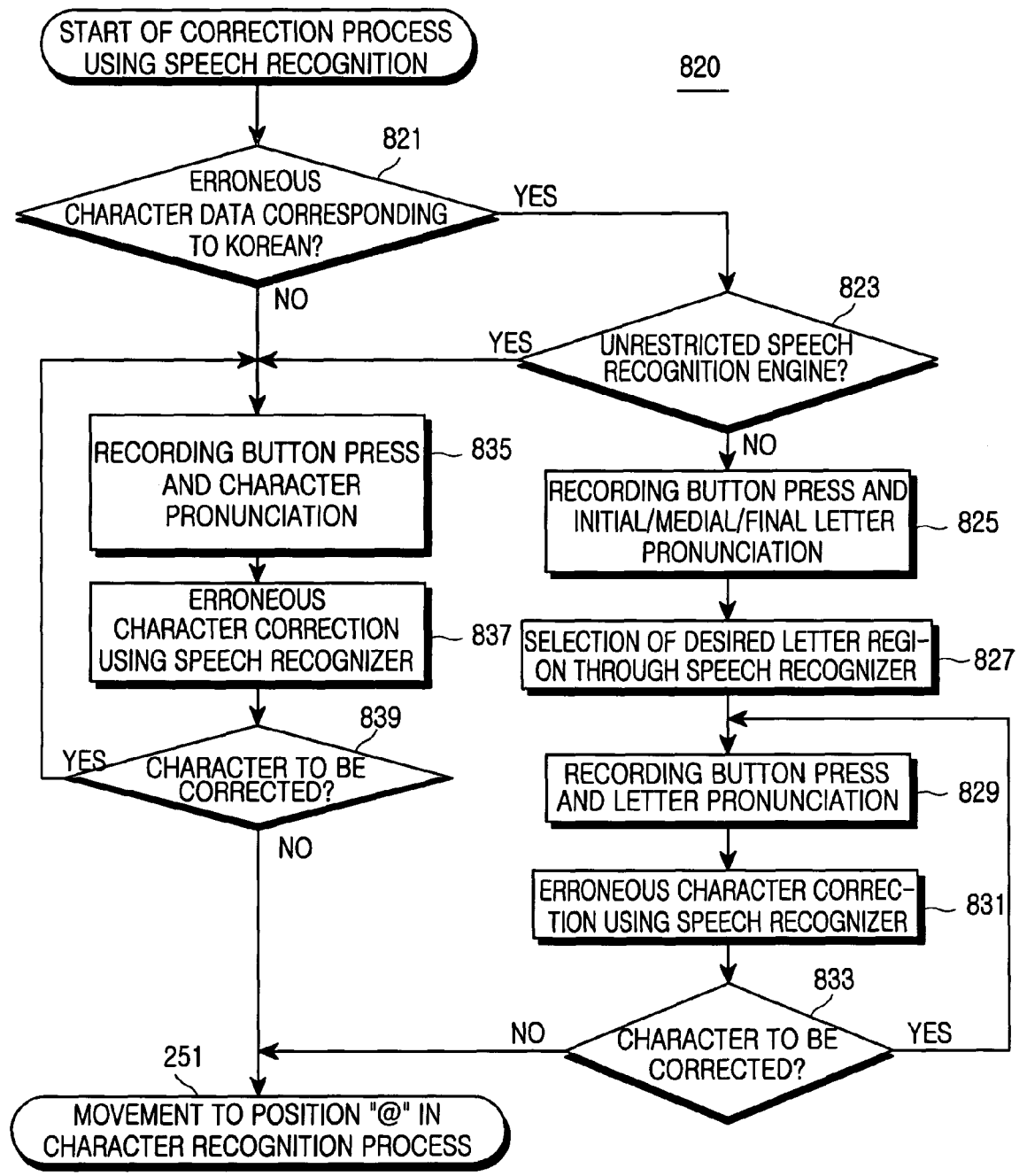

Referring to FIG. 34B, the speech recognizer 129 operates differently according to the language used. The speech recognizer 129 receives a speech signal on a letter-by-letter or character-by-character basis rather than on a word-by-word basis. A word consists of at least one letter in English, and an English letter corresponds to a character. However, a character consists of several character elements or letters in Korean. For example, the word "KOREA" in English consists of five letters, while the word "한국 (Hankook)" in Korean consists of two characters that consist of three letters, respectively. In relation to Korean language, the speech recognizer 129 must receive speech signals corresponding to a desired character on a letter-by-letter basis if the speech recognizer 129 is not an unrestricted speech recognition engine. Thus, a language mode is first selected in the speech recognition mode, and a determination is made as to whether the speech recognizer 129 is the unrestricted speech recognition engine if the language mode is based on Korean language.

In the speech recognition process, the controller 101 determines whether a letter to be corrected is English or Korean at step 821. If the letter to be corrected is English, the user of the mobile terminal selects an English mode, presses the recording button, and inputs character data for correction by speech. If so, the controller 101 detects the speech input corresponding to the English character data at step 835 and drives the speech recognizer 129 at step 837. The speech recognizer 129 recognizes the English character data of the speech output from the audio processor 111 and outputs the recognized English character data to the controller 101. Then, the controller 101 corrects the character data corresponding to the selected SAVE item with the recognized English character data and determines whether the next character data must be corrected at step 839. At this time, if character data to be corrected exists, the controller 101 returns to the above step 835 and repeats the above-described procedure. If no character data to be corrected exists, the controller 101 performs the above step 251 shown in FIG. 30.

If a character to be corrected is Korean, the controller 101 determines whether the speech recognizer 129 is an unrestricted speech recognition engine. If the speech recognizer 129 is the unrestricted speech recognition engine, the controller 101 performs the above step 823, and performs the speech recognition operation of the Korean character while performing the above steps 835 to 839. The Korean language speech recognition is performed on a character-by-character basis.

If the speech recognizer 129 is not an unrestricted speech recognition engine, the controller 101 enables the speech recognizer 129 to perform a Korean language speech recognition process on a letter-by-letter basis at step 825. In this case, the user presses the recording button where the character data corresponding to the selected SAVE item is corrected, sequentially inputs speech signals corresponding to letters configuring Korean character data, and presses the completion button if the speech signal input for the letters corresponding to a character is completed. If the speech signals corresponding to letters configuring the character are input, the controller 101 receives the input speech signals at the above step 825, and drives the speech recognizer 129 so that the received speech signals can be recognized. After the speech signals corresponding to the letters for character correction are recognized, the controller 101 detects the completion of the speech signal input at step 829, combines the letters at the above step 829 to form a character, and corrects or replaces an erroneous character with the character formed by the combined letters. Then, the controller 101 determines whether the next character data must be corrected at step 833. If another character to be corrected exists, the controller 101 returns to the above step 825 so that the above-described steps can be repeated. Otherwise, if no character to be corrected exists, the above step 251 shown in FIG. 30 is performed.

When the error correction process cannot be performed using the stylus pen, the error correction process can be performed using the speech recognition. In the speech recognition process, a determination is made as to whether a character to be corrected consists of at least two letters. For example, a Korean character consists of a plurality of letters including at least one consonant and at least one vowel, i.e., a set of initial and medial letters or a set of initial, medial and final letters. Since an unrestricted speech recognizer requiring very large capacity software cannot be embedded in the mobile terminal (e.g., a PDA), the Korean recognition for other characters rather than previously input characters is disabled. Thus, a correctable range in Korean is formed on a letter-by-letter basis (i.e., on a initial/media/final letter basis). The character correction process is achieved on a letter-by-letter basis. If the unrestricted speech recognizer can be implemented within the mobile terminal in the future, the character correction process can be performed on a letter-by-letter or character-by-character basis. Meanwhile, since English letters or special characters can be corrected on a letter-by-letter or character-by-character basis, the user selects a desired alphabet or special character, presses the recording button, and pronounces a desired character through the speech recognizer so that an erroneous character can be corrected or replaced with the pronounced character. If the correction process is completed, the method returns to the SAVE item selection process shown in FIG. 30.

Figure 34C:
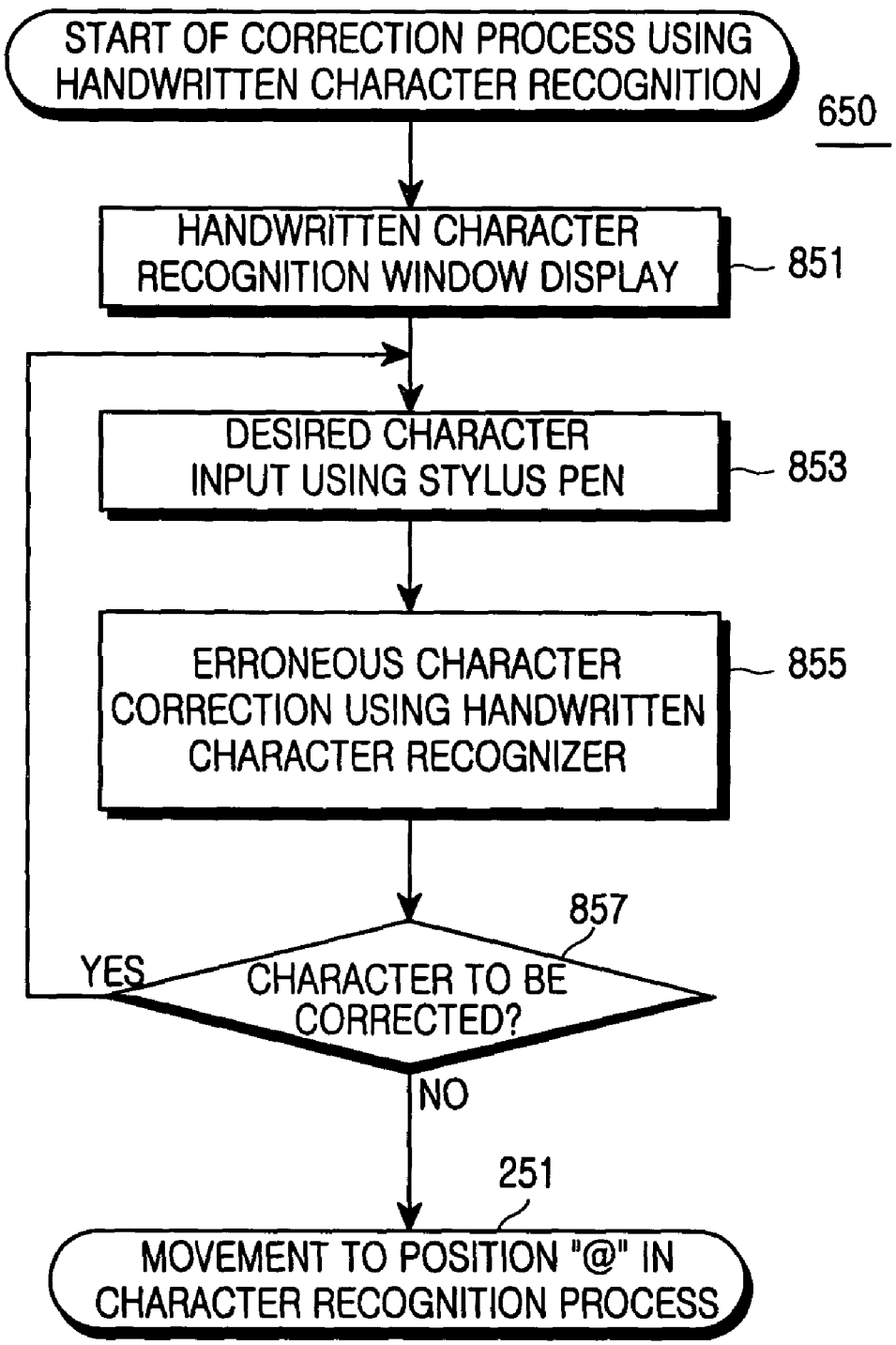

An error correction process using a handwritten character recognition process will be described with reference to FIG. 34C. The controller 101 enables the display unit 115 to indicate an erroneously recognized character at step 851. If a handwritten character is input into the recognition window of the second display area 75 with the stylus pen, the controller 101 detects the handwritten character input at step 853, and drives the character recognizer 123 so that the input handwritten character can be recognized at step 855. The controller 101 corrects or replaces erroneously recognized character data corresponding to the selected SAVE item with character data recognized by the character recognizer 123. The controller 101 determines whether the next character data must be corrected at step 857. If another character to be corrected exists, the controller 101 returns to the above step 853 so that the above-described steps can be repeated. Otherwise, if no character to be corrected exists, the above step 251 shown in FIG. 30 is performed.

The error correction process using the handwritten character recognition is performed through the handwritten character recognition window loaded on the second display area 75 of the display unit 115. Where an erroneous character cannot be corrected by the error correction process shown in FIG. 34A, the user can perform the correction operation by directly inputting a desired character into the handwritten character recognition window.

Figure 34D:
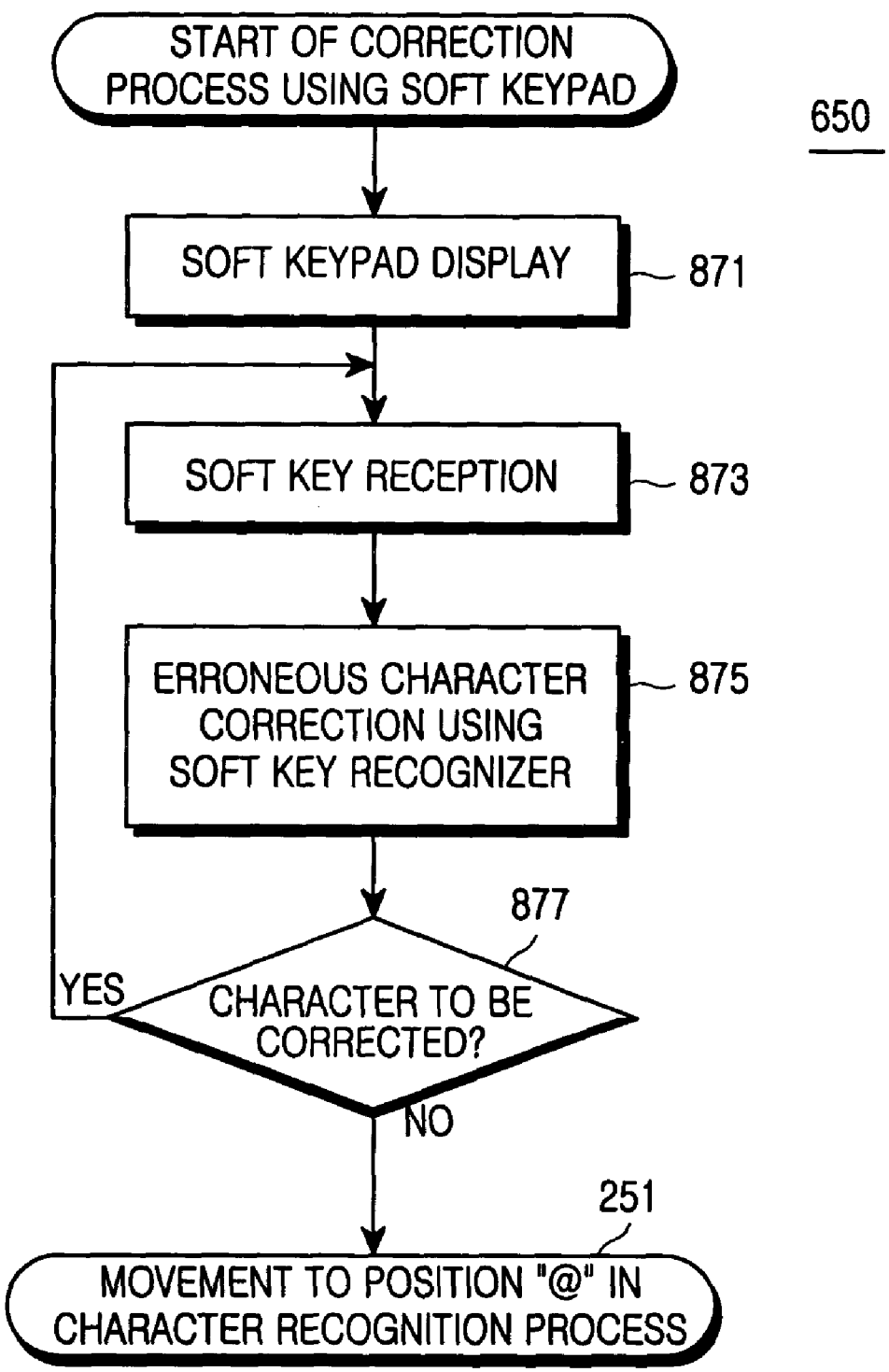

The error correction process by the soft key recognition will be described with reference to FIG. 34D. The controller 101 enables the display unit 115 to indicate an erroneously recognized character as shown in FIG. 28D and to display the soft keypad on the fourth display area 77. At this time, if key data is input or received from the soft keypad, the controller 101 detects the key data reception at step 873 and drives the soft key recognizer of the character recognizer 123 at step 875 so that characters corresponding to the input key data can be recognized. If so, the controller 101 corrects or replaces erroneously recognized character data of the selected SAVE item with character data recognized by the soft key recognizer of the character recognizer 123. The controller 101 determines whether the next character data must be corrected at step 877. If another character to be corrected exists, the controller 101 returns to the above step 853 so that the above-described steps can be repeated. Otherwise, if no character to be corrected exists, the above step 251 shown in FIG. 30 is performed.

The error correction by the soft key recognition is performed through the soft keypad loaded on the fourth display area 77 of the display unit 115. Where an erroneous character cannot be corrected by the error correction process shown in FIG. 34A, the user can perform the correction operation by directly inputting a desired character through soft keys of the soft keypad.

If the SAVE item selection process and the error correction process for character data corresponding to a selected SAVE item are completed, the user of the mobile terminal inputs the "END" key through the input unit 113. Then, the controller 101 detects the "END" key input at step 251 and saves a result of the document recognition in the database 131. The database 131 registers selected SAVE items and character data corresponding to the selected SAVE items in an address designated by the user.

The database 131 saves SAVE item-based data recognized from the document in a desired storage area thereof if the input, recognition and correction processes are completed. The database 131 can include various storage spaces capable of storing a phone book, memos, other applications, etc. If all desired data items are completely stored, a program is terminated.

In accordance with the second embodiment of the present invention, SAVE items associated with a recognized document after document recognition are selected, an erroneous character is corrected if character data of a selected SAVE item has an error, and the next SAVE item is selected. Thus, an erroneous character is corrected and the corrected character is stored while character data for the recognized document is stored on a SAVE item-by-item basis. In the second embodiment of the present invention, a speech recognizer can be used when a SAVE item is selected or an erroneous character is corrected.

In the error correction process in accordance with the second embodiment of the present invention, a candidate character is first selected, and an erroneous character is corrected by the selected candidate character. Where the error correction process using the candidate character is disabled, it has been shown that the error correction can be achieved through the speech recognition or handwritten character, and the soft key recognition. In the erroneous character correction process, some methods of the candidate character selection method, the speech input method using the speech recognition, the handwritten character input method and the character input method using the soft keypad can be selectively implemented. In other words, the erroneous character correction method allows the user to directly input a speech signal, a handwritten character and a soft key without selecting a candidate character. Furthermore, the erroneous character correction method using the candidate character selection, the speech recognition and the handwritten character recognition has been described, but it can be implemented using only the candidate character selection and speech recognition method, the speech recognition and handwritten character recognition method, or the speech recognition and soft key recognition method.

In the embodiments of the present invention, it is assumed that the above-described document is a business card bearing a person's name and other information, but the embodiments of the present invention can be applicable to other documents rather than the business card.

Where information of the document is registered in a device such as a mobile terminal, an image of the document is scanned, and character data can be registered through character recognition and/or speech recognition, such that a manipulation of an input unit through the mobile terminal can be simplified and an erroneous character can be conveniently corrected in the character recognition or speech recognition. Since the information of the document can be input through the character and speech recognition methods, a large capacity of the document information can be efficiently input.

Although embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. An apparatus for recognizing a character image from a document, comprising:
   an input unit for generating commands for a recognition mode, a correction mode and a storage mode;
   a pre-processor for analyzing pixels of a document image in the recognition mode, classifying the document image into at least one Character Block (GB) and at least one Background Block (BB) on the basis of a result of the analysis, binarizing pixels of the BB and generating a pre-processed document image;
   a character recognizer for recognizing the pre-processed document image and converting the recognized pre-processed document image into character data;
   a recognition error processor for correcting or replacing erroneously recognized character data selected by the input unit with character data output by the input unit in the correction mode;
   a database for storing the recognized character data in the storage mode; and
   a display unit for displaying the document image and character data generated during operating of the modes,
   wherein the display unit displays a set of candidate characters corresponding to the erroneously recognized character data in correction mode and wherein the recognition error processor corrects or replaces the erroneously recognized character data with a candidate character selected from the displayed candidate characters.

2. The apparatus as set forth in claim 1, wherein the pre-processor comprises:
   a skew correction part for classifying stripes having a preset length or above from the document image, calculating direction angles of the classified stripes, measuring a skew of an object, deciding a skew angle corresponding to the measured skew and correcting the object skew;
   an Region Of Contents (ROC) extension part for classifying the document image in which the object skew is corrected into CBs and BBs, searching for positions of the CBs to extract the CBs and extending a size of an image of the extracted CBs to a size of an input document image; and
   an image binarization part for comparing pixels of the CBs for the document image with a pixel threshold value, binarizing the pixels of the CBs into pixels having brightness values for character and background pixels, and binarizing pixels of the BBs into pixels having a brightness value for the background pixels.

3. The apparatus as set forth in claim 2, wherein the pre-processor further comprises:
   a blurred-image detection part for classifying the input document image into the CBs and the BBs, calculating an average energy ratio for the CBs, comparing the average energy ratio with a predetermined threshold value, and determining whether the input document image is blurred according to a result of the comparison.

4. The apparatus as set forth in claim 2, wherein the pre-processor further comprises:
   a noise reduction part for reducing noise of the extended image output from the ROC extension part and outputting, to the image binarization part, the image in which the noise is reduced.

5. The apparatus as set forth in claim 1, further comprising:
   a camera for detecting the document and generating the document image.

6. The apparatus as set forth in claim 5, further comprising:
   a speech recognizer for generating an input signal to select a SAVE item in the storage mode and generating another input signal to select and correct erroneously recognized character data in the correction mode, the speech recognizer converting an input speech signal into character data.

7. The apparatus as set forth in claim 5, wherein the character recognizer comprises:
   a handwritten character recognizer for recognizing a received handwritten character image in the correction mode and converting the recognized handwritten character image into correction character data necessary for correcting the erroneously recognized character data.

8. The apparatus as set forth in claim 5, wherein the camera adjusts a focal distance and exposure time.

9. An apparatus for storing document information using a camera, comprising:
   an input unit for generating commands for a pickup mode, a recognition mode, a correction mode and a storage mode;
   a display unit having a first display area for displaying an input document image and character data recognized from the input document image, a second display area for displaying SAVE items, a third display area for displaying character data of a selected SAVE item, and another display area for displaying an operating mode menu;
   the camera driven in the pickup mode for detecting the document image;
   a pre-processor for analyzing pixels of the document image in the recognition mode, classifying the document image into at least one Character Block (CB) and at least one Background Block (BB) on the basis of a result of the analysis, binarizing pixels of the BB and generating a pre-processed document image;
   a character recognizer for recognizing the pre-processed document image and converting the recognized pre-processed document image into character data;

a recognition error processor for correcting or replacing erroneously recognized character data selected by the input unit with character data output by the input unit in the correction mode; and a database for storing the recognized character data in the storage mode.

10. The apparatus as set forth in claim 9, wherein the pre-processor comprises:

a skew correction part for classifying stripes having a preset length or above from the document image, calculating direction angles of the classified stripes, measuring a skew of an object according to a result of the calculation, deciding a skew angle corresponding to the measured skew and correcting the object skew;

an Region Of Contents (ROC) extension part for classifying the document image in which the object skew is corrected into CBs and BBs, searching for positions of the CBs to extract the CBs and extending a size of an image of the extracted CBs to a size of an input document image; and an image binarization part for comparing pixels of the CBs for the document image with a pixel threshold value, binarizing the pixels of the CBs into pixels having brightness values for character and background pixels, and binarizing pixels of the BBs into pixels having a brightness value for the background pixels.

11. The apparatus as set forth in claim 10, wherein the pre-processor further comprises:

a blurred-image detection part for classifying the input document image into the CBs and the BBs, calculating an average energy ratio for the CBs, comparing the average energy ratio with a predetermined threshold value, and determining whether the input document image is blurred according to a result of the comparison.

12. The apparatus as set forth in claim 11, wherein the pre-processor further comprises:

a noise reduction part for reducing noise of the extended image output from the ROC extension part and outputting, to the image binarization part, the image in which the noise is reduced.

13. The apparatus as set forth in claim 12, further comprising:

a speech recognizer for generating an input signal to select a SAVE item in the storage mode and generating another input signal to select and correct erroneously recognized character data in the correction mode, the speech recognizer converting an input speech signal into character data.

14. The apparatus as set forth in claim 12, wherein the character recognizer comprises:

a handwritten character recognizer for recognizing a received handwritten character image in the correction mode and converting the recognized handwritten character image into correction character data necessary for correcting the erroneously recognized character data.

15. A method for enabling a terminal device to recognize a character image from a document image, comprising the steps of:

(a) designating an operating mode for document recognition;

(b) analyzing pixels of the document image in the document recognition mode, classifying the document image into at least one Character Block (GB) and at least one Background Block (BB) on the basis of a result of the analysis, binarizing pixels of the BB and generating a pre-processed document image;

(c) recognizing the pre-processed document image and converting the recognized pre-processed document image into character data;

(d) selecting erroneously recognized character data, and correcting or replacing the erroneously recognized character data with input character data in a correction mode, further comprising steps of:

(d-1) displaying candidate characters corresponding to the erroneously recognized character data in the correction mode; and (d-2) correcting or replacing the erroneously recognized character data with a candidate character selected from the displayed candidate characters; and (e) storing the recognized character data in a storage mode.

16. The method as set forth in claim 15, wherein the step (b) comprises the steps of:

(b-1) classifying stripes having a preset length or above from the document image, calculating direction angles of the classified stripes, measuring a skew of an object according to a result of the calculation, deciding a skew angle corresponding to the measured skew and correcting the object skew;

(b-2) classifying the document image in which the object skew is corrected into CBs and BBs, searching for positions of the CBs to extract the CBs and extending a size of an image of the extracted CBs to a size of an input document image; and (b-3) comparing pixels of the CBs for the document image with a pixel threshold value, binarizing the pixels of the CBs into pixels having brightness values for character and background pixels, and binarizing pixels of the BBs into pixels having a brightness value for the background pixels.

17. The method as set forth in claim 16, wherein the step (b) further comprises the step of:

(b-4) classifying the input document image into the CBs and the BBs, calculating an average energy ratio for the CBs, comparing the average energy ratio with a predetermined threshold value, determining whether the input document image is blurred according to a result of the comparison, and carrying out a pre-process if in the input image is not blurred.

18. The method as set forth in claim 17, wherein the step (b) further comprises the step of:

(b-5) reducing noise of the extended image output from a Region Of Contents (ROC) extension part and outputting, to the image binarization part, the image in which the noise is reduced.

19. The method as set forth in claim 18, wherein the step (d) comprises the steps of:

(d-3) displaying a recognition window for inputting a handwritten character in response to a request in the correction mode;

(d-4) recognizing the handwritten character when the handwritten character is input into the handwritten character recognition window; and (d-5) correcting or replacing the erroneously recognized character data with the recognized handwritten character.

20. The method as set forth in claim 18, wherein the step (d) comprises the steps of:

(d-6) displaying candidate characters associated with the erroneously recognized character in the correction mode;

(d-7) correcting or replacing the erroneously recognized character data with a candidate character selected from the displayed candidate characters;

(d-8) displaying a handwritten character recognition window when correction character data is not contained in the displayed candidate characters;

(d-9) recognizing a handwritten character when the handwritten character is input into the handwritten character recognition window; and (d-10) correcting or replacing the erroneously recognized character data with the recognized handwritten character.

21. The method as set forth in claim 18, wherein the step (d) comprises the steps of:

(d-11) driving a speech recognizer in the correction mode;

(d-12) allowing the speech recognizer to recognize an input speech signal and convert the recognized speech signal into the character data; and (d-13) correcting or replacing the erroneously recognized character data with the character data provided from the speech recognizer.

22. A method for enabling a terminal device to recognize a character image from a document image, the terminal device including a display unit having a first display area for displaying a character image and character data, a second display area for displaying SAVE items, a third display area for displaying character data of a selected SAVE item, and another display area for displaying an operating mode menu, comprising the steps of:

(a) displaying the document image picked up by a camera;

(b) analyzing pixels of the document image in a document recognition mode, classifying the document image into at least one Character Block (CB) and at least one Background Block (BB) on the basis of a result of the analysis, binarizing pixels of the BB and generating a pre-processed document image;

(c) recognizing the pre-processed document image, converting the recognized pre-processed document image into character data, displaying the character data on the first display area, displaying SAVE items associated with the character data on the second display area, and displaying the pre-processed document image on the first display area;

(d) selecting a SAVE item from the displayed SAVE items, selecting character data associated with the selected SAVE item, and storing and displaying the selected character data; and (e) repeating the steps (a) to (d) and storing selected SAVE items and character data corresponding to the selected SAVE items.

23. The method as set forth in claim 22, further comprising the step of:

(f) correcting erroneously recognized character data after the SAVE item and character data are selected, wherein the step (f) comprises the steps of:

displaying candidate characters associated with the erroneously recognized character data on the third display area in response to an error correction request; and correcting or replacing the erroneously recognized character data with a candidate character selected from the displayed candidate characters.

24. The method as set forth in claim 22, further comprising the step of:

(f) correcting erroneously recognized character data after the SAVE item and character data are selected, wherein the step (f) comprises the steps of:

displaying a handwritten character recognition window on the second display area in response to an error correction request;

recognizing a handwritten character when the handwritten character is input into the handwritten character recognition window; and correcting or replacing the erroneously recognized character data with the recognized handwritten character.

25. The method as set forth in claim 22, further comprising the step of:

(f) correcting erroneously recognized character data after the SAVE item and character data are selected, wherein the step (f) comprises the steps of:

displaying candidate characters associated with the erroneously recognized character data on the third display area in response to an error correction request;

correcting or replacing the erroneously recognized character data with a candidate character selected from the displayed candidate characters;

displaying a handwritten character recognition window on the second display area when correction character data is not contained in the displayed candidate characters;

recognizing a handwritten character when the handwritten character is input into the recognition window; and correcting or replacing the erroneously recognized character data with the recognized handwritten character.

26. The method as set forth in claim 22, further comprising the step of:

(f) correcting erroneously recognized character data after the SAVE item and character data are selected, wherein the step (f) comprises the steps of:

driving a speech recognizer in response to an error correction request;

allowing the speech recognizer to recognize an input speech signal and convert the recognized speech signal into the character data; and correcting or replacing the erroneously recognized character data with the character data provided from the speech recognizer.

27. A method for enabling a mobile terminal to recognize an image of a card bearing a person's name and other information, the mobile terminal including a display unit having a first display area for displaying character data of the recognized card, a second display area for displaying SAVE items, a third display area for displaying character data of a selected SAVE item, and another display area for displaying an operating mode menu, comprising the steps of:

(a) displaying the card image picked up by a camera;

(b) analyzing pixels of the card image in a recognition mode, classifying the card image into at least one Character Block (CB) and at least one Background Block (BB) on the basis of a result of the analysis, binarizing pixels of the BB and generating a pre-processed card image;

(c) converting the pre-processed card image into character data, displaying the character data on the first display area, and displaying SAVE items of the card associated with the character data on the second display area;

(d) selecting a SAVE item from the displayed SAVE items, selecting character data associated with the selected SAVE item, and displaying the selected character data on the third display area;

(e) selecting erroneously recognized character data, and correcting or replacing the erroneously recognized character data with input character data in a correction mode; and (f) storing the recognized character data in a storage mode.

28. The method as set forth in claim 27, wherein the SAVE items comprise a person's name, a mobile phone number, a company phone number, an e-mail address, the person's title and others.

29. The method as set forth in claim 28, wherein a process of carrying out the correction mode comprises the steps of:
   displaying candidate characters associated with the erroneously recognized character data on the third display area in response to an error correction request; and
   correcting or replacing the erroneously recognized character data with a candidate character selected from the displayed candidate characters.

30. The method as set forth in claim 28, wherein a process of correcting the erroneously recognized character data comprises the steps of:
   displaying a handwritten character recognition window on the second display area when a correction key is input;
   recognizing a handwritten character when the handwritten character is input into the handwritten character recognition window; and
   correcting or replacing the erroneously recognized character data with the recognized handwritten character.

31. The method as set forth in claim 28, wherein a process of correcting the erroneously recognized character data comprises the steps of:
   driving a speech recognizer when a correction key is input;
   allowing the speech recognizer to recognize an input speech signal and convert the recognized speech signal into the character data; and
   correcting or replacing the erroneously recognized character data with the character data provided from the speech recognizer.

32. The method as set forth in claim 28, wherein a process of correcting the erroneously recognized character data comprises the steps of:
   displaying candidate characters associated with the erroneously recognized character data in the correction mode;
   correcting or replacing the erroneously recognized character data with a candidate character selected from the displayed candidate characters;
   displaying a handwritten character recognition window when correction character data is not contained in the displayed candidate characters;
   recognizing a handwritten character when the handwritten character is input into the recognition window; and
   correcting or replacing the erroneously recognized character data with the recognized handwritten character.

* * * * *